US012564130B2

(12) United States Patent
Lee et al.

(10) Patent No.: US 12,564,130 B2
(45) Date of Patent: Mar. 3, 2026

(54) ROBOTIC GARDEN TOOL

(71) Applicant: TECHTRONIC CORDLESS GP, Anderson, SC (US)

(72) Inventors: Hei Man Lee, Hong Kong (CN); Man Ho Choi, Hong Kong (CN)

(73) Assignee: Techtronic Cordless GP, Anderson, SC (US)

( * ) Notice: Subject to any disclaimer, the term of this patent is extended or adjusted under 35 U.S.C. 154(b) by 521 days.

(21) Appl. No.: 18/161,545

(22) Filed: Jan. 30, 2023

(65) Prior Publication Data

US 2023/0240178 A1      Aug. 3, 2023

Related U.S. Application Data

(60) Provisional application No. 63/305,044, filed on Jan. 31, 2022.

(51) Int. Cl.
*A01D 34/00* (2006.01)
*A01D 101/00* (2006.01)

(52) U.S. Cl.
CPC ........ *A01D 34/008* (2013.01); *A01D 2101/00* (2013.01)

(58) Field of Classification Search
CPC .. A01D 34/008; A01D 2101/00; A01D 34/63; A01D 67/00
See application file for complete search history.

(56) References Cited

U.S. PATENT DOCUMENTS

| | | |
|---|---|---|
| 923,312 A | 6/1909 | Alexanderson |
| 2,511,124 A | 6/1950 | Phelps |
| 2,539,779 A | 1/1951 | Grosso |
| 2,701,942 A | 2/1955 | Caldwell, Jr. et al. |
| 2,751,030 A | 6/1956 | Null |
| | (Continued) | |

FOREIGN PATENT DOCUMENTS

| | | |
|---|---|---|
| AU | 2006100911 A4 | 11/2006 |
| AU | 2011239326 A1 | 11/2011 |
| | (Continued) | |

OTHER PUBLICATIONS

US 8,272,092 B2, 09/2012, Schnittman et al. (withdrawn)
(Continued)

*Primary Examiner* — Brad Harcourt

(74) *Attorney, Agent, or Firm* — Michael Best & Friedrich LLP

(57)        ABSTRACT

A robotic garden tool may include a first sensor configured to sense an electromagnetic signal from a boundary cable installed on an operating surface, and a second sensor configured to sense a first anchor installed on the operating surface. The robotic garden tool may also include an electronic processor configured to control, based on first sensor data received from the first sensor, operation of at least one wheel motor to control movement of the robotic garden tool such that the robotic garden tool remains within a boundary defined by the boundary cable. The electronic processor may also be configured to, in response to receiving second sensor data from the second sensor that indicates a sensing of the first anchor, control operation of the at least one wheel motor to control movement of the robotic garden tool in a first predetermined manner.

17 Claims, 6 Drawing Sheets

(56) References Cited

U.S. PATENT DOCUMENTS

| | | | |
|---|---|---|---|
| 2,914,902 | A | 12/1959 | Beymer |
| 3,057,140 | A | 10/1962 | Amos et al. |
| 3,147,662 | A | 9/1964 | Snook |
| 3,311,738 | A | 3/1967 | Makow |
| 3,393,598 | A | 7/1968 | Bettinger |
| 3,500,622 | A | 3/1970 | Bowen |
| 3,570,227 | A | 3/1971 | Bellinger |
| 3,612,574 | A | 10/1971 | Klopfer et al. |
| 3,680,295 | A | 8/1972 | Rutherford |
| 3,776,327 | A | 12/1973 | Klopfer et al. |
| 4,065,913 | A | 1/1978 | Fisher et al. |
| 4,126,990 | A | 11/1978 | Fisher et al. |
| 4,126,991 | A | 11/1978 | Gobin et al. |
| 4,165,597 | A | 8/1979 | Scanland et al. |
| 4,205,510 | A | 6/1980 | Raniero |
| 4,268,964 | A | 5/1981 | Moore |
| 4,306,375 | A | 12/1981 | Goldfarb et al. |
| 4,333,202 | A | 6/1982 | Block |
| 4,351,132 | A | 9/1982 | Molin |
| 4,468,884 | A | 9/1984 | Goldfarb et al. |
| 4,492,058 | A | 1/1985 | Goldfarb et al. |
| 4,511,343 | A | 4/1985 | Goldfarb et al. |
| 4,522,606 | A | 6/1985 | Goldfarb et al. |
| 4,547,166 | A | 10/1985 | Goldfarb et al. |
| 4,591,347 | A | 5/1986 | Goldfarb et al. |
| 4,596,412 | A | 6/1986 | Everett et al. |
| 4,627,563 | A | 12/1986 | Meyer |
| 4,652,247 | A | 3/1987 | Goldfarb et al. |
| 4,673,370 | A | 6/1987 | Goldfarb et al. |
| 4,693,656 | A | 9/1987 | Guthrie |
| 4,787,794 | A | 11/1988 | Guthrie |
| 4,826,066 | A | 5/1989 | Koester et al. |
| 4,902,260 | A | 2/1990 | Im |
| 4,916,813 | A | 4/1990 | Elia |
| 4,919,224 | A | * 4/1990 | Shyu ................... G05D 1/0255 |
| | | | 701/2 |
| 4,951,985 | A | 8/1990 | Pong et al. |
| 4,958,068 | A | 9/1990 | Pong et al. |
| 4,962,453 | A | 10/1990 | Pong, Jr. et al. |
| 4,964,265 | A | 10/1990 | Young |
| 4,968,878 | A | 11/1990 | Pong et al. |
| 5,024,728 | A | 6/1991 | Morita et al. |
| 5,025,969 | A | 6/1991 | Koester et al. |
| 5,323,593 | A | 6/1994 | Cline et al. |
| 5,363,633 | A | 11/1994 | Masaru |
| 5,402,110 | A | 3/1995 | Oliver et al. |
| 5,406,778 | A | 4/1995 | Lamb et al. |
| 5,507,137 | A | 4/1996 | Norris |
| 5,540,037 | A | 7/1996 | Lamb et al. |
| 5,548,278 | A | 8/1996 | Oliver et al. |
| 5,553,445 | A | 9/1996 | Lamb et al. |
| 5,561,972 | A | 10/1996 | Rolfe |
| 5,572,856 | A | 11/1996 | Ku |
| 5,577,868 | A | 11/1996 | Chen |
| 5,703,569 | A | 12/1997 | Oliver et al. |
| 5,785,480 | A | 7/1998 | Difeo |
| 5,821,731 | A | 10/1998 | Kuki et al. |
| 5,850,135 | A | 12/1998 | Kuki et al. |
| 5,916,111 | A | 6/1999 | Colens |
| 5,942,869 | A | 8/1999 | Katou et al. |
| 6,076,025 | A | 6/2000 | Ueno et al. |
| 6,101,795 | A | 8/2000 | Diekhans |
| 6,212,917 | B1 | 4/2001 | Rathbun |
| 6,255,793 | B1 | 7/2001 | Peless et al. |
| 6,300,737 | B1 | 10/2001 | Bergvall et al. |
| 6,321,515 | B1 | 11/2001 | Colens |
| D451,931 | S | 12/2001 | Abramson et al. |
| 6,338,013 | B1 | 1/2002 | Ruffner |
| 6,339,735 | B1 | 1/2002 | Peless et al. |
| 6,417,641 | B2 | 7/2002 | Peless et al. |
| 6,442,845 | B2 | 9/2002 | Wheeler et al. |
| 6,443,509 | B1 | 9/2002 | Levin et al. |
| 6,460,253 | B1 | 10/2002 | Wheeler et al. |
| 6,465,982 | B1 | 10/2002 | Bergvall et al. |
| 6,481,515 | B1 | 11/2002 | Kirkpatrick et al. |
| 6,493,613 | B2 | 12/2002 | Peless et al. |
| 6,502,017 | B2 | 12/2002 | Ruffner |
| 6,525,509 | B1 | 2/2003 | Petersson et al. |
| 6,586,908 | B2 | 7/2003 | Petersson et al. |
| 6,594,844 | B2 | 7/2003 | Jones |
| 6,600,981 | B2 | 7/2003 | Ruffner |
| 6,604,348 | B2 | 8/2003 | Hunt |
| 6,611,738 | B2 | 8/2003 | Ruffner |
| 6,615,108 | B1 | 9/2003 | Peless et al. |
| 6,636,847 | B1 | 10/2003 | Spires |
| 6,650,975 | B2 | 11/2003 | Ruffner |
| 6,662,889 | B2 | 12/2003 | De Fazio et al. |
| 6,728,607 | B1 | 4/2004 | Anderson |
| 6,763,282 | B2 | 7/2004 | Glenn et al. |
| 6,779,217 | B2 | 8/2004 | Fisher |
| 6,809,490 | B2 | 10/2004 | Jones et al. |
| 6,813,557 | B2 | 11/2004 | Schmidt et al. |
| 6,850,024 | B2 | 2/2005 | Peless et al. |
| 6,870,792 | B2 | 3/2005 | Chiappetta |
| 6,879,878 | B2 | 4/2005 | Glenn et al. |
| 6,885,912 | B2 | 4/2005 | Peless et al. |
| 6,907,336 | B2 | 6/2005 | Gray et al. |
| 6,934,615 | B2 | 8/2005 | Flann et al. |
| 6,984,952 | B2 | 1/2006 | Peless et al. |
| 7,010,425 | B2 | 3/2006 | Gray et al. |
| 7,024,842 | B2 | 4/2006 | Hunt et al. |
| 7,024,843 | B2 | 4/2006 | Hunt et al. |
| 7,047,712 | B1 | 5/2006 | Hunt et al. |
| 7,053,580 | B2 | 5/2006 | Aldred |
| 7,069,111 | B2 | 6/2006 | Glenn et al. |
| 7,076,348 | B2 | 7/2006 | Bucher et al. |
| 7,079,923 | B2 | 7/2006 | Abramson et al. |
| 7,079,943 | B2 | 7/2006 | Flann et al. |
| 7,085,624 | B2 | 8/2006 | Aldred et al. |
| 7,103,457 | B2 | 9/2006 | Dean |
| 7,110,881 | B2 | 9/2006 | Gray et al. |
| 7,114,318 | B2 | 10/2006 | Poulson et al. |
| 7,117,660 | B1 | 10/2006 | Colens |
| 7,133,746 | B2 | 11/2006 | Abramson et al. |
| 7,146,786 | B2 | 12/2006 | Brandon |
| 7,155,308 | B2 | 12/2006 | Jones |
| 7,155,309 | B2 | 12/2006 | Peless et al. |
| 7,166,983 | B2 | 1/2007 | Jung |
| 7,167,775 | B2 | 1/2007 | Abramson et al. |
| 7,173,391 | B2 | 2/2007 | Jones et al. |
| 7,174,157 | B2 | 2/2007 | Gassho et al. |
| 7,211,980 | B1 | 5/2007 | Bruemmer et al. |
| 7,216,033 | B2 | 5/2007 | Flann et al. |
| 7,227,334 | B2 | 6/2007 | Yang et al. |
| 7,228,214 | B2 | 6/2007 | Flann et al. |
| 7,233,683 | B2 | 6/2007 | Han et al. |
| 7,242,791 | B2 | 7/2007 | Han et al. |
| 7,286,902 | B2 | 10/2007 | Kim et al. |
| D559,867 | S | 1/2008 | Abramson |
| 7,332,890 | B2 | 2/2008 | Cohen et al. |
| 7,349,759 | B2 | 3/2008 | Peless et al. |
| 7,363,994 | B1 | 4/2008 | Defazio et al. |
| 7,369,460 | B2 | 5/2008 | Chiappetta et al. |
| 7,369,924 | B2 | 5/2008 | Han et al. |
| 7,388,343 | B2 | 6/2008 | Jones et al. |
| D573,610 | S | 7/2008 | Abramson |
| 7,395,648 | B1 | 7/2008 | Silbernagel et al. |
| 7,418,328 | B2 | 8/2008 | Romig |
| 7,429,843 | B2 | 9/2008 | Jones et al. |
| 7,430,455 | B2 | 9/2008 | Casey et al. |
| 7,444,214 | B2 | 10/2008 | Cho et al. |
| 7,469,525 | B2 | 12/2008 | Zeigler et al. |
| 7,474,941 | B2 | 1/2009 | Kim et al. |
| 7,480,958 | B2 | 1/2009 | Song et al. |
| 7,480,960 | B2 | 1/2009 | Kim |
| 7,497,053 | B2 | 3/2009 | Nicolet |
| 7,499,774 | B2 | 3/2009 | Barrett et al. |
| 7,499,775 | B2 | 3/2009 | Filippov et al. |
| 7,499,776 | B2 | 3/2009 | Allard et al. |
| 7,499,804 | B2 | 3/2009 | Svendsen et al. |
| 7,505,848 | B2 | 3/2009 | Flann et al. |
| 7,539,557 | B2 | 5/2009 | Yamauchi |
| 7,568,873 | B1 | 8/2009 | Rambo |
| 7,574,282 | B2 | 8/2009 | Petersson et al. |

(56) References Cited

U.S. PATENT DOCUMENTS

| | | | |
|---|---|---|---|
| 7,577,499 B2 | 8/2009 | Sun et al. |
| 7,587,260 B2 | 9/2009 | Bruemmer et al. |
| 7,590,413 B2 | 9/2009 | May |
| 7,596,934 B2 | 10/2009 | Waesche et al. |
| 7,610,122 B2 | 10/2009 | Anderson |
| 7,610,123 B2 | 10/2009 | Han et al. |
| 7,613,543 B2 | 11/2009 | Petersson et al. |
| 7,614,835 B2 | 11/2009 | Kitamura |
| 7,617,890 B2 | 11/2009 | Romig |
| 7,647,144 B2 | 1/2010 | Haegermarck |
| D610,072 S | 2/2010 | Wallet et al. |
| 7,663,333 B2 | 2/2010 | Jones et al. |
| 7,688,676 B2 | 3/2010 | Chiappetta et al. |
| 7,690,066 B2 | 4/2010 | Stoltz et al. |
| D615,920 S | 5/2010 | Kline et al. |
| 7,707,812 B2 | 5/2010 | Cheung |
| 7,720,572 B2 | 5/2010 | Ziegler et al. |
| 7,729,801 B2 | 6/2010 | Abramson |
| 7,730,705 B2 | 6/2010 | Kubinski |
| 7,769,490 B2 | 8/2010 | Abramson et al. |
| 7,787,989 B2 | 8/2010 | Colens |
| 7,792,607 B2 | 9/2010 | Han et al. |
| 7,801,645 B2 | 9/2010 | Taylor et al. |
| 7,805,220 B2 | 9/2010 | Taylor et al. |
| 7,805,676 B2 | 9/2010 | Schemers et al. |
| 7,805,918 B2 | 10/2010 | Silbernagel et al. |
| D628,145 S | 11/2010 | Vaidya |
| 7,840,210 B2 | 11/2010 | May |
| 7,843,431 B2 | 11/2010 | Robbins et al. |
| 7,844,396 B2 | 11/2010 | Zeitzew |
| 7,853,373 B2 | 12/2010 | Traster et al. |
| 7,876,927 B2 | 1/2011 | Han et al. |
| 7,885,738 B2 | 2/2011 | Park et al. |
| 7,908,834 B2 | 3/2011 | Keski-Luopa |
| 7,929,504 B2 | 4/2011 | Wentink et al. |
| 7,953,526 B2 | 5/2011 | Durkos et al. |
| 7,957,837 B2 | 6/2011 | Ziegler et al. |
| 7,957,850 B2 | 6/2011 | Anderson |
| 7,958,709 B2 | 6/2011 | Coleman et al. |
| 7,958,712 B2 | 6/2011 | Cheung |
| 7,979,175 B2 | 7/2011 | Allard et al. |
| 7,992,251 B2 | 8/2011 | Chung et al. |
| 8,020,657 B2 | 9/2011 | Allard et al. |
| 8,022,667 B2 | 9/2011 | Anderson |
| 8,031,086 B2 | 10/2011 | Thacher et al. |
| 8,046,103 B2 | 10/2011 | Abramson et al. |
| 8,065,866 B2 | 11/2011 | Tamas et al. |
| 8,078,338 B2 | 12/2011 | Pack et al. |
| 8,079,433 B2 | 12/2011 | Teague et al. |
| D652,431 S | 1/2012 | Näslund |
| 8,091,105 B2 | 1/2012 | Lee |
| 8,106,626 B2 | 1/2012 | Li et al. |
| 8,107,318 B2 | 1/2012 | Chiappetta et al. |
| 8,108,092 B2 | 1/2012 | Phillips et al. |
| 8,121,730 B2 | 2/2012 | Sung et al. |
| D656,163 S | 3/2012 | Johansson et al. |
| 8,135,498 B2 | 3/2012 | Hyung et al. |
| 8,150,574 B2 | 4/2012 | Han et al. |
| 8,195,333 B2 | 6/2012 | Ziegler et al. |
| 8,195,342 B2 | 6/2012 | Anderson |
| 8,195,358 B2 | 6/2012 | Anderson |
| 8,199,109 B2 | 6/2012 | Robbins et al. |
| 8,200,428 B2 | 6/2012 | Anderson |
| 8,208,907 B2 | 6/2012 | May |
| 8,209,053 B2 | 6/2012 | Kim et al. |
| 8,224,500 B2 | 7/2012 | Anderson |
| 8,224,516 B2 | 7/2012 | Anderson |
| 8,229,618 B2 | 7/2012 | Tolstedt et al. |
| 8,234,010 B2 | 7/2012 | Thompson et al. |
| 8,234,848 B2 | 8/2012 | Messina et al. |
| 8,237,389 B2 | 8/2012 | Fitch et al. |
| 8,239,992 B2 | 8/2012 | Schnittman et al. |
| 8,255,092 B2 | 8/2012 | Phillips et al. |
| 8,271,132 B2 | 9/2012 | Nielsen et al. |
| 8,292,007 B2 | 10/2012 | Defazio et al. |

| | | | |
|---|---|---|---|
| 8,295,125 B2 | 10/2012 | Chiappetta et al. |
| 8,295,979 B2 | 10/2012 | Thacher et al. |
| 8,297,032 B2 | 10/2012 | Ninomiya et al. |
| 8,297,903 B2 | 10/2012 | Hohmann et al. |
| 8,306,659 B2 | 11/2012 | Abramson et al. |
| 8,311,674 B2 | 11/2012 | Abramson |
| 8,326,469 B2 | 12/2012 | Phillips et al. |
| 8,336,282 B2 | 12/2012 | Messina et al. |
| 8,340,438 B2 | 12/2012 | Anderson |
| 8,347,444 B2 | 1/2013 | Schnittman et al. |
| 8,350,810 B2 | 1/2013 | Robbins et al. |
| 8,352,113 B2 | 1/2013 | Johnson et al. |
| 8,370,985 B2 | 2/2013 | Schnittman et al. |
| 8,390,251 B2 | 3/2013 | Cohen et al. |
| 8,392,044 B2 | 3/2013 | Thompson et al. |
| 8,392,065 B2 | 3/2013 | Tolstedt et al. |
| 8,396,592 B2 | 3/2013 | Jones et al. |
| 8,396,597 B2 | 3/2013 | Anderson |
| 8,396,611 B2 | 3/2013 | Phillips et al. |
| D679,294 S | 4/2013 | Tajik et al. |
| D679,295 S | 4/2013 | Tajik et al. |
| 8,412,377 B2 | 4/2013 | Casey et al. |
| 8,428,776 B2 | 4/2013 | Letsky |
| 8,433,468 B2 | 4/2013 | Johnson et al. |
| 8,438,695 B2 | 5/2013 | Gilbert, Jr. et al. |
| 8,442,700 B2 | 5/2013 | Anderson |
| 8,447,440 B2 | 5/2013 | Phillips et al. |
| 8,447,454 B2 | 5/2013 | Biber et al. |
| 8,461,803 B2 | 6/2013 | Cohen et al. |
| 8,463,438 B2 | 6/2013 | Jones et al. |
| 8,467,928 B2 | 6/2013 | Anderson |
| 8,471,133 B1 | 6/2013 | Lin |
| 8,473,187 B2 | 6/2013 | Kammel et al. |
| 8,476,867 B2 | 7/2013 | Li et al. |
| 8,478,442 B2 | 7/2013 | Casey et al. |
| 8,498,788 B2 | 7/2013 | Kondekar |
| D688,276 S | 8/2013 | Näslund |
| 8,508,329 B2 | 8/2013 | Veenstra |
| 8,521,329 B2 | 8/2013 | Park et al. |
| 8,532,821 B2 | 9/2013 | Ko |
| 8,532,822 B2 | 9/2013 | Abramson et al. |
| 8,560,145 B2 | 10/2013 | Anderson |
| 8,565,920 B2 | 10/2013 | Casey et al. |
| 8,572,266 B2 | 10/2013 | Larocca |
| 8,577,517 B2 | 11/2013 | Phillips et al. |
| 8,577,538 B2 | 11/2013 | Lenser et al. |
| 8,594,842 B2 | 11/2013 | Abramson |
| 8,599,645 B2 | 12/2013 | Chiappetta et al. |
| 8,619,141 B2 | 12/2013 | Anderson |
| 8,634,960 B2 | 1/2014 | Sandin et al. |
| 8,635,015 B2 | 1/2014 | Anderson |
| 8,655,539 B2 | 2/2014 | Yoo et al. |
| 8,660,879 B2 | 2/2014 | Machtelinck |
| 8,666,550 B2 | 3/2014 | Anderson et al. |
| 8,666,554 B2 | 3/2014 | Anderson |
| 8,666,587 B2 | 3/2014 | Anderson |
| 8,671,656 B2 | 3/2014 | Paden |
| 8,676,378 B2 | 3/2014 | Tian et al. |
| 8,706,339 B2 | 4/2014 | Thompson et al. |
| 8,712,623 B2 | 4/2014 | Sato et al. |
| 8,725,316 B2 | 5/2014 | Thompson et al. |
| 8,726,454 B2 | 5/2014 | Gilbert, Jr. et al. |
| 8,731,295 B2 | 5/2014 | Schepelmann et al. |
| 8,739,057 B2 | 5/2014 | Cheong et al. |
| 8,744,626 B2 | 6/2014 | Johnson et al. |
| 8,744,663 B2 | 6/2014 | Sato et al. |
| 8,749,196 B2 | 6/2014 | Cohen et al. |
| 8,760,397 B2 | 6/2014 | Robbins et al. |
| 8,761,935 B2 | 6/2014 | Casey et al. |
| 8,781,627 B2 | 7/2014 | Sandin et al. |
| 8,788,092 B2 | 7/2014 | Casey et al. |
| 8,818,567 B2 | 8/2014 | Anderson |
| 8,818,602 B2 | 8/2014 | Yamamura et al. |
| 8,838,274 B2 | 9/2014 | Jones et al. |
| 8,838,291 B2 | 9/2014 | Jägenstedt et al. |
| 8,839,477 B2 | 9/2014 | Schnittman et al. |
| 8,843,244 B2 | 9/2014 | Phillips et al. |
| 8,854,001 B2 | 10/2014 | Cohen et al. |
| 8,856,150 B2 | 10/2014 | Machtelinck |

(56)        References Cited

U.S. PATENT DOCUMENTS

| | | | |
|---|---|---|---|
| 8,868,237 | B2 | 10/2014 | Sandin et al. |
| 8,869,337 | B2 | 10/2014 | Sumonthee |
| 8,869,369 | B1 | 10/2014 | Roach |
| 8,874,269 | B2 | 10/2014 | Biber et al. |
| 8,874,300 | B2 | 10/2014 | Allard et al. |
| D718,339 | S | 11/2014 | Damshak et al. |
| D718,340 | S | 11/2014 | Damshak et al. |
| D718,341 | S | 11/2014 | Gur et al. |
| 8,892,352 | B2 | 11/2014 | Petereit et al. |
| D718,793 | S | 12/2014 | Gur et al. |
| 8,911,192 | B2 | 12/2014 | Hohmann et al. |
| 8,918,241 | B2 | 12/2014 | Chen et al. |
| 8,925,667 | B2 | 1/2015 | Chen |
| 8,930,023 | B2 | 1/2015 | Gutmann et al. |
| 8,930,024 | B2 | 1/2015 | Abramson |
| 8,938,318 | B2 | 1/2015 | Bergström et al. |
| 8,942,862 | B2 | 1/2015 | Markusson et al. |
| 8,954,193 | B2 | 2/2015 | Sandin et al. |
| 8,958,911 | B2 | 2/2015 | Wong et al. |
| 8,958,939 | B2 | 2/2015 | Einecke et al. |
| 8,965,578 | B2 | 2/2015 | Versteeg et al. |
| 8,989,946 | B2 | 3/2015 | Anderson |
| 8,989,972 | B2 | 3/2015 | Anderson |
| 8,996,171 | B2 | 3/2015 | Anderson et al. |
| 8,996,177 | B2 | 3/2015 | Coenen |
| D729,280 | S | 5/2015 | Näslund et al. |
| 9,021,777 | B2 | 5/2015 | Johnson et al. |
| 9,026,299 | B2 | 5/2015 | Johnson et al. |
| 9,026,302 | B2 | 5/2015 | Stout et al. |
| 9,031,050 | B2 | 5/2015 | Cherian et al. |
| 9,037,294 | B2 | 5/2015 | Chung et al. |
| 9,043,016 | B2 | 5/2015 | Filippov et al. |
| 9,043,129 | B2 | 5/2015 | Bonefas et al. |
| D731,402 | S | 6/2015 | Tedesco et al. |
| 9,043,952 | B2 | 6/2015 | Sandin et al. |
| 9,043,953 | B2 | 6/2015 | Sandin et al. |
| 9,072,218 | B2 | 7/2015 | Johnson et al. |
| 9,072,219 | B2 | 7/2015 | Da Rocha et al. |
| 9,079,303 | B2 | 7/2015 | Abramson et al. |
| 9,093,868 | B2 | 7/2015 | Baxter |
| 9,104,204 | B2 | 8/2015 | Jones et al. |
| 9,104,206 | B2 | 8/2015 | Biber et al. |
| 9,110,471 | B2 | 8/2015 | Pack et al. |
| 9,113,595 | B2 | 8/2015 | Roth et al. |
| 9,119,341 | B2 | 9/2015 | Jägenstedt |
| 9,137,943 | B2 | 9/2015 | Einecke et al. |
| 9,144,193 | B2 | 9/2015 | Paden |
| 9,182,763 | B2 | 11/2015 | Park et al. |
| 9,186,800 | B2 | 11/2015 | Shin et al. |
| 9,188,980 | B2 | 11/2015 | Anderson |
| 9,188,983 | B2 | 11/2015 | Stout et al. |
| 9,195,256 | B2 | 11/2015 | Robbins et al. |
| D745,897 | S | 12/2015 | Mehra et al. |
| 9,213,934 | B1 | 12/2015 | Versteeg et al. |
| 9,215,957 | B2 | 12/2015 | Cohen et al. |
| 9,223,312 | B2 | 12/2015 | Goel et al. |
| 9,232,692 | B2 | 1/2016 | Björn et al. |
| 9,235,214 | B2 | 1/2016 | Anderson |
| 9,236,637 | B2 | 1/2016 | Anderson |
| 9,241,441 | B2 | 1/2016 | Björn et al. |
| D748,568 | S | 2/2016 | Helin et al. |
| 9,258,942 | B2 | 2/2016 | Biber et al. |
| 9,268,331 | B2 | 2/2016 | Abramson et al. |
| 9,276,419 | B2 | 3/2016 | Borinato et al. |
| 9,278,690 | B2 | 3/2016 | Smith |
| 9,301,444 | B2 | 4/2016 | Campbell et al. |
| D757,637 | S | 5/2016 | Horowitz |
| 9,327,407 | B2 | 5/2016 | Jones et al. |
| 9,335,767 | B2 | 5/2016 | Jang et al. |
| 9,338,130 | B2 | 5/2016 | Von Huben et al. |
| 9,348,897 | B2 | 5/2016 | Shoham et al. |
| 9,349,187 | B2 | 5/2016 | Schepelmann et al. |
| D758,455 | S | 6/2016 | Maibach et al. |
| D759,577 | S | 6/2016 | Wang et al. |
| 9,357,699 | B2 | 6/2016 | Elonsson |
| 9,363,945 | B2 | 6/2016 | Jägenstedt et al. |
| 9,375,842 | B2 | 6/2016 | Shamlian et al. |
| 9,376,027 | B2 | 6/2016 | Harris |
| D760,806 | S | 7/2016 | Cmich et al. |
| 9,380,742 | B2 | 7/2016 | Biber et al. |
| 9,405,294 | B2 | 8/2016 | Jägenstedt et al. |
| 9,412,515 | B2 | 8/2016 | Hyde et al. |
| 9,419,453 | B2 | 8/2016 | Andersson et al. |
| 9,420,741 | B2 | 8/2016 | Balutis et al. |
| 9,421,879 | B2 | 8/2016 | Pastoor et al. |
| 9,426,946 | B2 | 8/2016 | Fisher |
| 9,429,950 | B2 | 8/2016 | Sjöholm |
| 9,436,185 | B2 | 9/2016 | Schnittman |
| 9,439,348 | B2 | 9/2016 | Biber et al. |
| 9,439,367 | B2 | 9/2016 | Abhyanker |
| 9,440,350 | B2 | 9/2016 | Mou et al. |
| 9,440,354 | B2 | 9/2016 | Gutmann et al. |
| 9,446,521 | B2 | 9/2016 | Casey et al. |
| 9,452,525 | B2 | 9/2016 | Ziegler et al. |
| 9,452,685 | B2 | 9/2016 | Hyde et al. |
| D769,180 | S | 10/2016 | Wang et al. |
| 9,456,545 | B2 | 10/2016 | Biber |
| 9,457,677 | B2 | 10/2016 | Hyde et al. |
| 9,463,704 | B2 | 10/2016 | Hyde et al. |
| 9,471,063 | B2 | 10/2016 | Ouyang |
| 9,480,201 | B2 | 11/2016 | Maruyama et al. |
| 9,483,055 | B2 | 11/2016 | Johnson et al. |
| 9,491,904 | B2 | 11/2016 | Jägenstedt et al. |
| 9,497,901 | B2 | 11/2016 | Willgert |
| 9,505,140 | B1 | 11/2016 | Fay et al. |
| 9,510,505 | B2 | 12/2016 | Halloran et al. |
| 9,516,806 | B2 | 12/2016 | Yamauchi et al. |
| D776,169 | S | 1/2017 | Cmich et al. |
| 9,532,688 | B1 | 1/2017 | Ebrahimi Afrouzi et al. |
| 9,538,702 | B2 | 1/2017 | Balutis et al. |
| 9,543,680 | B2 | 1/2017 | Elonsson |
| 9,545,032 | B2 | 1/2017 | Baer et al. |
| 9,550,294 | B2 | 1/2017 | Cohen et al. |
| 9,554,508 | B2 | 1/2017 | Balutis et al. |
| 9,559,461 | B1 | 1/2017 | Diehr |
| 9,560,800 | B2 | 2/2017 | Reichen et al. |
| 9,563,204 | B2 | 2/2017 | Willgert |
| 9,573,275 | B2 | 2/2017 | Reigo et al. |
| D781,349 | S | 3/2017 | Cmich |
| D781,926 | S | 3/2017 | Al-hashimi et al. |
| 9,586,563 | B2 | 3/2017 | Kanai et al. |
| 9,590,862 | B2 | 3/2017 | Larocca |
| 9,606,541 | B2 | 3/2017 | Abramson |
| 9,622,399 | B2 | 4/2017 | Kremmer et al. |
| 9,623,557 | B2 | 4/2017 | Gutmann et al. |
| 9,630,319 | B2 | 4/2017 | Vicenti |
| 9,632,489 | B2 | 4/2017 | Biber et al. |
| 9,699,964 | B2 | 7/2017 | Roth et al. |
| 9,701,020 | B1 | 7/2017 | Ebrahimi Afrouzi |
| 9,711,767 | B2 | 7/2017 | Juenger et al. |
| 9,713,302 | B2 | 7/2017 | Sandin et al. |
| 9,713,303 | B2 | 7/2017 | Jägenstedt et al. |
| D794,089 | S | 8/2017 | Maibach et al. |
| 9,717,175 | B2 | 8/2017 | Fay, II et al. |
| 9,720,417 | B2 | 8/2017 | Reigo et al. |
| 9,723,782 | B2 | 8/2017 | Roth et al. |
| 9,736,981 | B2 | 8/2017 | Roth et al. |
| 9,740,210 | B2 | 8/2017 | Sjöholm |
| D796,555 | S | 9/2017 | Landberg et al. |
| D797,530 | S | 9/2017 | Cmich |
| 9,750,183 | B2 | 9/2017 | Haun |
| 9,766,627 | B2 | 9/2017 | Jägenstedt et al. |
| D799,555 | S | 10/2017 | Cmich |
| 9,785,148 | B2 | 10/2017 | Yun |
| 9,788,481 | B2 | 10/2017 | Das et al. |
| 9,788,483 | B2 | 10/2017 | Roth et al. |
| 9,791,860 | B2 | 10/2017 | Phillips et al. |
| 9,804,604 | B2 | 10/2017 | Mattsson et al. |
| 9,807,925 | B2 | 11/2017 | Johnson |
| 9,807,930 | B1 | 11/2017 | Lydon et al. |
| 9,817,398 | B2 | 11/2017 | Yamamura et al. |
| 9,820,433 | B2 | 11/2017 | Borinato |
| 9,826,678 | B2 | 11/2017 | Balutis et al. |
| 9,829,891 | B2 | 11/2017 | Smith et al. |

(56) References Cited

U.S. PATENT DOCUMENTS

| | | | |
|---|---|---|---|
| 9,841,768 B2 | 12/2017 | Hiramatsu et al. | |
| 9,844,876 B2 | 12/2017 | Chung et al. | |
| 9,848,529 B2 | 12/2017 | Franzius et al. | |
| 9,848,532 B2 | 12/2017 | Keski-Luopa et al. | |
| 9,851,718 B2 | 12/2017 | Booher | |
| 9,853,468 B2 | 12/2017 | Ireland | |
| D807,281 S | 1/2018 | Irwin et al. | |
| D807,811 S | 1/2018 | Wang et al. | |
| 9,854,737 B2 | 1/2018 | Yamauchi et al. | |
| 9,854,956 B2 | 1/2018 | Song et al. | |
| 9,857,025 B2 | 1/2018 | Gottinger et al. | |
| 9,861,035 B2 | 1/2018 | Kruckeberg et al. | |
| 9,872,437 B2 | 1/2018 | Markusson et al. | |
| 9,874,876 B2 | 1/2018 | Shimamura | |
| 9,876,370 B2 | 1/2018 | Yamamura et al. | |
| D810,664 S | 2/2018 | Sgreccia et al. | |
| D810,665 S | 2/2018 | Sgreccia et al. | |
| 9,884,423 B2 | 2/2018 | Cohen et al. | |
| 9,894,836 B2 | 2/2018 | Garton | |
| 9,895,808 B2 | 2/2018 | Stout et al. | |
| 9,901,028 B2 | 2/2018 | Hans | |
| 9,903,947 B2 | 2/2018 | Das et al. | |
| 9,924,632 B2 | 3/2018 | Chenevert et al. | |
| 9,924,847 B2 | 3/2018 | Gottinger et al. | |
| 9,931,007 B2 | 4/2018 | Morin et al. | |
| 9,931,008 B2 | 4/2018 | Yoo et al. | |
| 9,931,750 B2 | 4/2018 | Cohen et al. | |
| 9,936,635 B2 | 4/2018 | Gottinger et al. | |
| 9,968,024 B2 | 5/2018 | Haneda et al. | |
| 9,972,098 B1 | 5/2018 | Ebrahimi Afrouzi et al. | |
| 9,983,586 B2 | 5/2018 | Borinato | |
| 10,011,180 B2 | 7/2018 | Hyde et al. | |
| 10,021,830 B2 | 7/2018 | Doughty | |
| 10,024,964 B2 | 7/2018 | Pierce et al. | |
| 10,029,368 B2 | 7/2018 | Wolowelsky et al. | |
| 10,031,527 B2 | 7/2018 | Björn | |
| 10,034,421 B2 | 7/2018 | Doughty et al. | |
| 10,035,270 B2 | 7/2018 | Fay et al. | |
| 10,037,038 B2 | 7/2018 | Sandin et al. | |
| 10,046,130 B2 | 8/2018 | Molden et al. | |
| 10,054,924 B2 | 8/2018 | Willgert | |
| 10,057,813 B1 | 8/2018 | Likar et al. | |
| 10,067,232 B2 | 9/2018 | Halloran et al. | |
| 10,070,764 B2 | 9/2018 | Schnittman et al. | |
| 10,071,475 B2 | 9/2018 | Lin et al. | |
| 10,078,336 B2 | 9/2018 | Reigo et al. | |
| 10,080,326 B2 | 9/2018 | Yamamura et al. | |
| D830,418 S | 10/2018 | Näslund et al. | |
| 10,091,930 B2 | 10/2018 | Balutis et al. | |
| 10,093,194 B2 | 10/2018 | Hyde et al. | |
| 10,093,259 B2 | 10/2018 | Pan | |
| 10,098,277 B2 | 10/2018 | Ouyang | |
| 10,104,835 B2 | 10/2018 | Köhler et al. | |
| 10,105,838 B2 | 10/2018 | Mou et al. | |
| 10,108,198 B2 | 10/2018 | Björn et al. | |
| D834,185 S | 11/2018 | Molden et al. | |
| D834,504 S | 11/2018 | Ropars | |
| D834,505 S | 11/2018 | Wang et al. | |
| 10,117,379 B2 | 11/2018 | Guiet et al. | |
| 10,123,479 B2 | 11/2018 | Ladd, Jr. et al. | |
| 10,124,494 B2 | 11/2018 | Outa et al. | |
| 10,131,057 B2 | 11/2018 | Patel et al. | |
| 10,136,576 B2 | 11/2018 | Reigo | |
| 10,149,430 B2 | 12/2018 | Bergström et al. | |
| 10,152,062 B2 | 12/2018 | Schnittman | |
| 10,157,334 B2 | 12/2018 | Schepelmann et al. | |
| 10,159,180 B2 | 12/2018 | Balutis et al. | |
| 10,162,359 B2 | 12/2018 | Johnson et al. | |
| D837,150 S | 1/2019 | Näslund et al. | |
| 10,165,725 B2 | 1/2019 | Sugumaran et al. | |
| 10,172,282 B2 | 1/2019 | Svensson et al. | |
| 10,178,826 B2 | 1/2019 | Jägenstedt et al. | |
| 10,183,400 B2 | 1/2019 | Trigui et al. | |
| 10,183,701 B2 | 1/2019 | Ebrahimi Afrouzi et al. | |
| 10,185,325 B2 | 1/2019 | Reigo et al. | |
| 10,201,261 B2 | 2/2019 | Tanaka et al. | |
| 10,207,557 B2 | 2/2019 | Björn et al. | |
| 10,212,880 B2 | 2/2019 | Cmich et al. | |
| 10,238,026 B2 | 3/2019 | Köhler et al. | |
| D845,877 S | 4/2019 | Geng et al. | |
| 10,244,678 B2 | 4/2019 | Lydon et al. | |
| 10,246,907 B2 | 4/2019 | Shen | |
| 10,257,976 B2 | 4/2019 | Ladd, Jr. et al. | |
| 10,259,498 B2 | 4/2019 | Jägenstedt et al. | |
| 10,268,206 B2 | 4/2019 | Yamamura | |
| 10,274,954 B2 | 4/2019 | Balutis et al. | |
| D848,488 S | 5/2019 | Cmich | |
| 10,281,912 B2 | 5/2019 | Hollister | |
| 10,281,922 B2 | 5/2019 | Smith et al. | |
| 10,299,431 B2 | 5/2019 | Ladd, Jr. et al. | |
| 10,299,652 B2 | 5/2019 | Gilbert, Jr. et al. | |
| D852,232 S | 6/2019 | Eidson et al. | |
| 10,310,510 B2 | 6/2019 | Mannefred et al. | |
| 10,315,306 B2 | 6/2019 | Abramson | |
| 10,321,625 B2 | 6/2019 | Einecke et al. | |
| 10,327,384 B2 | 6/2019 | Johansson et al. | |
| D853,447 S | 7/2019 | Mehra et al. | |
| D853,448 S | 7/2019 | Mehra et al. | |
| D853,449 S | 7/2019 | Mehra et al. | |
| 10,338,602 B2 | 7/2019 | Grufman et al. | |
| 10,343,280 B1 | 7/2019 | Ebrahimi Afrouzi | |
| 10,346,995 B1 | 7/2019 | Ebrahimi Afrouzi | |
| 10,353,399 B2 | 7/2019 | Ebrahimi Afrouzi | |
| 10,362,730 B2 | 7/2019 | Ladd, Jr. et al. | |
| 10,365,661 B2 | 7/2019 | Jägenstedt et al. | |
| 10,369,705 B2 | 8/2019 | Trigui et al. | |
| 10,372,140 B2 | 8/2019 | Sun et al. | |
| 10,375,880 B2 | 8/2019 | Morin et al. | |
| 10,377,035 B2 | 8/2019 | He et al. | |
| 10,379,172 B2 | 8/2019 | Kleiner et al. | |
| 10,384,346 B2 | 8/2019 | Hickman et al. | |
| 10,386,844 B2 | 8/2019 | Wilcox et al. | |
| 10,390,483 B2 | 8/2019 | Balutis et al. | |
| D858,424 S | 9/2019 | Chattopadhyay | |
| 10,405,488 B2 | 9/2019 | Kamfors et al. | |
| 10,425,488 B2 | 9/2019 | Larsén et al. | |
| D864,256 S | 10/2019 | Eidson et al. | |
| 10,426,083 B2 | 10/2019 | Doughty | |
| 10,440,879 B2 | 10/2019 | Björn et al. | |
| 10,442,083 B2 | 10/2019 | Wolowelsky et al. | |
| 10,444,756 B2 | 10/2019 | Kamfors et al. | |
| 10,444,757 B2 | 10/2019 | Dong et al. | |
| 10,444,760 B2 | 10/2019 | Grufman et al. | |
| 10,448,565 B2 | 10/2019 | Mannefred et al. | |
| 10,454,287 B2 | 10/2019 | Yamamura et al. | |
| 10,456,924 B2 | 10/2019 | Outa et al. | |
| 10,459,452 B2 | 10/2019 | Eagling et al. | |
| 10,462,961 B2 | 11/2019 | Tjernberg et al. | |
| 10,463,215 B2 | 11/2019 | Morin et al. | |
| 10,464,206 B2 | 11/2019 | Frisby et al. | |
| 10,466,710 B2 | 11/2019 | Biber et al. | |
| 10,485,164 B2 | 11/2019 | Letsky | |
| 10,488,865 B2 | 11/2019 | Afrouzi et al. | |
| 10,496,262 B1 | 12/2019 | Ebrahimi Afrouzi et al. | |
| 10,500,722 B2 | 12/2019 | Vicenti | |
| 10,514,701 B2 | 12/2019 | Windorfer | |
| 10,517,211 B2 | 12/2019 | Öhrlund et al. | |
| 10,518,651 B2 | 12/2019 | Svensson et al. | |
| 10,520,113 B1 | 12/2019 | Thompson | |
| 10,542,667 B2 | 1/2020 | Song et al. | |
| 10,542,670 B2 | 1/2020 | Cmich et al. | |
| 10,549,646 B2 | 2/2020 | Reynolds et al. | |
| 10,551,844 B2 | 2/2020 | Biber et al. | |
| 10,552,770 B2 | 2/2020 | Brough et al. | |
| 10,555,456 B2 | 2/2020 | Borinato | |
| 10,555,457 B2 | 2/2020 | Song et al. | |
| 10,561,063 B2 | 2/2020 | Hasegawa et al. | |
| 10,568,258 B2 | 2/2020 | Wahlgren | |
| 10,571,905 B2 | 2/2020 | Yamamura | |
| 10,571,928 B2 | 2/2020 | Sun et al. | |
| 10,575,465 B2 | 3/2020 | Ran et al. | |
| 10,575,696 B2 | 3/2020 | O'Brien et al. | |
| 10,583,562 B2 | 3/2020 | Stout et al. | |
| 10,588,255 B2 | 3/2020 | Song et al. | |

(56) References Cited

U.S. PATENT DOCUMENTS

| | | | |
|---|---|---|---|
| 10,589,418 B2 | 3/2020 | Gordon-Carroll et al. |
| 10,589,432 B2 | 3/2020 | Al Nahwi et al. |
| 10,589,433 B2 | 3/2020 | Al Nahwi et al. |
| 10,592,998 B2 | 3/2020 | Eijdenberg et al. |
| 10,594,117 B2 | 3/2020 | Song et al. |
| 10,595,459 B2 | 3/2020 | Aposhian et al. |
| 10,595,692 B2 | 3/2020 | Morin et al. |
| 10,598,793 B2 | 3/2020 | Öhrlund et al. |
| 10,599,154 B2 | 3/2020 | Dean et al. |
| 10,606,275 B2 | 3/2020 | Dean et al. |
| 10,606,279 B2 | 3/2020 | Grufman et al. |
| D880,532 S | 4/2020 | Gunnarsson et al. |
| D881,252 S | 4/2020 | Vestberg et al. |
| D882,640 S | 4/2020 | Estey |
| 10,609,862 B2 | 4/2020 | Wu et al. |
| 10,611,028 B1 | 4/2020 | Zhou et al. |
| 10,612,929 B2 | 4/2020 | Afrouzi et al. |
| 10,613,541 B1 | 4/2020 | Ebrahimi Afrouzi et al. |
| 10,621,537 B2 | 4/2020 | Ben-Alexander |
| D884,762 S | 5/2020 | Gunnarsson et al. |
| D884,763 S | 5/2020 | Gunnarsson et al. |
| 10,643,377 B2 | 5/2020 | Grufman et al. |
| 10,646,997 B2 | 5/2020 | Reigo et al. |
| 10,649,466 B2 | 5/2020 | Holmström et al. |
| 10,651,594 B1 | 5/2020 | Tsai et al. |
| 10,653,057 B2 | 5/2020 | Choi et al. |
| 10,653,058 B2 | 5/2020 | Yamanaka et al. |
| 10,653,282 B2 | 5/2020 | Song et al. |
| 10,656,652 B2 | 5/2020 | Dean et al. |
| D887,464 S | 6/2020 | Gunnarsson et al. |
| D887,465 S | 6/2020 | Gunnarsson et al. |
| D887,466 S | 6/2020 | Gunnarsson et al. |
| 10,670,406 B2 | 6/2020 | Eguchi et al. |
| 10,673,630 B2 | 6/2020 | Pakkan et al. |
| 10,674,659 B2 | 6/2020 | Ladd, Jr. et al. |
| 10,674,660 B2 | 6/2020 | Matsuzawa et al. |
| 10,681,863 B2 | 6/2020 | Hans et al. |
| 10,681,864 B2 | 6/2020 | Matt et al. |
| 10,691,000 B2 | 6/2020 | Du et al. |
| 10,698,417 B2 | 6/2020 | Churavy et al. |
| D889,517 S | 7/2020 | Prybor et al. |
| 10,716,258 B2 | 7/2020 | Pellenc et al. |
| 10,721,860 B2 | 7/2020 | Liljedahl |
| D892,187 S | 8/2020 | Maggard |
| 10,737,369 B2 | 8/2020 | Steinhauser et al. |
| 10,737,395 B2 | 8/2020 | Wolff et al. |
| 10,738,495 B2 | 8/2020 | Durvasula et al. |
| 10,739,769 B2 | 8/2020 | Dean et al. |
| 10,747,413 B2 | 8/2020 | Schneider et al. |
| 10,750,667 B2 | 8/2020 | Yamauchi et al. |
| 10,750,918 B2 | 8/2020 | Jung et al. |
| D896,737 S | 9/2020 | Phely |
| 10,758,100 B2 | 9/2020 | Cohen et al. |
| 10,765,284 B2 | 9/2020 | Song et al. |
| 10,766,147 B2 | 9/2020 | Trigui et al. |
| 10,777,000 B2 | 9/2020 | Grufman et al. |
| 10,782,705 B2 | 9/2020 | Reigo et al. |
| 10,785,907 B2 | 9/2020 | Doughty et al. |
| 10,788,832 B2 | 9/2020 | Nykamp |
| 10,791,684 B2 | 10/2020 | He et al. |
| 10,795,377 B2 | 10/2020 | Afrouzi et al. |
| 10,806,075 B2 | 10/2020 | Grufman et al. |
| 10,809,071 B2 | 10/2020 | Afrouzi et al. |
| 10,809,740 B2 | 10/2020 | Reinert et al. |
| 10,814,495 B2 | 10/2020 | Patel et al. |
| 10,820,493 B2 | 11/2020 | Ritzer et al. |
| 10,824,163 B2 | 11/2020 | Einecke et al. |
| 10,842,074 B2 | 11/2020 | Jägenstedt et al. |
| 10,843,734 B1 | 11/2020 | Ebrahimi Afrouzi et al. |
| 10,843,735 B1 | 11/2020 | Ebrahimi Afrouzi et al. |
| 10,845,481 B2 | 11/2020 | Pierce et al. |
| 10,845,804 B2 | 11/2020 | Holgersson et al. |
| D906,373 S | 12/2020 | Morin et al. |
| 10,849,267 B2 | 12/2020 | Strandberg et al. |
| 10,849,270 B2 | 12/2020 | Johansson et al. |
| 10,850,400 B2 | 12/2020 | Park |
| 10,852,735 B2 | 12/2020 | Tan et al. |
| 10,852,738 B2 | 12/2020 | Mannefred et al. |
| 10,856,467 B2 | 12/2020 | Maggard |
| 10,858,041 B2 | 12/2020 | Jägenstedt et al. |
| 10,869,432 B2 | 12/2020 | Wykman et al. |
| 10,873,194 B2 | 12/2020 | Lydon et al. |
| 10,874,045 B2 | 12/2020 | Balutis et al. |
| 10,874,049 B2 | 12/2020 | Ladd, Jr. et al. |
| 10,874,051 B2 | 12/2020 | Kasai et al. |
| 10,874,278 B2 | 12/2020 | Matt et al. |
| D908,597 S | 1/2021 | Meng et al. |
| D908,598 S | 1/2021 | Meng et al. |
| 10,882,187 B2 | 1/2021 | Li et al. |
| 10,888,046 B2 | 1/2021 | Gorenflo et al. |
| 10,890,921 B2 | 1/2021 | Gillett |
| 10,895,876 B2 | 1/2021 | Arenz et al. |
| 10,899,171 B2 | 1/2021 | Cmich |
| 10,912,253 B2 | 2/2021 | Einecke et al. |
| 10,928,833 B2 | 2/2021 | Reigo |
| 10,932,409 B2 | 3/2021 | Ingvalson et al. |
| 10,935,383 B1 | 3/2021 | Ebrahimi Afrouzi et al. |
| 10,939,611 B2 | 3/2021 | Liljedahl |
| 10,952,578 B2 | 3/2021 | Gill et al. |
| 10,959,371 B2 | 3/2021 | Zhou et al. |
| 10,966,368 B2 | 4/2021 | Desai et al. |
| 10,967,752 B2 | 4/2021 | Liu et al. |
| 10,973,168 B2 | 4/2021 | Hans et al. |
| 10,986,775 B2 | 4/2021 | Matt et al. |
| 10,986,971 B1 | 4/2021 | Ebrahimi Afrouzi |
| 10,993,598 B2 | 5/2021 | Park et al. |
| 11,003,192 B2 | 5/2021 | Dalfra et al. |
| 11,009,869 B2 | 5/2021 | Moroi et al. |
| 11,013,655 B1 | 5/2021 | Ebrahimi Afrouzi et al. |
| 11,014,460 B2 | 5/2021 | Schnittman et al. |
| 11,016,481 B2 | 5/2021 | Gustavsson et al. |
| D922,444 S | 6/2021 | Morin et al. |
| 11,019,975 B2 | 6/2021 | Jang et al. |
| 11,020,857 B2 | 6/2021 | Xiong et al. |
| 11,039,582 B2 | 6/2021 | Gilliam et al. |
| 11,039,583 B2 | 6/2021 | Gilliam et al. |
| 11,044,844 B2 | 6/2021 | Keski-luopa et al. |
| 11,048,268 B2 | 6/2021 | Ouyang |
| 11,051,449 B2 | 7/2021 | Bergh et al. |
| 11,051,671 B2 | 7/2021 | Jang et al. |
| 11,052,535 B2 | 7/2021 | Parks, II et al. |
| 11,052,540 B2 | 7/2021 | Stout et al. |
| 11,054,822 B2 | 7/2021 | Özmen |
| 11,054,836 B2 | 7/2021 | Wang et al. |
| 11,058,053 B2 | 7/2021 | Patel et al. |
| 11,064,652 B2 | 7/2021 | Matt et al. |
| 11,065,762 B2 | 7/2021 | Sakai et al. |
| 11,069,082 B1 | 7/2021 | Ebrahimi Afrouzi et al. |
| 11,071,429 B2 | 7/2021 | Jang et al. |
| 11,072,250 B2 | 7/2021 | Gilbert, Jr. et al. |
| 11,072,255 B2 | 7/2021 | Svensson et al. |
| 11,075,910 B2 | 7/2021 | Dean et al. |
| 11,076,529 B2 | 8/2021 | Chen et al. |
| 11,079,755 B2 | 8/2021 | Schlacks, IV et al. |
| 11,084,172 B2 | 8/2021 | Casey et al. |
| 11,089,732 B2 | 8/2021 | Jägenstedt et al. |
| 11,097,428 B2 | 8/2021 | Al Nahwi et al. |
| 11,099,572 B2 | 8/2021 | Cestonaro et al. |
| 11,104,006 B2 | 8/2021 | Fay et al. |
| 11,105,109 B2 | 8/2021 | Durvasula et al. |
| 11,106,215 B2 | 8/2021 | Dalfra |
| 11,109,528 B2 | 9/2021 | Strang |
| 11,109,731 B2 | 9/2021 | Jang et al. |
| 11,112,505 B2 | 9/2021 | Öhrlund et al. |
| 11,112,532 B2 | 9/2021 | Jägenstedt et al. |
| 11,115,798 B2 | 9/2021 | Beaulieu et al. |
| 11,117,264 B2 | 9/2021 | Tsai et al. |
| 11,119,496 B1 | 9/2021 | Ebrahimi Afrouzi et al. |
| 11,126,193 B2 | 9/2021 | Mannefred et al. |
| 11,134,609 B2 | 10/2021 | Willgert et al. |
| 11,140,815 B2 | 10/2021 | Matt et al. |
| 11,140,819 B2 | 10/2021 | Chen et al. |
| 11,141,034 B2 | 10/2021 | Jang et al. |
| 11,154,006 B2 | 10/2021 | Liljedahl |

(56) References Cited

U.S. PATENT DOCUMENTS

| | | |
|---|---|---|
| 11,154,442 B1 | 10/2021 | Dean et al. |
| 11,157,015 B2 | 10/2021 | Schnittman |
| D937,181 S | 11/2021 | Guidry |
| 11,161,235 B2 | 11/2021 | He et al. |
| 11,161,381 B2 | 11/2021 | Svensson et al. |
| 11,161,422 B2 | 11/2021 | Andriolo et al. |
| 11,161,578 B2 | 11/2021 | Wu et al. |
| 11,163,292 B2 | 11/2021 | Adler et al. |
| 11,166,411 B2 | 11/2021 | Fuse et al. |
| 11,169,527 B2 | 11/2021 | Dalfra |
| 11,169,530 B1 | 11/2021 | Ärlig et al. |
| 11,171,497 B2 | 11/2021 | Jiao et al. |
| 11,173,594 B2 | 11/2021 | Kim |
| 11,175,374 B2 | 11/2021 | Kameyama et al. |
| 11,191,403 B2 | 12/2021 | Gill et al. |
| 11,197,414 B2 | 12/2021 | Zeiler et al. |
| 11,199,853 B1 | 12/2021 | Afrouzi et al. |
| 11,202,547 B2 | 12/2021 | Jang et al. |
| 11,215,461 B1 | 1/2022 | Ebrahimi Afrouzi et al. |
| 11,221,628 B2 | 1/2022 | Holgersson et al. |
| 11,225,228 B2 | 1/2022 | Liu et al. |
| 11,229,154 B2 | 1/2022 | Hershbarger |
| 11,231,708 B2 | 1/2022 | Hyakusawa |
| D943,638 S | 2/2022 | Rauch et al. |
| 11,235,451 B2 | 2/2022 | Bombulie |
| 11,235,472 B2 | 2/2022 | Al Nahwi et al. |
| 11,253,126 B2 | 2/2022 | Jang et al. |
| 11,260,765 B2 | 3/2022 | Namiki et al. |
| 11,269,349 B2 | 3/2022 | Shao et al. |
| 11,274,929 B1 | 3/2022 | Afrouzi et al. |
| 11,278,176 B2 | 3/2022 | Huang et al. |
| 11,278,177 B2 | 3/2022 | Lin et al. |
| 11,284,766 B2 | 3/2022 | Jang et al. |
| 11,287,821 B2 | 3/2022 | Borinato |
| 11,287,832 B2 | 3/2022 | Ebrahimi Afrouzi |
| 11,291,343 B2 | 4/2022 | Jang et al. |
| 11,292,136 B2 | 4/2022 | Wolff et al. |
| 11,298,831 B2 | 4/2022 | Tsai et al. |
| 11,300,975 B2 | 4/2022 | Dalfra et al. |
| 11,320,828 B1 | 5/2022 | Ebrahimi Afrouzi et al. |
| 11,325,590 B2 | 5/2022 | Han et al. |
| 11,340,079 B1 | 5/2022 | Ebrahimi Afrouzi et al. |
| 11,347,230 B2 | 5/2022 | Wang et al. |
| 11,351,670 B2 | 6/2022 | Wolowelsky et al. |
| 11,357,166 B2 | 6/2022 | Hahn et al. |
| 11,357,167 B2 | 6/2022 | Aposhian et al. |
| 11,378,979 B2 | 7/2022 | Zhou et al. |
| 11,380,320 B2 | 7/2022 | Duncan |
| 11,393,114 B1 | 7/2022 | Ebrahimi Afrouzi et al. |
| 11,415,998 B2 | 8/2022 | Strandberg |
| 11,464,164 B2 | 10/2022 | Cmich et al. |
| 11,596,117 B2 | 3/2023 | Koehler et al. |
| 11,614,744 B2 | 3/2023 | Ran et al. |
| 11,654,574 B2 | 5/2023 | Zhang et al. |
| 11,662,723 B2 | 5/2023 | Schlacks, IV et al. |
| 2002/0005237 A1 | 1/2002 | Musat et al. |
| 2003/0144774 A1 | 7/2003 | Trissel et al. |
| 2003/0218046 A1 | 11/2003 | Peter, Jr. |
| 2003/0236590 A1 | 12/2003 | Park et al. |
| 2004/0000823 A1 | 1/2004 | Patridge |
| 2004/0158358 A1 | 8/2004 | Anezaki et al. |
| 2004/0187457 A1 | 9/2004 | Colens |
| 2004/0190376 A1 | 9/2004 | Hulden et al. |
| 2004/0200505 A1 | 10/2004 | Taylor et al. |
| 2004/0204792 A1 | 10/2004 | Taylor et al. |
| 2004/0211444 A1 | 10/2004 | Taylor et al. |
| 2004/0236468 A1 | 11/2004 | Taylor et al. |
| 2004/0244138 A1 | 12/2004 | Taylor et al. |
| 2005/0010331 A1 | 1/2005 | Taylor et al. |
| 2005/0028346 A1 | 2/2005 | Mangone, Jr. |
| 2005/0034437 A1 | 2/2005 | McMurtry et al. |
| 2005/0039428 A1 | 2/2005 | McMurtry et al. |
| 2005/0042059 A1 | 2/2005 | Bremer |
| 2005/0060975 A1 | 3/2005 | McClymonds |
| 2005/0113990 A1* | 5/2005 | Peless .................. G05D 1/0265 |
| | | 701/532 |
| 2005/0171637 A1 | 8/2005 | Tani et al. |
| 2005/0171644 A1 | 8/2005 | Tani |
| 2005/0273967 A1 | 12/2005 | Taylor et al. |
| 2006/0010844 A1 | 1/2006 | Angott |
| 2006/0020369 A1 | 1/2006 | Taylor et al. |
| 2006/0020370 A1 | 1/2006 | Abramson |
| 2006/0191096 A1 | 8/2006 | Sudo et al. |
| 2006/0212191 A1 | 9/2006 | Saeki |
| 2006/0217854 A1 | 9/2006 | Takenaka et al. |
| 2006/0219838 A1 | 10/2006 | Audet |
| 2007/0100496 A1 | 5/2007 | Forell |
| 2007/0119137 A1 | 5/2007 | Brandon |
| 2007/0142972 A1 | 6/2007 | Abramson et al. |
| 2007/0143949 A1 | 6/2007 | Chiu |
| 2007/0145943 A1 | 6/2007 | Sudo |
| 2007/0150109 A1 | 6/2007 | Peless et al. |
| 2007/0234698 A1 | 10/2007 | Silbernagel et al. |
| 2007/0276541 A1 | 11/2007 | Sawasaki |
| 2008/0143065 A1 | 6/2008 | Defazio et al. |
| 2008/0163117 A1 | 7/2008 | Machtelinck et al. |
| 2008/0167753 A1 | 7/2008 | Peless et al. |
| 2008/0281470 A1 | 11/2008 | Gilbert, Jr. et al. |
| 2008/0294288 A1 | 11/2008 | Yamauchi |
| 2009/0112679 A1 | 4/2009 | Machtelinck |
| 2009/0157259 A1 | 6/2009 | Han et al. |
| 2009/0182464 A1 | 7/2009 | Myeong et al. |
| 2009/0276277 A1 | 11/2009 | Vansteenkiste et al. |
| 2009/0313038 A1 | 12/2009 | Machtelinck |
| 2010/0057286 A1 | 3/2010 | Kerchner |
| 2010/0063652 A1 | 3/2010 | Anderson |
| 2010/0066587 A1 | 3/2010 | Yamauchi et al. |
| 2010/0299016 A1 | 11/2010 | Benzler et al. |
| 2011/0046784 A1 | 2/2011 | Anderson |
| 2011/0046836 A1 | 2/2011 | Anderson |
| 2011/0112713 A1 | 5/2011 | Teng et al. |
| 2011/0153136 A1* | 6/2011 | Anderson ............ G05D 1/0246 |
| | | 348/E7.086 |
| 2011/0153172 A1 | 6/2011 | Anderson |
| 2011/0153338 A1 | 6/2011 | Anderson |
| 2011/0202307 A1 | 8/2011 | Pereit et al. |
| 2011/0208357 A1 | 8/2011 | Yamauchi |
| 2011/0295423 A1 | 12/2011 | Anderson |
| 2012/0012635 A1 | 1/2012 | Jaffe et al. |
| 2012/0029752 A1 | 2/2012 | Johnson et al. |
| 2012/0101679 A1 | 4/2012 | Anderson et al. |
| 2012/0143429 A1 | 6/2012 | Anderson |
| 2012/0215380 A1 | 8/2012 | Fouillade et al. |
| 2012/0226381 A1 | 9/2012 | Abramson et al. |
| 2012/0253581 A1 | 10/2012 | Anderson |
| 2012/0265346 A1 | 10/2012 | Gilbert, Jr. et al. |
| 2012/0303160 A1 | 11/2012 | Ziegler et al. |
| 2013/0000677 A1 | 1/2013 | Sumonthee |
| 2013/0031787 A1 | 2/2013 | Kamiya et al. |
| 2013/0031788 A1 | 2/2013 | Ohno |
| 2013/0098402 A1 | 4/2013 | Yoon et al. |
| 2013/0167495 A1 | 7/2013 | Borinato |
| 2013/0214498 A1 | 8/2013 | Defazio et al. |
| 2014/0000231 A1 | 1/2014 | Bernini |
| 2014/0126952 A1 | 5/2014 | Fay, II |
| 2014/0163733 A1 | 6/2014 | Sadowski et al. |
| 2014/0197222 A1 | 7/2014 | Howe |
| 2014/0203776 A1 | 7/2014 | Ireland et al. |
| 2014/0204510 A1 | 7/2014 | Ireland |
| 2014/0330496 A1 | 11/2014 | Crouse et al. |
| 2015/0012164 A1 | 1/2015 | Yu et al. |
| 2015/0045992 A1 | 2/2015 | Ashby et al. |
| 2015/0120057 A1 | 4/2015 | Wong et al. |
| 2015/0128547 A1 | 5/2015 | Einecke et al. |
| 2015/0163993 A1 | 6/2015 | Pettersson |
| 2015/0181806 A1 | 7/2015 | Lim et al. |
| 2015/0201555 A1* | 7/2015 | Willgert .............. G05D 1/0274 |
| | | 701/26 |
| 2015/0270729 A1 | 9/2015 | Isobe |
| 2015/0301532 A1 | 10/2015 | Norris et al. |
| 2015/0379785 A1 | 12/2015 | Brown, Jr. et al. |
| 2016/0014957 A1 | 1/2016 | Johansson et al. |
| 2016/0075032 A1 | 3/2016 | Goel et al. |

(56) References Cited

U.S. PATENT DOCUMENTS

| | | |
|---|---|---|
| 2016/0100523 A1 | 4/2016 | Anderson |
| 2016/0128275 A1 | 5/2016 | Johnson |
| 2016/0146611 A1 | 5/2016 | Matthews |
| 2016/0157275 A1 | 6/2016 | Matthews |
| 2016/0174140 A1 | 6/2016 | Wu et al. |
| 2016/0179095 A1 | 6/2016 | Sarid et al. |
| 2016/0187885 A1 | 6/2016 | Pack et al. |
| 2016/0198644 A1 | 7/2016 | Lameli et al. |
| 2016/0311076 A1 | 10/2016 | Matsumoto et al. |
| 2016/0316619 A1 | 11/2016 | Johanek et al. |
| 2016/0338262 A1 | 11/2016 | Liu et al. |
| 2016/0354931 A1 | 12/2016 | Jones et al. |
| 2016/0360695 A1 | 12/2016 | Klackensjö |
| 2016/0378111 A1 | 12/2016 | Lenser et al. |
| 2017/0046663 A1 | 2/2017 | Wong et al. |
| 2017/0088010 A1 | 3/2017 | Tonks et al. |
| 2017/0269595 A1 | 9/2017 | Chen |
| 2017/0303466 A1 | 10/2017 | Grufman et al. |
| 2017/0308092 A1 | 10/2017 | Altinger et al. |
| 2017/0325648 A1 | 11/2017 | Huang |
| 2017/0351260 A1 | 12/2017 | Willgert et al. |
| 2017/0361468 A1 | 12/2017 | Cheuvront et al. |
| 2018/0103583 A1 | 4/2018 | Stridh |
| 2018/0120852 A1 | 5/2018 | Cho |
| 2018/0184585 A1 | 7/2018 | Song et al. |
| 2018/0184591 A1 | 7/2018 | Song et al. |
| 2018/0232134 A1 | 8/2018 | Ebrahimi Afrouzi et al. |
| 2018/0246516 A1 | 8/2018 | Franzius et al. |
| 2018/0263182 A1 | 9/2018 | Albinger et al. |
| 2018/0267552 A1 | 9/2018 | Artes et al. |
| 2018/0317368 A1 | 11/2018 | Du et al. |
| 2018/0344116 A1 | 12/2018 | Schriesheim et al. |
| 2018/0348787 A1 | 12/2018 | Sandin et al. |
| 2019/0041869 A1 | 2/2019 | Shao et al. |
| 2019/0049593 A1 | 2/2019 | He et al. |
| 2019/0049968 A1 | 2/2019 | Dean et al. |
| 2019/0049984 A1 | 2/2019 | Wong et al. |
| 2019/0053423 A1 | 2/2019 | Guiet et al. |
| 2019/0069330 A1 | 2/2019 | Ebrahimi Afrouzi et al. |
| 2019/0113931 A1 | 4/2019 | Zha et al. |
| 2019/0118877 A1 | 4/2019 | Ran et al. |
| 2019/0141886 A1 | 5/2019 | Liu et al. |
| 2019/0141888 A1 | 5/2019 | Balutis et al. |
| 2019/0166487 A1 | 5/2019 | Russ et al. |
| 2019/0176321 A1 | 6/2019 | Afrouzi et al. |
| 2019/0187714 A1 | 6/2019 | He et al. |
| 2019/0227574 A1 | 7/2019 | Du et al. |
| 2019/0239428 A1 | 8/2019 | Levin et al. |
| 2019/0246862 A1 | 8/2019 | Gilbert, Jr. et al. |
| 2019/0248007 A1 | 8/2019 | Duffy et al. |
| 2019/0250604 A1 | 8/2019 | Balutis et al. |
| 2019/0258267 A1 | 8/2019 | Hahn et al. |
| 2019/0265724 A1 | 8/2019 | Sheng et al. |
| 2019/0270124 A1 | 9/2019 | Jang et al. |
| 2019/0275666 A1 | 9/2019 | Abramson |
| 2019/0278269 A1 | 9/2019 | He et al. |
| 2019/0297869 A1 | 10/2019 | Michaels et al. |
| 2019/0299398 A1 | 10/2019 | Svensson |
| 2019/0313576 A1 | 10/2019 | Haneda et al. |
| 2019/0320580 A1 | 10/2019 | Haneda et al. |
| 2019/0339719 A1 | 11/2019 | Wang et al. |
| 2019/0343040 A1 | 11/2019 | Testolin et al. |
| 2019/0346848 A1 | 11/2019 | Zhou et al. |
| 2019/0357430 A1 | 11/2019 | Kraft |
| 2019/0357431 A1 | 11/2019 | Kamfors et al. |
| 2019/0369620 A1 | 12/2019 | Zhou et al. |
| 2019/0369629 A1 | 12/2019 | Dalfra |
| 2019/0369640 A1 | 12/2019 | He et al. |
| 2019/0378360 A1 | 12/2019 | Bergenholm et al. |
| 2019/0380266 A1 | 12/2019 | Liljedahl |
| 2019/0383887 A1 | 12/2019 | Kleiner et al. |
| 2019/0384306 A1 | 12/2019 | Jang et al. |
| 2019/0391589 A1 | 12/2019 | Komorida et al. |
| 2020/0000023 A1 | 1/2020 | Chung |
| 2020/0019156 A1 | 1/2020 | Drew et al. |
| 2020/0022553 A1 | 1/2020 | Gill et al. |
| 2020/0033386 A1 | 1/2020 | Abramson |
| 2020/0037498 A1 | 2/2020 | Ko et al. |
| 2020/0039079 A1 | 2/2020 | Brouwers et al. |
| 2020/0042011 A1 | 2/2020 | Ärlig et al. |
| 2020/0050208 A1 | 2/2020 | Frick et al. |
| 2020/0073403 A1 | 3/2020 | Abramson et al. |
| 2020/0093058 A1 | 3/2020 | Ritzer et al. |
| 2020/0100425 A1 | 4/2020 | Li |
| 2020/0108499 A1 | 4/2020 | Vicenti |
| 2020/0120863 A1 | 4/2020 | Liu et al. |
| 2020/0128750 A1 | 4/2020 | Svensson et al. |
| 2020/0129029 A1 | 4/2020 | Kim et al. |
| 2020/0139536 A1 | 5/2020 | Frisby et al. |
| 2020/0146211 A1 | 5/2020 | Wahlgren |
| 2020/0154637 A1 | 5/2020 | Doughty |
| 2020/0170180 A1 | 6/2020 | Kong et al. |
| 2020/0172166 A1 | 6/2020 | Chang et al. |
| 2020/0173784 A1 | 6/2020 | Chang |
| 2020/0193071 A1 | 6/2020 | Yu et al. |
| 2020/0196523 A1 | 6/2020 | Ran et al. |
| 2020/0198488 A1 | 6/2020 | Liljedahl |
| 2020/0201328 A1 | 6/2020 | Abramson |
| 2020/0201347 A1 | 6/2020 | Dalfra et al. |
| 2020/0206896 A1 | 7/2020 | Wong et al. |
| 2020/0221633 A1 | 7/2020 | Einecke et al. |
| 2020/0229344 A1 | 7/2020 | Du et al. |
| 2020/0233658 A1 | 7/2020 | Yang et al. |
| 2020/0236846 A1 | 7/2020 | Choi et al. |
| 2020/0237169 A1 | 7/2020 | Song et al. |
| 2020/0239090 A1 | 7/2020 | Kong et al. |
| 2020/0245550 A1 | 8/2020 | Smith et al. |
| 2020/0253116 A1 | 8/2020 | Ladd, Jr. et al. |
| 2020/0256369 A1 | 8/2020 | Gao |
| 2020/0260638 A1 | 8/2020 | Rotole |
| 2020/0267903 A1 | 8/2020 | Gao et al. |
| 2020/0278680 A1 | 9/2020 | Schulz et al. |
| 2020/0278683 A1 | 9/2020 | Dean et al. |
| 2020/0281114 A1 | 9/2020 | Jägenstedt et al. |
| 2020/0281430 A1 | 9/2020 | Morin et al. |
| 2020/0285963 A1 | 9/2020 | Velkey et al. |
| 2020/0287397 A1 | 9/2020 | Jiao et al. |
| 2020/0297180 A1 | 9/2020 | Kang et al. |
| 2020/0315087 A1 | 10/2020 | Svensson et al. |
| 2020/0323191 A1 | 10/2020 | Duncan et al. |
| 2020/0323408 A1 | 10/2020 | Cohen et al. |
| 2020/0326725 A1 | 10/2020 | Churavy et al. |
| 2020/0337201 A1 | 10/2020 | Siekmann |
| 2020/0352082 A1 | 11/2020 | Maeder et al. |
| 2020/0352091 A1 | 11/2020 | Ambros et al. |
| 2020/0356093 A1 | 11/2020 | Shimamura et al. |
| 2020/0362536 A1 | 11/2020 | Shimamura et al. |
| 2020/0363810 A1 | 11/2020 | Arras et al. |
| 2020/0366481 A1 | 11/2020 | Pakkan et al. |
| 2020/0367429 A1 | 11/2020 | Yuan |
| 2020/0369080 A1 | 11/2020 | Cmich |
| 2020/0375096 A1 | 12/2020 | Coleman |
| 2020/0375097 A1 | 12/2020 | Coleman |
| 2020/0375098 A1 | 12/2020 | Muro et al. |
| 2020/0383265 A1 | 12/2020 | Holgersson |
| 2020/0393844 A1 | 12/2020 | Ritzer et al. |
| 2020/0396916 A1 | 12/2020 | He et al. |
| 2020/0401146 A1 | 12/2020 | Strandberg |
| 2021/0000005 A1 | 1/2021 | Robinson |
| 2021/0000008 A1 | 1/2021 | Svensson et al. |
| 2021/0003405 A1 | 1/2021 | Choi |
| 2021/0004895 A1 | 1/2021 | Kuriyagawa et al. |
| 2021/0016453 A1 | 1/2021 | Patel et al. |
| 2021/0018927 A1 | 1/2021 | Ackerman et al. |
| 2021/0029873 A1 | 2/2021 | Yamauchi et al. |
| 2021/0029874 A1 | 2/2021 | Robertsson |
| 2021/0031367 A1 | 2/2021 | Mirzaei et al. |
| 2021/0037703 A1 | 2/2021 | Holgersson |
| 2021/0041871 A1 | 2/2021 | Lai et al. |
| 2021/0048831 A1 | 2/2021 | Yun et al. |
| 2021/0059112 A1 | 3/2021 | Kim |
| 2021/0064036 A1 | 3/2021 | Muro et al. |
| 2021/0064050 A1 | 3/2021 | Pickett et al. |
| 2021/0070356 A1 | 3/2021 | Lyzen et al. |

(56) References Cited

U.S. PATENT DOCUMENTS

| | | |
|---|---|---|
| 2021/0072764 A1 | 3/2021 | Kean |
| 2021/0076562 A1 | 3/2021 | Doughty et al. |
| 2021/0076563 A1 | 3/2021 | Andriolo et al. |
| 2021/0076892 A1 | 3/2021 | Schriesheim et al. |
| 2021/0083492 A1 | 3/2021 | Towner et al. |
| 2021/0083493 A1 | 3/2021 | Towner et al. |
| 2021/0083494 A1 | 3/2021 | Towner et al. |
| 2021/0084815 A1 | 3/2021 | Li et al. |
| 2021/0089034 A1 | 3/2021 | Hjelmaker |
| 2021/0092912 A1 | 4/2021 | Wykman et al. |
| 2021/0094346 A1 | 4/2021 | Cmich |
| 2021/0100160 A1 | 4/2021 | Kang et al. |
| 2021/0100161 A1 | 4/2021 | Balutis et al. |
| 2021/0107363 A1 | 4/2021 | Han et al. |
| 2021/0114810 A1 | 4/2021 | Matsuoka et al. |
| 2021/0116933 A1 | 4/2021 | Ouyang |
| 2021/0125366 A1 | 4/2021 | Hasberg et al. |
| 2021/0127569 A1 | 5/2021 | Gruhler et al. |
| 2021/0132604 A1 | 5/2021 | Gillett |
| 2021/0132624 A1 | 5/2021 | Andriolo et al. |
| 2021/0132625 A1 | 5/2021 | Gillett |
| 2021/0132626 A1 | 5/2021 | Gillett |
| 2021/0153428 A1 | 5/2021 | Mittmann et al. |
| 2021/0153710 A1 | 5/2021 | Mosebach et al. |
| 2021/0157331 A1 | 5/2021 | He |
| 2021/0161065 A1 | 6/2021 | Holgersson |
| 2021/0165109 A1 | 6/2021 | Yang et al. |
| 2021/0165411 A1 | 6/2021 | Andriolo et al. |
| 2021/0168999 A1 | 6/2021 | Xu |
| 2021/0176915 A1 | 6/2021 | Vines et al. |
| 2021/0179137 A1 | 6/2021 | Gillett |
| 2021/0185911 A1 | 6/2021 | Agerhall |
| 2021/0191764 A1 | 6/2021 | Dalfra |
| 2021/0200226 A1 | 7/2021 | Wang et al. |
| 2021/0200228 A1 | 7/2021 | Grufman et al. |
| 2021/0204473 A1 | 7/2021 | Andriolo et al. |
| 2021/0206367 A1 | 7/2021 | Liu et al. |
| 2021/0216070 A1 | 7/2021 | Vankampen et al. |
| 2021/0219488 A1 | 7/2021 | Zhao et al. |
| 2021/0221246 A1 | 7/2021 | Liu et al. |
| 2021/0223787 A1 | 7/2021 | Pellisari |
| 2021/0227744 A1 | 7/2021 | Zhou et al. |
| 2021/0228043 A1 | 7/2021 | Jang et al. |
| 2021/0230622 A1 | 7/2021 | Crow et al. |
| 2021/0235616 A1 | 8/2021 | Stark et al. |
| 2021/0255638 A1 | 8/2021 | Ma et al. |
| 2021/0259497 A1 | 8/2021 | Park et al. |
| 2021/0263131 A1 | 8/2021 | Dalfra |
| 2021/0263529 A1 | 8/2021 | Takahashi et al. |
| 2021/0270338 A1 | 9/2021 | Ederfors |
| 2021/0272438 A1 | 9/2021 | Askenmalm |
| 2021/0274705 A1 | 9/2021 | Mårtensson et al. |
| 2021/0282322 A1 | 9/2021 | Yoon et al. |
| 2021/0289695 A1 | 9/2021 | Grufman et al. |
| 2021/0294348 A1 | 9/2021 | Lan et al. |
| 2021/0298232 A1 | 9/2021 | Wolf et al. |
| 2021/0302999 A1 | 9/2021 | Yokoyama et al. |
| 2021/0311484 A1 | 10/2021 | Lee et al. |
| 2021/0315155 A1 | 10/2021 | Lee et al. |
| 2021/0321854 A1 | 10/2021 | Zhang et al. |
| 2021/0325872 A1 | 10/2021 | Schlacks, IV et al. |
| 2021/0325874 A1 | 10/2021 | Schlacks, IV et al. |
| 2021/0325875 A1 | 10/2021 | Schlacks, IV et al. |
| 2021/0325876 A1 | 10/2021 | Schlacks, IV et al. |
| 2021/0325877 A1 | 10/2021 | Schlacks, IV et al. |
| 2021/0325878 A1 | 10/2021 | Schlacks, IV et al. |
| 2021/0328991 A1 | 10/2021 | Dean et al. |
| 2021/0329841 A1 | 10/2021 | Cuong et al. |
| 2021/0331594 A1 | 10/2021 | Svensson et al. |
| 2021/0337726 A1 | 11/2021 | Keski-Luopa et al. |
| 2021/0344299 A1 | 11/2021 | Layne et al. |
| 2021/0345544 A1 | 11/2021 | Han et al. |
| 2021/0345545 A1 | 11/2021 | Zhao et al. |
| 2021/0347204 A1 | 11/2021 | Cmich |
| 2021/0352841 A1 | 11/2021 | Edfors et al. |
| 2021/0352842 A1 | 11/2021 | Pu et al. |
| 2021/0352843 A1 | 11/2021 | Zhao et al. |
| 2021/0360853 A1 | 11/2021 | Herrera |
| 2021/0365044 A1 | 11/2021 | Xue et al. |
| 2021/0382476 A1 | 12/2021 | Morrison et al. |
| 2022/0009363 A1 | 1/2022 | Gilbert, Jr. et al. |
| 2022/0022371 A1 | 1/2022 | Askenmalm et al. |
| 2022/0022386 A1 | 1/2022 | Danling |
| 2022/0029477 A1 | 1/2022 | He et al. |
| 2022/0030766 A1 | 2/2022 | Johansson |
| 2022/0039313 A1 | 2/2022 | Morrison et al. |
| 2022/0061212 A1 | 3/2022 | Zeiler et al. |
| 2022/0066456 A1 | 3/2022 | Ebrahimi Afrouzi et al. |
| 2022/0071086 A1 | 3/2022 | Levin et al. |
| 2022/0071465 A1 | 3/2022 | Kim et al. |
| 2022/0083075 A1 | 3/2022 | Heiss et al. |
| 2022/0091257 A1 | 3/2022 | Almers et al. |
| 2022/0100197 A1 | 3/2022 | Chao |
| 2022/0124973 A1 | 4/2022 | Juel |
| 2022/0129000 A1 | 4/2022 | Ingvalson et al. |
| 2022/0142438 A1 | 5/2022 | Chen et al. |
| 2022/0151143 A1 | 5/2022 | Liljedahl et al. |
| 2022/0151147 A1 | 5/2022 | Chen et al. |
| 2022/0167552 A1 | 6/2022 | Frick et al. |
| 2022/0167553 A1 | 6/2022 | Rogö et al. |
| 2022/0174868 A1 | 6/2022 | Flygare |
| 2022/0180282 A1 | 6/2022 | Powell et al. |
| 2022/0183223 A1 | 6/2022 | Svensson et al. |
| 2022/0183226 A1 | 6/2022 | Paolo Andriolo |
| 2022/0217902 A1 | 7/2022 | Chen et al. |
| 2022/0217904 A1 | 7/2022 | Svensson et al. |
| 2022/0240444 A1 | 8/2022 | Wang et al. |
| 2022/0261006 A1 | 8/2022 | Zaslavsky et al. |
| 2022/0272897 A1 | 9/2022 | Jiao et al. |
| 2022/0295696 A1 | 9/2022 | Holgersson et al. |
| 2022/0295709 A1 | 9/2022 | Wisse et al. |
| 2022/0322603 A1 | 10/2022 | Inaba et al. |
| 2022/0322908 A1 | 10/2022 | Cha et al. |
| 2022/0324112 A1 | 10/2022 | Wolowelsky et al. |
| 2022/0326709 A1 | 10/2022 | Andriolo |
| 2022/0334244 A1 | 10/2022 | Li et al. |
| 2022/0342425 A1 | 10/2022 | Glimberg et al. |
| 2022/0354050 A1 | 11/2022 | Du et al. |
| 2022/0396969 A1 | 12/2022 | Arvidsson et al. |
| 2023/0008134 A1 | 1/2023 | Olofsson et al. |
| 2023/0008169 A1 | 1/2023 | Cuong et al. |
| 2023/0009964 A1 | 1/2023 | Jonsson et al. |
| 2023/0010420 A1 | 1/2023 | Glimberg et al. |
| 2023/0015812 A1 | 1/2023 | Wikestad et al. |
| 2023/0017821 A1 | 1/2023 | Ma et al. |
| 2023/0034100 A1 | 2/2023 | Holgersson et al. |
| 2023/0042864 A1 | 2/2023 | Danling et al. |
| 2023/0051150 A1 | 2/2023 | Pu et al. |
| 2023/0059610 A1 | 2/2023 | Mei et al. |
| 2023/0071262 A1 | 3/2023 | Lundkvist et al. |
| 2023/0074101 A1 | 3/2023 | Mårtensson et al. |
| 2023/0081732 A1 | 3/2023 | Abramson |
| 2023/0085538 A1 | 3/2023 | Lundkvist et al. |
| 2023/0092131 A1 | 3/2023 | Lao et al. |
| 2023/0117845 A1 | 4/2023 | Holgersson et al. |
| 2023/0119277 A1 | 4/2023 | Leijonberger |
| 2023/0138339 A1 | 5/2023 | Wikestad |
| 2023/0145580 A1 | 5/2023 | Hong et al. |
| 2023/0152817 A1 | 5/2023 | Huang et al. |
| 2023/0161357 A1 | 5/2023 | Liljedahl et al. |
| 2023/0176000 A1 | 6/2023 | Abbott et al. |
| 2023/0176225 A1 | 6/2023 | Mårtensson et al. |
| 2023/0185309 A1 | 6/2023 | Glimberg et al. |
| 2023/0189705 A1 | 6/2023 | Svensson et al. |

FOREIGN PATENT DOCUMENTS

| | | |
|---|---|---|
| AU | 2011239328 A1 | 11/2011 |
| AU | 2012101338 A4 | 11/2012 |
| AU | 2014201952 A1 | 4/2014 |
| AU | 2015230722 A1 | 10/2015 |
| CA | 1079076 A | 6/1980 |
| CN | 2382585 Y | 6/2000 |
| CN | 2693167 Y | 4/2005 |

(56) References Cited

FOREIGN PATENT DOCUMENTS

| | | | |
|----|-----------|---|---------|
| CN | 3512456 | | 3/2006 |
| CN | 3599999 | | 1/2007 |
| CN | 3626101 | | 3/2007 |
| CN | 101185088 | A | 5/2008 |
| CN | 300775531 | | 5/2008 |
| CN | 201127182 | Y | 10/2008 |
| CN | 101313319 | A | 11/2008 |
| CN | 201226676 | Y | 4/2009 |
| CN | 201226677 | Y | 4/2009 |
| CN | 100485567 | C | 5/2009 |
| CN | 100498602 | C | 6/2009 |
| CN | 201260303 | Y | 6/2009 |
| CN | 301144405 | | 2/2010 |
| CN | 301276003 | | 6/2010 |
| CN | 301290512 | | 7/2010 |
| CN | 201557392 | U | 8/2010 |
| CN | 301328063 | | 8/2010 |
| CN | 101292244 | B | 12/2010 |
| CN | 301444971 | | 1/2011 |
| CN | 101982037 | A | 3/2011 |
| CN | 201797741 | U | 4/2011 |
| CN | 301506267 | | 4/2011 |
| CN | 201846616 | U | 6/2011 |
| CN | 301573109 | | 6/2011 |
| CN | 301611305 | | 7/2011 |
| CN | 301653707 | | 8/2011 |
| CN | 301660006 | | 8/2011 |
| CN | 301742022 | | 11/2011 |
| CN | 202077380 | U | 12/2011 |
| CN | 102523841 | A | 7/2012 |
| CN | 302020661 | | 8/2012 |
| CN | 102687620 | A | 9/2012 |
| CN | 102687625 | A | 9/2012 |
| CN | 302080704 | | 9/2012 |
| CN | 102771246 | A | 11/2012 |
| CN | 102771259 | A | 11/2012 |
| CN | 302218376 | | 12/2012 |
| CN | 102880175 | A | 1/2013 |
| CN | 302299693 | | 1/2013 |
| CN | 302350176 | | 3/2013 |
| CN | 302456271 | | 6/2013 |
| CN | 302483861 | | 6/2013 |
| CN | 103294056 | A | 9/2013 |
| CN | 103324191 | A | 9/2013 |
| CN | 103324192 | A | 9/2013 |
| CN | 203233683 | U | 10/2013 |
| CN | 302629702 | | 11/2013 |
| CN | 103473497 | A | 12/2013 |
| CN | 302702748 | | 1/2014 |
| CN | 103578164 | A | 2/2014 |
| CN | 103676947 | A | 3/2014 |
| CN | 203575087 | U | 5/2014 |
| CN | 103858584 | A | 6/2014 |
| CN | 203691948 | U | 7/2014 |
| CN | 203735069 | U | 7/2014 |
| CN | 302881351 | | 7/2014 |
| CN | 104007765 | A | 8/2014 |
| CN | 104025796 | A | 9/2014 |
| CN | 203840762 | U | 9/2014 |
| CN | 302943247 | | 9/2014 |
| CN | 302943249 | | 9/2014 |
| CN | 104094727 | A | 10/2014 |
| CN | 104111460 | A | 10/2014 |
| CN | 104111651 | A | 10/2014 |
| CN | 104111652 | A | 10/2014 |
| CN | 104111653 | A | 10/2014 |
| CN | 203851480 | U | 10/2014 |
| CN | 302974154 | | 10/2014 |
| CN | 104160830 | A | 11/2014 |
| CN | 302993652 | | 11/2014 |
| CN | 204014494 | U | 12/2014 |
| CN | 204047176 | U | 12/2014 |
| CN | 303058887 | | 12/2014 |
| CN | 303075143 | | 1/2015 |
| CN | 104360684 | A | 2/2015 |
| CN | 204143255 | U | 2/2015 |
| CN | 104571102 | A | 4/2015 |
| CN | 104686050 | A | 6/2015 |
| CN | 104704979 | A | 6/2015 |
| CN | 104704980 | A | 6/2015 |
| CN | 204362599 | U | 6/2015 |
| CN | 303232131 | | 6/2015 |
| CN | 104737699 | A | 7/2015 |
| CN | 104750104 | A | 7/2015 |
| CN | 104782314 | A | 7/2015 |
| CN | 104793614 | A | 7/2015 |
| CN | 104793617 | A | 7/2015 |
| CN | 204443108 | U | 7/2015 |
| CN | 204462853 | U | 7/2015 |
| CN | 204495362 | U | 7/2015 |
| CN | 204515530 | U | 7/2015 |
| CN | 204539960 | U | 8/2015 |
| CN | 303318601 | | 8/2015 |
| CN | 104904403 | A | 9/2015 |
| CN | 104904404 | A | 9/2015 |
| CN | 204613789 | U | 9/2015 |
| CN | 204649212 | U | 9/2015 |
| CN | 303408640 | | 10/2015 |
| CN | 105082080 | A | 11/2015 |
| CN | 105096177 | A | 11/2015 |
| CN | 303452341 | | 11/2015 |
| CN | 303452355 | | 11/2015 |
| CN | 105163037 | A | 12/2015 |
| CN | 204810982 | U | 12/2015 |
| CN | 204858702 | U | 12/2015 |
| CN | 204925588 | U | 12/2015 |
| CN | 303478376 | | 12/2015 |
| CN | 303519781 | | 12/2015 |
| CN | 105230225 | A | 1/2016 |
| CN | 103621244 | B | 2/2016 |
| CN | 105353758 | A | 2/2016 |
| CN | 303579400 | | 2/2016 |
| CN | 105432212 | A | 3/2016 |
| CN | 105512689 | A | 4/2016 |
| CN | 303654613 | | 4/2016 |
| CN | 105557175 | A | 5/2016 |
| CN | 105573308 | A | 5/2016 |
| CN | 105573311 | A | 5/2016 |
| CN | 303670522 | | 5/2016 |
| CN | 105660039 | A | 6/2016 |
| CN | 105684630 | A | 6/2016 |
| CN | 105700521 | A | 6/2016 |
| CN | 205335882 | U | 6/2016 |
| CN | 205336853 | U | 6/2016 |
| CN | 303690781 | | 6/2016 |
| CN | 105759813 | A | 7/2016 |
| CN | 205431101 | U | 8/2016 |
| CN | 205489586 | U | 8/2016 |
| CN | 303778782 | | 8/2016 |
| CN | 303862286 | | 9/2016 |
| CN | 103283404 | B | 10/2016 |
| CN | 105988469 | A | 10/2016 |
| CN | 105988470 | A | 10/2016 |
| CN | 106020207 | A | 10/2016 |
| CN | 303888354 | | 10/2016 |
| CN | 303888360 | | 10/2016 |
| CN | 106142023 | A | 11/2016 |
| CN | 205694315 | U | 11/2016 |
| CN | 303933081 | | 11/2016 |
| CN | 103941600 | B | 12/2016 |
| CN | 106171248 | A | 12/2016 |
| CN | 205812811 | U | 12/2016 |
| CN | 205829192 | U | 12/2016 |
| CN | 205830138 | U | 12/2016 |
| CN | 303969591 | | 12/2016 |
| CN | 106258166 | A | 1/2017 |
| CN | 106325280 | A | 1/2017 |
| CN | 106355609 | A | 1/2017 |
| CN | 304004639 | | 1/2017 |
| CN | 106393094 | A | 2/2017 |
| CN | 106406301 | A | 2/2017 |
| CN | 304055132 | | 2/2017 |
| CN | 304055134 | | 2/2017 |
| CN | 304055136 | | 2/2017 |

(56) References Cited

FOREIGN PATENT DOCUMENTS

| | | | |
|---|---|---|---|
| CN | 106489412 | A | 3/2017 |
| CN | 205993268 | U | 3/2017 |
| CN | 103576681 | B | 4/2017 |
| CN | 206115269 | U | 4/2017 |
| CN | 304095129 | | 4/2017 |
| CN | 106647727 | A | 5/2017 |
| CN | 106708033 | A | 5/2017 |
| CN | 206196372 | U | 5/2017 |
| CN | 304129527 | | 5/2017 |
| CN | 304129534 | | 5/2017 |
| CN | 106852225 | A | 6/2017 |
| CN | 106877420 | A | 6/2017 |
| CN | 206274765 | U | 6/2017 |
| CN | 206278169 | U | 6/2017 |
| CN | 304175254 | | 6/2017 |
| CN | 304208974 | | 7/2017 |
| CN | 107024910 | A | 8/2017 |
| CN | 304227934 | | 8/2017 |
| CN | 304241160 | | 8/2017 |
| CN | 206472500 | U | 9/2017 |
| CN | 304283754 | | 9/2017 |
| CN | 206547328 | U | 10/2017 |
| CN | 206547363 | U | 10/2017 |
| CN | 206611777 | U | 11/2017 |
| CN | 206611791 | U | 11/2017 |
| CN | 206611812 | U | 11/2017 |
| CN | 206619022 | U | 11/2017 |
| CN | 107463166 | A | 12/2017 |
| CN | 107463168 | A | 12/2017 |
| CN | 107505939 | A | 12/2017 |
| CN | 107515603 | A | 12/2017 |
| CN | 107516226 | A | 12/2017 |
| CN | 107517642 | A | 12/2017 |
| CN | 206686605 | U | 12/2017 |
| CN | 206808075 | U | 12/2017 |
| CN | 107544483 | A | 1/2018 |
| CN | 107600209 | A | 1/2018 |
| CN | 107624368 | A | 1/2018 |
| CN | 207037461 | U | 2/2018 |
| CN | 107800200 | A | 3/2018 |
| CN | 207075257 | U | 3/2018 |
| CN | 304529661 | | 3/2018 |
| CN | 304544247 | | 3/2018 |
| CN | 107888751 | A | 4/2018 |
| CN | 107913034 | A | 4/2018 |
| CN | 107960191 | A | 4/2018 |
| CN | 207201326 | U | 4/2018 |
| CN | 304565875 | | 4/2018 |
| CN | 108055906 | A | 5/2018 |
| CN | 108064539 | A | 5/2018 |
| CN | 108073179 | A | 5/2018 |
| CN | 108156957 | A | 6/2018 |
| CN | 108205313 | A | 6/2018 |
| CN | 207496811 | U | 6/2018 |
| CN | 108323326 | A | 7/2018 |
| CN | 108337987 | A | 7/2018 |
| CN | 108345297 | A | 7/2018 |
| CN | 108345298 | A | 7/2018 |
| CN | 207639110 | U | 7/2018 |
| CN | 207651536 | U | 7/2018 |
| CN | 207692389 | U | 8/2018 |
| CN | 304767946 | | 8/2018 |
| CN | 304794944 | | 8/2018 |
| CN | 207851614 | U | 9/2018 |
| CN | 304806495 | | 9/2018 |
| CN | 304811825 | | 9/2018 |
| CN | 108664014 | A | 10/2018 |
| CN | 108693873 | A | 10/2018 |
| CN | 207965652 | U | 10/2018 |
| CN | 108919814 | A | 11/2018 |
| CN | 208159284 | U | 11/2018 |
| CN | 108957512 | A | 12/2018 |
| CN | 109062225 | A | 12/2018 |
| CN | 109075284 | A | 12/2018 |
| CN | 208175354 | U | 12/2018 |
| CN | 208285831 | U | 12/2018 |
| CN | 304926953 | | 12/2018 |
| CN | 304926955 | | 12/2018 |
| CN | 109213123 | A | 1/2019 |
| CN | 208387297 | U | 1/2019 |
| CN | 304980236 | | 1/2019 |
| CN | 305010344 | | 1/2019 |
| CN | 305010365 | | 1/2019 |
| CN | 305017366 | | 1/2019 |
| CN | 105875063 | B | 2/2019 |
| CN | 208480301 | U | 2/2019 |
| CN | 208521989 | U | 2/2019 |
| CN | 305027640 | | 2/2019 |
| CN | 109542092 | A | 3/2019 |
| CN | 208638993 | U | 3/2019 |
| CN | 109566065 | A | 4/2019 |
| CN | 109601114 | A | 4/2019 |
| CN | 109658937 | A | 4/2019 |
| CN | 109682368 | A | 4/2019 |
| CN | 109682371 | A | 4/2019 |
| CN | 109683604 | A | 4/2019 |
| CN | 109696888 | A | 4/2019 |
| CN | 208739598 | U | 4/2019 |
| CN | 208752461 | U | 4/2019 |
| CN | 109757189 | A | 5/2019 |
| CN | 106982585 | B | 6/2019 |
| CN | 109892096 | A | 6/2019 |
| CN | 209002355 | U | 6/2019 |
| CN | 209002393 | U | 6/2019 |
| CN | 305196413 | | 6/2019 |
| CN | 305225230 | | 6/2019 |
| CN | 305227797 | | 6/2019 |
| CN | 305227798 | | 6/2019 |
| CN | 305227800 | | 6/2019 |
| CN | 305503785 | | 6/2019 |
| CN | 109960253 | A | 7/2019 |
| CN | 109962512 | A | 7/2019 |
| CN | 109983907 | A | 7/2019 |
| CN | 109983908 | A | 7/2019 |
| CN | 110018686 | A | 7/2019 |
| CN | 209170907 | U | 7/2019 |
| CN | 305261165 | | 7/2019 |
| CN | 305261166 | | 7/2019 |
| CN | 305265564 | | 7/2019 |
| CN | 209265268 | U | 8/2019 |
| CN | 209299766 | U | 8/2019 |
| CN | 106155056 | B | 9/2019 |
| CN | 110221594 | A | 9/2019 |
| CN | 110268858 | A | 9/2019 |
| CN | 209409782 | U | 9/2019 |
| CN | 305355791 | | 9/2019 |
| CN | 305357008 | | 9/2019 |
| CN | 110347144 | A | 10/2019 |
| CN | 110366368 | A | 10/2019 |
| CN | 305407445 | | 10/2019 |
| CN | 110447372 | A | 11/2019 |
| CN | 209676901 | U | 11/2019 |
| CN | 305447400 | | 11/2019 |
| CN | 305452583 | | 11/2019 |
| CN | 110584551 | A | 12/2019 |
| CN | 110622680 | A | 12/2019 |
| CN | 209861609 | U | 12/2019 |
| CN | 305523640 | | 12/2019 |
| CN | 209955654 | U | 1/2020 |
| CN | 209964645 | U | 1/2020 |
| CN | 305574602 | | 1/2020 |
| CN | 110764495 | A | 2/2020 |
| CN | 110850858 | A | 2/2020 |
| CN | 110850860 | A | 2/2020 |
| CN | 110852133 | A | 2/2020 |
| CN | 210016305 | U | 2/2020 |
| CN | 210116329 | U | 2/2020 |
| CN | 305596393 | | 2/2020 |
| CN | 105988472 | B | 3/2020 |
| CN | 107493797 | B | 3/2020 |
| CN | 110881903 | A | 3/2020 |
| CN | 110895411 | A | 3/2020 |
| CN | 110915409 | A | 3/2020 |
| CN | 110928280 | A | 3/2020 |

(56) References Cited

FOREIGN PATENT DOCUMENTS

| | | | |
|---|---|---|---|
| CN | 110928285 A | 3/2020 |
| CN | 107643751 B | 4/2020 |
| CN | 111034450 A | 4/2020 |
| CN | 111045423 A | 4/2020 |
| CN | 305716236 | 4/2020 |
| CN | 107643750 B | 5/2020 |
| CN | 108142070 B | 5/2020 |
| CN | 111123910 A | 5/2020 |
| CN | 111165158 A | 5/2020 |
| CN | 210444878 U | 5/2020 |
| CN | 210580043 U | 5/2020 |
| CN | 305750432 | 5/2020 |
| CN | 305757781 | 5/2020 |
| CN | 305789888 | 5/2020 |
| CN | 111226569 A | 6/2020 |
| CN | 210782124 U | 6/2020 |
| CN | 210808273 U | 6/2020 |
| CN | 210821640 U | 6/2020 |
| CN | 210839520 U | 6/2020 |
| CN | 305827495 | 6/2020 |
| CN | 305827496 | 6/2020 |
| CN | 305827503 | 6/2020 |
| CN | 305860595 | 6/2020 |
| CN | 305860598 | 6/2020 |
| CN | 305869411 | 6/2020 |
| CN | 106717462 B | 7/2020 |
| CN | 108811699 B | 7/2020 |
| CN | 210900401 U | 7/2020 |
| CN | 210987056 U | 7/2020 |
| CN | 211015146 U | 7/2020 |
| CN | 305946746 | 7/2020 |
| CN | 305946760 | 7/2020 |
| CN | 111487982 A | 8/2020 |
| CN | 111512766 A | 8/2020 |
| CN | 211212948 U | 8/2020 |
| CN | 305989577 | 8/2020 |
| CN | 306019404 | 8/2020 |
| CN | 105988471 B | 9/2020 |
| CN | 111685651 A | 9/2020 |
| CN | 211531846 U | 9/2020 |
| CN | 211580673 U | 9/2020 |
| CN | 107637255 B | 10/2020 |
| CN | 110754204 B | 10/2020 |
| CN | 111742692 A | 10/2020 |
| CN | 111766589 A | 10/2020 |
| CN | 111819988 A | 10/2020 |
| CN | 211721118 U | 10/2020 |
| CN | 211721119 U | 10/2020 |
| CN | 211741921 U | 10/2020 |
| CN | 211741924 U | 10/2020 |
| CN | 306085189 | 10/2020 |
| CN | 306128197 | 10/2020 |
| CN | 306140210 | 10/2020 |
| CN | 306174630 | 11/2020 |
| CN | 112009175 A | 12/2020 |
| CN | 112119742 A | 12/2020 |
| CN | 112120620 A | 12/2020 |
| CN | 112134314 A | 12/2020 |
| CN | 112147992 A | 12/2020 |
| CN | 212061111 U | 12/2020 |
| CN | 212116218 U | 12/2020 |
| CN | 212116223 U | 12/2020 |
| CN | 306223128 | 12/2020 |
| CN | 306236075 | 12/2020 |
| CN | 306236808 | 12/2020 |
| CN | 112230636 A | 1/2021 |
| CN | 112230637 A | 1/2021 |
| CN | 112230644 A | 1/2021 |
| CN | 112235760 A | 1/2021 |
| CN | 112259866 A | 1/2021 |
| CN | 112261631 A | 1/2021 |
| CN | 212304892 U | 1/2021 |
| CN | 212305863 U | 1/2021 |
| CN | 306278588 | 1/2021 |
| CN | 306303188 | 1/2021 |
| CN | 106909140 B | 2/2021 |
| CN | 109247117 B | 2/2021 |
| CN | 109683556 B | 2/2021 |
| CN | 112306049 A | 2/2021 |
| CN | 112385401 A | 2/2021 |
| CN | 112400453 A | 2/2021 |
| CN | 212499740 U | 2/2021 |
| CN | 212515710 U | 2/2021 |
| CN | 212520009 U | 2/2021 |
| CN | 212539202 U | 2/2021 |
| CN | 212572469 U | 2/2021 |
| CN | 212621511 U | 2/2021 |
| CN | 306328112 | 2/2021 |
| CN | 112435422 A | 3/2021 |
| CN | 112438114 A | 3/2021 |
| CN | 112445221 A | 3/2021 |
| CN | 112449864 A | 3/2021 |
| CN | 112492956 A | 3/2021 |
| CN | 112514637 A | 3/2021 |
| CN | 112567959 A | 3/2021 |
| CN | 112567961 A | 3/2021 |
| CN | 212696648 U | 3/2021 |
| CN | 212696668 U | 3/2021 |
| CN | 306358736 | 3/2021 |
| CN | 112602441 A | 4/2021 |
| CN | 112720451 A | 4/2021 |
| CN | 112731935 A | 4/2021 |
| CN | 212876733 U | 4/2021 |
| CN | 212906002 U | 4/2021 |
| CN | 212933333 U | 4/2021 |
| CN | 212970834 U | 4/2021 |
| CN | 213075541 U | 4/2021 |
| CN | 213091901 U | 4/2021 |
| CN | 112740889 A | 5/2021 |
| CN | 112764419 A | 5/2021 |
| CN | 112769424 A | 5/2021 |
| CN | 112773264 A | 5/2021 |
| CN | 112799395 A | 5/2021 |
| CN | 112799399 A | 5/2021 |
| CN | 112823584 A | 5/2021 |
| CN | 112824993 A | 5/2021 |
| CN | 112826376 A | 5/2021 |
| CN | 112840828 A | 5/2021 |
| CN | 112859828 A | 5/2021 |
| CN | 213187216 U | 5/2021 |
| CN | 213210764 U | 5/2021 |
| CN | 213214364 U | 5/2021 |
| CN | 213240579 U | 5/2021 |
| CN | 306511371 | 5/2021 |
| CN | 306530808 | 5/2021 |
| CN | 306569554 | 5/2021 |
| CN | 306569555 | 5/2021 |
| CN | 306569560 | 5/2021 |
| CN | 107976995 B | 6/2021 |
| CN | 110122045 B | 6/2021 |
| CN | 112947399 A | 6/2021 |
| CN | 112970414 A | 6/2021 |
| CN | 113039919 A | 6/2021 |
| CN | 213306269 U | 6/2021 |
| CN | 306604261 | 6/2021 |
| CN | 113064419 A | 7/2021 |
| CN | 113156928 A | 7/2021 |
| CN | 113156929 A | 7/2021 |
| CN | 213814000 U | 7/2021 |
| CN | 306670241 | 7/2021 |
| CN | 306680105 | 7/2021 |
| CN | 306694791 | 7/2021 |
| CN | 106300578 B | 8/2021 |
| CN | 108781704 B | 8/2021 |
| CN | 113311830 A | 8/2021 |
| CN | 213850492 U | 8/2021 |
| CN | 213921292 U | 8/2021 |
| CN | 306745285 | 8/2021 |
| CN | 306753239 | 8/2021 |
| CN | 306768440 | 8/2021 |
| CN | 113366964 A | 9/2021 |
| CN | 113439526 A | 9/2021 |
| CN | 113448259 A | 9/2021 |
| CN | 214126036 U | 9/2021 |

(56) References Cited

FOREIGN PATENT DOCUMENTS

| | | | |
|---|---|---|---|
| CN | 214151499 U | 9/2021 |
| CN | 214178073 U | 9/2021 |
| CN | 214240309 U | 9/2021 |
| CN | 306824139 | 9/2021 |
| CN | 306839148 | 9/2021 |
| CN | 306846782 | 9/2021 |
| CN | 113455167 A | 10/2021 |
| CN | 113552873 A | 10/2021 |
| CN | 113552874 A | 10/2021 |
| CN | 214508006 U | 10/2021 |
| CN | 306880401 | 10/2021 |
| CN | 113721749 A | 11/2021 |
| CN | 214852822 U | 11/2021 |
| CN | 113759377 A | 12/2021 |
| CN | 113759886 A | 12/2021 |
| CN | 113771556 A | 12/2021 |
| CN | 113778084 A | 12/2021 |
| CN | 113805573 A | 12/2021 |
| CN | 113812251 A | 12/2021 |
| CN | 215011658 U | 12/2021 |
| CN | 215041875 U | 12/2021 |
| CN | 215073955 U | 12/2021 |
| CN | 215122126 U | 12/2021 |
| CN | 215223139 U | 12/2021 |
| CN | 215223140 U | 12/2021 |
| CN | 215244172 U | 12/2021 |
| CN | 215269503 U | 12/2021 |
| CN | 215321765 U | 12/2021 |
| CN | 307001745 | 12/2021 |
| CN | 307035324 | 12/2021 |
| CN | 113892332 A | 1/2022 |
| CN | 113970918 A | 1/2022 |
| CN | 307047963 | 1/2022 |
| CN | 307047966 | 1/2022 |
| CN | 114089423 A | 2/2022 |
| CN | 215774282 U | 2/2022 |
| CN | 215813854 U | 2/2022 |
| CN | 215911524 U | 2/2022 |
| CN | 307125064 | 2/2022 |
| CN | 114097400 A | 3/2022 |
| CN | 307168522 | 3/2022 |
| CN | 307168531 | 3/2022 |
| CN | 307168534 | 3/2022 |
| CN | 307168536 | 3/2022 |
| CN | 307202311 | 3/2022 |
| CN | 216153511 U | 4/2022 |
| CN | 216253986 U | 4/2022 |
| CN | 307222105 | 4/2022 |
| CN | 307243485 | 4/2022 |
| CN | 307265564 | 4/2022 |
| CN | 307265565 | 4/2022 |
| CN | 307278021 | 4/2022 |
| CN | 307278029 | 4/2022 |
| CN | 307301254 | 4/2022 |
| CN | 216507708 U | 5/2022 |
| CN | 216610752 U | 5/2022 |
| CN | 307325242 | 5/2022 |
| CN | 307337031 | 5/2022 |
| CN | 307347754 | 5/2022 |
| CN | 307347757 | 5/2022 |
| CN | 307369096 | 5/2022 |
| CN | 307369129 | 5/2022 |
| CN | 307376792 | 5/2022 |
| CN | 115666221 A | 1/2023 |
| DE | 7345220 U | 6/1974 |
| DE | 7345211 U | 11/1974 |
| DE | 2437756 A1 | 3/1975 |
| DE | 2448130 A1 | 4/1976 |
| DE | 7609000 U1 | 9/1977 |
| DE | 2612381 A1 | 10/1977 |
| DE | 19521067 A1 | 12/1996 |
| DE | 19644057 A1 | 5/1998 |
| DE | 29823263 U1 | 4/1999 |
| DE | 19933340 A1 | 1/2001 |
| DE | 20308046 U1 | 7/2003 |
| DE | 10302908 A1 | 8/2004 |
| DE | 102006038553 A1 | 2/2008 |
| DE | 102007053310 A1 | 6/2009 |
| DE | 102007060056 A1 | 6/2009 |
| DE | 102008011947 A1 | 9/2009 |
| DE | 202010007832 U1 | 8/2010 |
| DE | 402010004757-0001 | 12/2010 |
| DE | 102009027557 A1 | 1/2011 |
| DE | 202012011298 U1 | 1/2013 |
| DE | 202012009375 U1 | 4/2013 |
| DE | 102013202075 A1 | 8/2014 |
| DE | 102013203549 A1 | 9/2014 |
| DE | 102013203705 A1 | 9/2014 |
| DE | 202014005547 U1 | 9/2014 |
| DE | 202014102390 U1 | 9/2014 |
| DE | 102014211712 A1 | 2/2015 |
| DE | 102014112587 A1 | 3/2015 |
| DE | 102014208434 A1 | 11/2015 |
| DE | 102014210277 A1 | 12/2015 |
| DE | 102014212399 A1 | 12/2015 |
| DE | 102016205336 A1 | 10/2017 |
| DE | 102016219270 A1 | 4/2018 |
| DE | 102016222659 A1 | 5/2018 |
| DE | 202018100833 U1 | 5/2018 |
| DE | 202018100835 U1 | 5/2018 |
| DE | 202018100836 U1 | 5/2018 |
| DE | 102017204865 A1 | 9/2018 |
| DE | 102018206803 A1 | 11/2019 |
| DE | 202015009764 U1 | 1/2020 |
| DE | 102019206856 A1 | 11/2020 |
| DE | 102019214995 A1 | 4/2021 |
| DE | 102019215913 A1 | 4/2021 |
| DE | 102021100122 A1 | 7/2021 |
| DE | 102020202740 A1 | 9/2021 |
| EP | 1364571 A2 | 11/2003 |
| EP | 1709859 A1 | 10/2006 |
| EP | 1898289 A2 | 3/2008 |
| EP | 2006708 A1 | 12/2008 |
| EP | 2026161 A2 | 2/2009 |
| EP | 2163352 A2 | 3/2010 |
| EP | 2248409 A1 | 11/2010 |
| EP | 2269433 A1 | 1/2011 |
| EP | 2286653 A2 | 2/2011 |
| EP | 2296072 A2 | 3/2011 |
| EP | 2425700 A2 | 3/2012 |
| EP | 2586283 A1 | 5/2013 |
| EP | 2687077 A2 | 1/2014 |
| EP | 2693072 A1 | 2/2014 |
| EP | 2798937 A1 | 11/2014 |
| EP | 2823936 A2 | 1/2015 |
| EP | 2851760 A1 | 3/2015 |
| EP | 2875712 A1 | 5/2015 |
| EP | 2717110 B1 | 8/2015 |
| EP | 2959764 A1 | 12/2015 |
| EP | 2960741 A2 | 12/2015 |
| EP | 2960742 A1 | 12/2015 |
| EP | 2783561 B1 | 3/2016 |
| EP | 2692220 B1 | 4/2016 |
| EP | 3047719 A1 | 7/2016 |
| EP | 3118016 A1 | 1/2017 |
| EP | 3165075 A1 | 5/2017 |
| EP | 3167699 A1 | 5/2017 |
| EP | 3167700 A1 | 5/2017 |
| EP | 3222132 A2 | 9/2017 |
| EP | 2883437 B1 | 3/2018 |
| EP | 3316067 A1 | 5/2018 |
| EP | 2743789 B1 | 6/2018 |
| EP | 3330824 A1 | 6/2018 |
| EP | 3366102 A1 | 8/2018 |
| EP | 3381258 A1 | 10/2018 |
| EP | 3479682 A1 | 5/2019 |
| EP | 2960100 B1 | 8/2019 |
| EP | 3520593 A1 | 8/2019 |
| EP | 3528213 A1 | 8/2019 |
| EP | 3534183 A1 | 9/2019 |
| EP | 3597090 A1 | 1/2020 |
| EP | 3660618 A1 | 6/2020 |
| EP | 3725146 A1 | 10/2020 |
| EP | 3753387 A1 | 12/2020 |

(56) References Cited

FOREIGN PATENT DOCUMENTS

| | | | |
|---|---|---|---|
| EP | 3791708 A1 | 3/2021 |
| EP | 3831544 A1 | 6/2021 |
| EP | 3837944 A1 | 6/2021 |
| EP | 3837945 A1 | 6/2021 |
| EP | 3837946 A1 | 6/2021 |
| EP | 3861911 A2 | 8/2021 |
| ES | 199267 U | 7/1975 |
| ES | 451339 A1 | 12/1977 |
| FR | 2771141 A1 | 5/1999 |
| FR | 3114537 A1 | 4/2022 |
| GB | 1288108 A | 3/1971 |
| GB | 1371959 A | 10/1974 |
| GB | 1451896 A | 10/1976 |
| GB | 1452308 A | 10/1976 |
| GB | 1489373 A | 10/1977 |
| GB | 1526519 A | 9/1978 |
| GB | 1557379 A | 12/1979 |
| GB | 2287170 A | 9/1995 |
| GB | 2295304 A | 5/1996 |
| GB | 2305840 A | 4/1997 |
| GB | 2419430 A | 4/2006 |
| GB | 2432922 A | 6/2007 |
| GB | 2433791 A | 7/2007 |
| GB | 90017056580001 | 5/2010 |
| GB | 2500168 A | 9/2013 |
| GB | 90024715400001 | 8/2014 |
| GB | 2513960 A | 11/2014 |
| GB | 2515556 A | 12/2014 |
| GB | 2516370 A | 1/2015 |
| GB | 90027012680001 | 5/2015 |
| GB | 90027378900001 | 10/2015 |
| GB | 90041329260001 | 9/2017 |
| GB | 90029638920001 | 3/2018 |
| GB | 90056318840001 | 9/2018 |
| GB | 2563347 A | 12/2018 |
| GB | 90040756950001 | 6/2019 |
| GB | 90073918420006 | 1/2020 |
| GB | 90080413210001 | 8/2020 |
| GB | 2581956 A | 9/2020 |
| GB | 90081876860001 | 10/2020 |
| GB | 6195686 | 5/2022 |
| JP | 2006251883 A | 9/2006 |
| JP | 2006268497 A | 10/2006 |
| JP | 2011020615 A | 2/2011 |
| JP | 2015149963 A | 8/2015 |
| KR | 20130044130 A | 5/2013 |
| KR | 20150125305 A | 11/2015 |
| SE | 538774 C2 | 11/2016 |
| SE | 540834 C2 | 11/2018 |
| SE | 542098 C2 | 2/2020 |
| SE | 543019 C2 | 9/2020 |
| SE | 543247 C2 | 10/2020 |
| SE | 2150377 A1 | 3/2021 |
| SE | 1951390 A1 | 6/2021 |
| SE | 2150080 A1 | 6/2021 |
| SE | 2050216 A1 | 8/2021 |
| SE | 543941 C2 | 9/2021 |
| SE | 543943 C2 | 9/2021 |
| SE | 2150193 A1 | 10/2021 |
| SE | 2150394 A1 | 10/2021 |
| WO | WO9106435 A1 | 5/1991 |
| WO | WO9749528 A1 | 12/1997 |
| WO | WO0060921 A1 | 10/2000 |
| WO | WO0074466 A1 | 12/2000 |
| WO | WO03040846 A1 | 5/2003 |
| WO | WO03103375 A1 | 12/2003 |
| WO | WO2005002320 A1 | 1/2005 |
| WO | WO2006094887 A2 | 9/2006 |
| WO | WO2006094889 A1 | 9/2006 |
| WO | WO2006102740 A1 | 10/2006 |
| WO | WO2007091967 A1 | 8/2007 |
| WO | WO2007140930 A1 | 12/2007 |
| WO | WO2008015479 A2 | 2/2008 |
| WO | WO2008060689 A2 | 5/2008 |
| WO | WO2008068494 A1 | 6/2008 |
| WO | WO2008095715 A2 | 8/2008 |
| WO | WO2008144135 A1 | 11/2008 |
| WO | WO2009036644 A1 | 3/2009 |
| WO | WO2009071379 A1 | 6/2009 |
| WO | WO2009077239 A1 | 6/2009 |
| WO | WO2009083319 A1 | 7/2009 |
| WO | WO2010077198 A1 | 7/2010 |
| WO | WO2010130479 A2 | 11/2010 |
| WO | WO2011115536 A1 | 9/2011 |
| WO | WO2012047176 A1 | 4/2012 |
| WO | WO2013010475 A1 | 1/2013 |
| WO | WO2013011252 A1 | 1/2013 |
| WO | WO2013025135 A1 | 2/2013 |
| WO | WO2013064301 A1 | 5/2013 |
| WO | WO2013081516 A1 | 6/2013 |
| WO | WO2013083311 A1 | 6/2013 |
| WO | WO2013102417 A1 | 7/2013 |
| WO | WO2013107266 A1 | 7/2013 |
| WO | WO2013107374 A1 | 7/2013 |
| WO | WO2013125992 A1 | 8/2013 |
| WO | WO2013185622 A1 | 12/2013 |
| WO | WO2014007694 A1 | 1/2014 |
| WO | WO2014056443 A1 | 4/2014 |
| WO | WO2014071860 A1 | 5/2014 |
| WO | WO2014079363 A1 | 5/2014 |
| WO | WO2014079632 A1 | 5/2014 |
| WO | WO2014086267 A1 | 6/2014 |
| WO | WO2014173290 A1 | 10/2014 |
| WO | WO2015010277 A1 | 1/2015 |
| WO | WO2015053488 A1 | 4/2015 |
| WO | WO2015144998 A1 | 10/2015 |
| WO | WO2015154822 A1 | 10/2015 |
| WO | WO2015161829 A1 | 10/2015 |
| WO | WO2015169343 A1 | 11/2015 |
| WO | WO2015172831 A1 | 11/2015 |
| WO | WO2015182514 A1 | 12/2015 |
| WO | WO2015192903 A1 | 12/2015 |
| WO | WO2016038512 A1 | 3/2016 |
| WO | WO2016097891 A1 | 6/2016 |
| WO | WO2016097892 A1 | 6/2016 |
| WO | WO2016097897 A1 | 6/2016 |
| WO | WO2016103070 A1 | 6/2016 |
| WO | WO2016108104 A1 | 7/2016 |
| WO | WO2016109721 A1 | 7/2016 |
| WO | WO2016119751 A1 | 8/2016 |
| WO | WO2016127923 A1 | 8/2016 |
| WO | WO2016131399 A1 | 8/2016 |
| WO | WO2016184398 A1 | 11/2016 |
| WO | WO2017101882 A1 | 6/2017 |
| WO | WO2017123137 A1 | 7/2017 |
| WO | WO2017129551 A1 | 8/2017 |
| WO | WO2017133625 A1 | 8/2017 |
| WO | WO2017148438 A1 | 9/2017 |
| WO | WO2017167207 A1 | 10/2017 |
| WO | WO2017181995 A1 | 10/2017 |
| WO | WO2017186372 A1 | 11/2017 |
| WO | WO2017190784 A1 | 11/2017 |
| WO | WO2017198222 A1 | 11/2017 |
| WO | WO2017206950 A1 | 12/2017 |
| WO | WO2017211308 A1 | 12/2017 |
| WO | WO2018001340 A1 | 1/2018 |
| WO | WO2018001358 A1 | 1/2018 |
| WO | WO2018010650 A1 | 1/2018 |
| WO | WO2018028624 A1 | 2/2018 |
| WO | WO2018057250 A1 | 3/2018 |
| WO | WO2018057452 A2 | 3/2018 |
| WO | WO2018057589 A1 | 3/2018 |
| WO | WO2018059323 A1 | 4/2018 |
| WO | WO2018103178 A1 | 6/2018 |
| WO | WO2018117190 A1 | 6/2018 |
| WO | WO2018125222 A1 | 7/2018 |
| WO | WO2018127209 A1 | 7/2018 |
| WO | WO2018146518 A1 | 8/2018 |
| WO | WO2018153599 A1 | 8/2018 |
| WO | WO2018174777 A1 | 9/2018 |
| WO | WO2018185376 A1 | 10/2018 |
| WO | WO2018199829 A1 | 11/2018 |
| WO | WO2019034382 A1 | 2/2019 |
| WO | WO2019063012 A1 | 4/2019 |

(56)         References Cited

FOREIGN PATENT DOCUMENTS

| | | | |
|---|---|---|---|
| WO | WO2019080935 | A1 | 5/2019 |
| WO | WO2019096052 | A1 | 5/2019 |
| WO | WO2019096463 | A1 | 5/2019 |
| WO | WO2019109982 | A1 | 6/2019 |
| WO | WO2019110013 | A1 | 6/2019 |
| WO | WO2019144916 | A1 | 8/2019 |
| WO | WO2019157841 | A1 | 8/2019 |
| WO | WO2019158090 | A1 | 8/2019 |
| WO | WO2019158452 | A1 | 8/2019 |
| WO | WO2019168069 | A1 | 9/2019 |
| WO | WO2019170142 | A1 | 9/2019 |
| WO | WO2019206274 | A1 | 10/2019 |
| WO | WO2019238099 | A1 | 12/2019 |
| WO | WO2020020652 | A1 | 1/2020 |
| WO | WO2020063811 | A1 | 4/2020 |
| WO | WO2020064087 | A1 | 4/2020 |
| WO | WO2020093970 | A1 | 5/2020 |
| WO | WO2020093992 | A1 | 5/2020 |
| WO | WO2020098666 | A1 | 5/2020 |
| WO | WO2020098670 | A1 | 5/2020 |
| WO | WO2020103696 | A1 | 5/2020 |
| WO | WO2020104242 | A1 | 5/2020 |
| WO | WO2020107007 | A1 | 5/2020 |
| WO | WO2020107772 | A1 | 6/2020 |
| WO | WO2020108267 | A1 | 6/2020 |
| WO | WO2020108550 | A1 | 6/2020 |
| WO | WO2020114415 | A1 | 6/2020 |
| WO | WO2020125450 | A1 | 6/2020 |
| WO | WO2020134667 | A1 | 7/2020 |
| WO | WO2020148138 | A1 | 7/2020 |
| WO | WO2020155853 | A1 | 8/2020 |
| WO | WO2020156519 | A1 | 8/2020 |
| WO | WO2020156684 | A1 | 8/2020 |
| WO | WO2020156851 | A1 | 8/2020 |
| WO | WO2020161021 | A1 | 8/2020 |
| WO | WO2020170933 | A1 | 8/2020 |
| WO | WO2020193513 | A1 | 10/2020 |
| WO | WO2020199055 | A1 | 10/2020 |
| WO | WO2020218960 | A1 | 10/2020 |
| WO | WO2020256619 | A1 | 12/2020 |
| WO | WO2020259586 | A1 | 12/2020 |
| WO | WODM212022 | | 12/2020 |
| WO | WO2021013173 | A1 | 1/2021 |
| WO | WO2021023227 | A1 | 2/2021 |
| WO | WO2021031418 | A1 | 2/2021 |
| WO | WO2021031423 | A1 | 2/2021 |
| WO | WO2021031451 | A1 | 2/2021 |
| WO | WO2021036033 | A1 | 3/2021 |
| WO | WO2021036077 | A1 | 3/2021 |
| WO | WO2021047063 | A1 | 3/2021 |
| WO | WO2021047068 | A1 | 3/2021 |
| WO | WO2021047602 | A1 | 3/2021 |
| WO | WO2021068370 | A1 | 4/2021 |
| WO | WO2021068928 | A1 | 4/2021 |
| WO | WO2021078220 | A1 | 4/2021 |
| WO | WO2021082817 | A1 | 5/2021 |
| WO | WO2021088551 | A1 | 5/2021 |
| WO | WO2021088553 | A1 | 5/2021 |
| WO | WO2021088558 | A1 | 5/2021 |
| WO | WO2021093474 | A1 | 5/2021 |
| WO | WO2021093526 | A1 | 5/2021 |
| WO | WO2021093851 | A1 | 5/2021 |
| WO | WO2021098382 | A1 | 5/2021 |
| WO | WO2021103803 | A1 | 6/2021 |
| WO | WO2021103804 | A1 | 6/2021 |
| WO | WO2021110414 | A1 | 6/2021 |
| WO | WO2021114988 | A1 | 6/2021 |
| WO | WO2021115364 | A1 | 6/2021 |
| WO | WO2021136234 | A1 | 7/2021 |
| WO | WO2021139389 | A1 | 7/2021 |
| WO | WO2021139683 | A1 | 7/2021 |
| WO | WO2021139685 | A1 | 7/2021 |
| WO | WO2021139809 | A1 | 7/2021 |
| WO | WO2021147494 | A1 | 7/2021 |
| WO | WO2021147792 | A1 | 7/2021 |
| WO | WO2021164738 | A1 | 8/2021 |
| WO | WO2021175331 | A1 | 9/2021 |
| WO | WO2021180123 | A1 | 9/2021 |
| WO | WO2021190627 | A1 | 9/2021 |
| WO | WO2021208308 | A1 | 10/2021 |
| WO | WO2021215980 | A1 | 10/2021 |
| WO | WODM217452 | | 10/2021 |
| WO | WO2021225494 | A1 | 11/2021 |
| WO | WO2021230791 | A1 | 11/2021 |
| WO | WO2021233205 | A1 | 11/2021 |
| WO | WO2022042362 | A1 | 3/2022 |

OTHER PUBLICATIONS

US 8,275,482 B2, 09/2012, Casey et al. (withdrawn)
US 10,675,758 B2, 06/2020, Cohen et al. (withdrawn)
US 10,798,874 B2, 10/2020, Balutis et al. (withdrawn)
US 10,952,370 B2, 03/2021, Matt et al. (withdrawn)
Extended European Search Report for Application No. 23153636.8 dated Oct. 18, 2023 (7 pages).

* cited by examiner

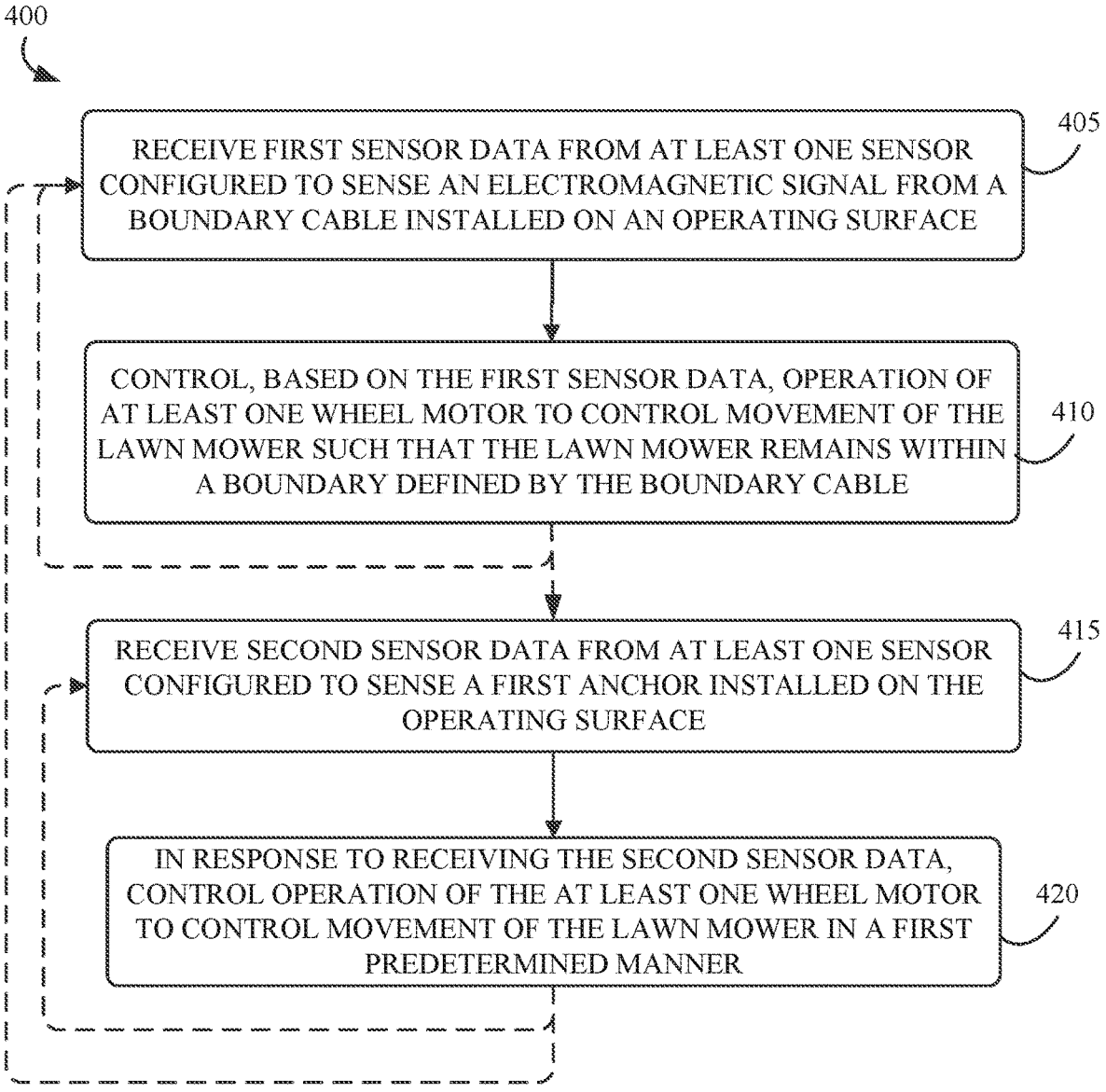

400

405

RECEIVE FIRST SENSOR DATA FROM AT LEAST ONE SENSOR CONFIGURED TO SENSE AN ELECTROMAGNETIC SIGNAL FROM A BOUNDARY CABLE INSTALLED ON AN OPERATING SURFACE

410

CONTROL, BASED ON THE FIRST SENSOR DATA, OPERATION OF AT LEAST ONE WHEEL MOTOR TO CONTROL MOVEMENT OF THE LAWN MOWER SUCH THAT THE LAWN MOWER REMAINS WITHIN A BOUNDARY DEFINED BY THE BOUNDARY CABLE

415

RECEIVE SECOND SENSOR DATA FROM AT LEAST ONE SENSOR CONFIGURED TO SENSE A FIRST ANCHOR INSTALLED ON THE OPERATING SURFACE

420

IN RESPONSE TO RECEIVING THE SECOND SENSOR DATA, CONTROL OPERATION OF THE AT LEAST ONE WHEEL MOTOR TO CONTROL MOVEMENT OF THE LAWN MOWER IN A FIRST PREDETERMINED MANNER

FIG. 4

ROBOTIC GARDEN TOOL

RELATED APPLICATIONS

This application claims priority to U.S. Provisional Application No. 63/305,044, filed on Jan. 31, 2022, the entire contents of which are hereby incorporated by reference.

FIELD

The present disclosure relates to robotic garden tools, particularly to methods for controlling a robotic lawn mower in response to detecting one or more anchors installed on an operating surface on which the robotic lawn mower is configured to move.

SUMMARY

One embodiment includes a robotic garden tool that may include a housing, and a set of wheels coupled to the housing and configured to rotate to propel the robotic garden tool on an operating surface. The robotic garden tool may also include at least one wheel motor coupled to one or more wheels of the set of wheels. The at least one wheel motor may be configured to drive rotation of the one or more wheels. The robotic garden tool may also include a plurality of sensors. The plurality of sensor may include a first sensor configured to sense an electromagnetic signal from a boundary cable installed on the operating surface, and a second sensor configured to sense a first anchor installed on the operating surface. The robotic garden tool may also include an electronic processor in communication with the plurality of sensors. The electronic processor may be configured to receive first sensor data from the first sensor configured to sense the electromagnetic signal from the boundary cable. The first sensor data may correspond to the electromagnetic signal from the boundary cable. The electronic processor may also be configured to control, based on the first sensor data, operation of the at least one wheel motor to control movement of the robotic garden tool such that the robotic garden tool remains within a boundary defined by the boundary cable. The electronic processor may also be configured to receive second sensor data from the second sensor configured to sense the first anchor. The second sensor data may indicate a sensing of the first anchor. The electronic processor may also be configured to, in response to receiving the second sensor data, control operation of the at least one wheel motor to control movement of the robotic garden tool in a first predetermined manner.

In some instances, the electronic processor may be configured to control operation of the at least one wheel motor to control movement of the robotic garden tool in the first predetermined manner by controlling the robotic garden tool to move until the electronic processor receives third sensor data from at least one of the plurality of sensors that indicates a sensing of the electromagnetic signal from the boundary cable. The electronic processor may be further configured to control operation of the at least one wheel motor to control movement of the robotic garden tool in the first predetermined manner by controlling the robotic garden tool to move along the boundary cable. The electronic processor may be further configured to control operation of the at least one wheel motor to control movement of the robotic garden tool in the first predetermined manner by receiving, from at least one of the plurality of sensors, fourth sensor data that indicates a sensing of a second anchor installed on the operating surface. The second anchor may be different than the first anchor. The electronic processor may be further configured to control operation of the at least one wheel motor to control movement of the robotic garden tool in the first predetermined manner by, in response to receiving the fourth sensor data, controlling the robotic garden tool to move away from the boundary cable.

In some instances, the robotic garden tool may also include a network interface. The electronic processor may be configured to communicate with an external device via the network interface. The electronic processor may be further configured to receive a first anchor setting from the external device. The first anchor setting may indicate the first predetermined manner in which the electronic processor is to control operation of the at least one wheel motor to control movement of the robotic garden tool in response to receiving the second sensor data. The first anchor setting may be selected, via a first user input on the external device, from among a plurality of anchor setting options.

In some instances, the electronic processor may be further configured to receive a second anchor setting from the external device to replace the first anchor setting. The second anchor setting may be selected, via a second user input on the external device, from among the plurality of anchor setting options. The second anchor setting may indicate a second predetermined manner in which the electronic processor is to control operation of the at least one wheel motor to control movement of the robotic garden tool in response to receiving the second sensor data. The second predetermined manner may be different than the first predetermined manner and may be configured to replace the first predetermined manner. The electronic processor may be further configured to, in response to receiving the second sensor data, control operation of the at least one wheel motor to control movement of the robotic garden tool in the second predetermined manner.

In some instances, at least one of the plurality of sensors may be configured to sense a second anchor installed on the operating surface. The electronic processor may be configured to receive third sensor data from the at least one of the plurality of sensors that is configured to sense the second anchor. The third sensor data may indicate a sensing of the second anchor. The electronic processor may be further configured to distinguish the second sensor data from the third sensor data to determine whether the first anchor or the second anchor has been sensed. The electronic processor may be further configured to, in response to receiving the third sensor data, control operation of the at least one wheel motor to control movement of the robotic garden tool in a second predetermined manner that is different than the first predetermined manner.

In some instances, the second sensor configured to sense the first anchor may be configured to sense the first anchor by at least one of sensing an active signal emitted by the first anchor, and sensing a passive signal emitted by the first anchor.

In some instances, the second sensor configured to sense the first anchor may also be configured to sense the electromagnetic signal from the boundary cable. In some instances, the robotic garden tool may also include a cutting blade assembly coupled to the housing and configured to rotate with respect to the housing. The robotic garden tool also may include a cutting blade assembly motor coupled to the cutting blade assembly and configured to drive rotation of the cutting blade assembly. In response to receiving the second sensor data, the electronic processor may be configured to control operation of the cutting blade assembly motor in a second predetermined manner.

Another embodiment includes a method of controlling a robotic garden tool. The method may include receiving, with an electronic processor of the robotic garden tool, first sensor data from a first sensor of the robotic garden tool. The first sensor may be configured to sense an electromagnetic signal from a boundary cable installed on an operating surface. The first sensor data may correspond to the electromagnetic signal from the boundary cable. The method may also include controlling, with the electronic processor and based on the first sensor data, operation of at least one wheel motor of the robotic garden tool to control movement of the robotic garden tool such that the robotic garden tool remains within a boundary defined by the boundary cable. The at least one wheel motor may be coupled to one or more wheels of a set of wheels of the robotic garden tool. The at least one wheel motor may be configured to drive rotation of the one or more wheels. The set of wheels may be coupled to a housing of the robotic garden tool. The set of wheels may be configured to rotate to propel the robotic garden tool on the operating surface. The method may also include receiving, with the electronic processor, second sensor data from a second sensor of the robotic garden tool. The second sensor may be configured to sense a first anchor installed on the operating surface. The second sensor data may indicate a sensing of the first anchor. The method may also include, in response to receiving the second sensor data, controlling, with the electronic processor, operation of the at least one wheel motor to control movement of the robotic garden tool in a first predetermined manner.

In some instances, controlling operation of the at least one wheel motor to control movement of the robotic garden tool in the first predetermined manner includes controlling, with the electronic processor, the robotic garden tool to move until the electronic processor receives third sensor data from at least one of the group consisting of the first sensor, the second sensor, another sensor of the robotic garden tool, and combinations thereof that indicates a sensing of the electromagnetic signal from the boundary cable. Controlling operation of the at least one wheel motor to control movement of the robotic garden tool in the first predetermined manner may also include controlling, with the electronic processor, the robotic garden tool to move along the boundary cable. Controlling operation of the at least one wheel motor to control movement of the robotic garden tool in the first predetermined manner may also include receiving, with the electronic processor and from at least one of the group consisting of the first sensor, the second sensor, the another sensor of the robotic garden tool, and combinations thereof, fourth sensor data that indicates a sensing of a second anchor installed on the operating surface. The second anchor may be different than the first anchor. Controlling operation of the at least one wheel motor to control movement of the robotic garden tool in the first predetermined manner may also include, in response to receiving the fourth sensor data, controlling, with the electronic processor, the robotic garden tool to move away from the boundary cable.

In some instances, the method may also include communicating, using the electronic processor, with an external device via a network interface of the robotic garden tool. The method may also include receiving, with the electronic processor, a first anchor setting from the external device. The first anchor setting may indicate the first predetermined manner in which the electronic processor is to control operation of the at least one wheel motor to control movement of the robotic garden tool in response to receiving the second sensor data. The first anchor setting may be selected, via a first user input on the external device, from among a plurality of anchor setting options.

In some instances, the method may also include receiving, with the electronic processor, a second anchor setting from the external device to replace the first anchor setting. The second anchor setting may be selected, via a second user input on the external device, from among the plurality of anchor setting options. The second anchor setting may indicate a second predetermined manner in which the electronic processor is to control operation of the at least one wheel motor to control movement of the robotic garden tool in response to receiving the second sensor data. The second predetermined manner may be different than the first predetermined manner and may be configured to replace the first predetermined manner. The method may also include, in response to receiving the second sensor data, controlling, with the electronic processor, operation of the at least one wheel motor to control movement of the robotic garden tool in the second predetermined manner.

In some instances, the method may also include receiving, with the electronic processor, third sensor data from at least one of the group consisting of the first sensor, the second sensor, another sensor of the robotic garden tool, and combinations thereof. The third sensor data may indicate a sensing of a second anchor installed on the operating surface. The method may also include distinguishing, with the electronic processor, the second sensor data from the third sensor data to determine whether the first anchor or the second anchor has been sensed. The method may also include, in response to receiving the third sensor data, controlling, with the electronic processor, operation of the at least one wheel motor to control movement of the robotic garden tool in a second predetermined manner that is different than the first predetermined manner.

In some instances, receiving the second sensor data from the second sensor may include sensing, with the second sensor, the first anchor by at least one of sensing an active signal emitted by the first anchor, and sensing a passive signal emitted by the first anchor.

In some instances, the method may also include sensing, with the second sensor, the electromagnetic signal from the boundary cable.

In some instances, the method may also include, in response to receiving the second sensor data, controlling, with the electronic processor, operation of a cutting blade assembly motor of the robotic garden tool in a second predetermined manner. The cutting blade assembly motor may be configured to drive rotation of a cutting blade assembly that is coupled to the housing and may be configured to rotate with respect to the housing.

Another embodiment includes a robotic garden tool that may include a housing, and a set of wheels coupled to the housing and configured to rotate to propel the robotic garden tool on an operating surface. The robotic garden tool may also include at least one wheel motor coupled to one or more wheels of the set of wheels. The at least one wheel motor may be configured to drive rotation of the one or more wheels. The robotic garden tool may also include a sensor configured to sense a first anchor installed on the operating surface. The robotic garden tool may also include a network interface configured to communicate with an external device. The robotic garden tool may also include an electronic processor in communication with the sensor and the network interface. The electronic processor may be configured to receive sensor data from the sensor. The sensor data may indicate a sensing of the first anchor. The electronic processor may also be configured to, in response to receiving the sensor data, control operation of the at least one wheel motor to control movement of the robotic garden tool in a first predetermined manner. The electronic processor may also be configured to receive, via the network interface, a first anchor setting from the external device. The first anchor setting may indicate the first predetermined manner in which the electronic processor is to control operation of the at least one wheel motor to control movement of the robotic garden tool in response to receiving the sensor data. The first anchor setting may be selected, via a first user input on the external device.

In some instances, at least one of the group consisting of the sensor, another sensor of the robotic garden tool, and combinations thereof may be configured to sense an electromagnetic signal from a boundary cable installed on the operating surface. The electronic processor may be configured to receive second sensor data from at least one of the group consisting of the sensor, the another sensor of the robotic garden tool, and combinations thereof. The second sensor data may correspond to the electromagnetic signal from the boundary cable. The electronic processor may also be configured to control, based on the second sensor data, operation of the at least one wheel motor to control movement of the robotic garden tool such that the robotic garden tool remains within a boundary defined by the boundary cable.

In some instances, the electronic processor may be configured to control operation of the at least one wheel motor to control movement of the robotic garden tool in the first predetermined manner by controlling the robotic garden tool to move until the electronic processor receives the second sensor data from the at least one of the group consisting of the sensor, the another sensor of the robotic garden tool, and combinations thereof that indicates a sensing of the electromagnetic signal from the boundary cable. The electronic processor may be further configured to control operation of the at least one wheel motor to control movement of the robotic garden tool in the first predetermined manner by controlling the robotic garden tool to move along the boundary cable. The electronic processor may be further configured to control operation of the at least one wheel motor to control movement of the robotic garden tool in the first predetermined manner by receiving, from the at least one of the group consisting of the sensor, the another sensor of the robotic garden tool, and combinations thereof, third sensor data that indicates a sensing of a second anchor installed on the operating surface. The second anchor may be different than the first anchor. The electronic processor may be further configured to control operation of the at least one wheel motor to control movement of the robotic garden tool in the first predetermined manner by, in response to receiving the third sensor data, controlling the robotic garden tool to move away from the boundary cable.

In some instances, the electronic processor is also configured to receive, via the network interface, a second anchor setting from the external device to replace the first anchor setting. The second anchor setting may be selected, via a second user input on the external device. The second anchor setting may indicate a second predetermined manner in which the electronic processor is to control operation of the at least one wheel motor to control movement of the robotic garden tool in response to receiving the sensor data. The second predetermined manner may be different than the first predetermined manner and may be configured to replace the first predetermined manner. The electronic processor may also be configured to, in response to receiving the sensor data that indicates the sensing of the first anchor, control operation of the at least one wheel motor to control movement of the robotic garden tool in the second predetermined manner.

Other aspects of the disclosure will become apparent by consideration of the detailed description and accompanying drawings.

BRIEF DESCRIPTION OF THE DRAWINGS

FIG. 4 illustrates a flowchart of a method that may be performed by a first electronic processor of the robotic lawn mower of FIGS. 1A and 1B to control movement of the robotic lawn mower according to some example embodiments.

DETAILED DESCRIPTION

Figure 1A:
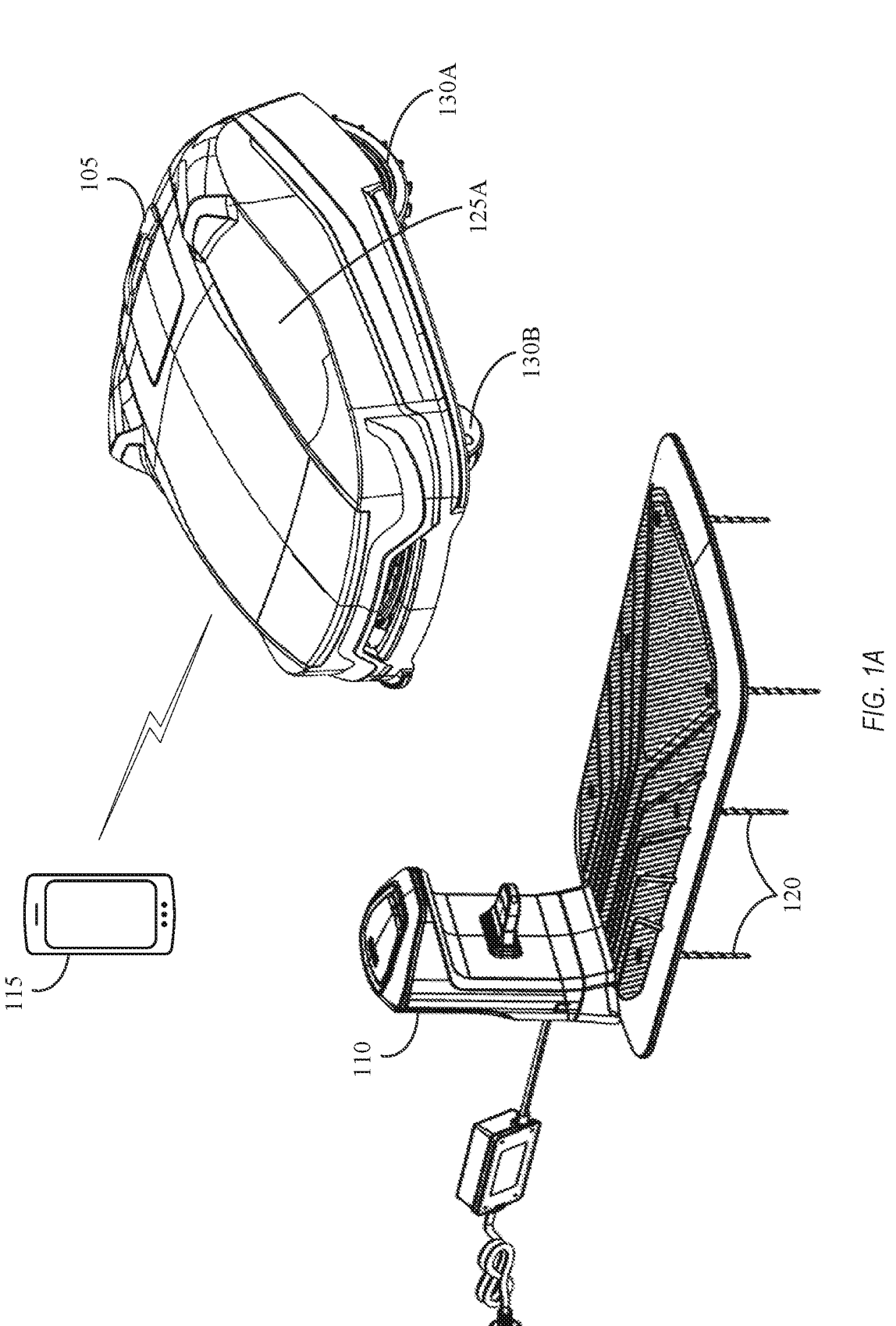
FIG. 1A illustrates a robotic lawn mower, a docking station for the robotic lawn mower, and an external device according to some example embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor," "central processing unit," and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

Throughout this application, the term "approximately" may be used to describe the dimensions of various components. In some situations, the term "approximately" means that the described dimension is within 1% of the stated value, within 5% of the stated value, within 10% of the stated value, or the like. When the term "and/or" is used in this application, it is intended to include any combination of the listed components. For example, if a component includes A and/or B, the component may include solely A, solely B, or A and B.

FIG. 1A illustrates a communication system 100 that may include a robotic tool 105 (e.g., a robotic garden tool 105 that may be a robotic lawn mower 105 that may also be referred to as a robotic mower 105), a docking station 110 for the robotic mower 105, and an external device 115 according to some example embodiments. The robotic garden tool 105 is primarily described as being a robotic lawn mower 105. However, in other embodiments, the robotic tool 105 may be configured to operate outdoors and may include a tool for sweeping debris, vacuuming debris, clearing debris, collecting debris, moving debris, etc. Debris may include plants (such as grass, leaves, flowers, stems, weeds, twigs, branches, etc., and clippings thereof), dust, dirt, jobsite debris, snow, and/or the like. In some instances, the robotic tool 105 may be configured to operate indoors and may include a tool for vacuuming, mopping, etc. Example implementations of the robotic tool 105 may include a vacuum cleaner, a trimmer, a string trimmer, a hedge trimmer, a sweeper, a cutter, a plow, a blower, a snow blower, etc.

In some embodiments, a lawn may include any type of property that includes grass, a crop, some other material to be trimmed, cleared, gathered, etc., and/or that includes some material to receive treatment from the robotic garden tool 105 (e.g., fertilizer to treat grass in the lawn). In some embodiments, a lawn may include paved portions of a property (e.g., a driveway), for example, when the robotic garden tool 105 is used for snow plowing/removal.

In some embodiments, the docking station 110 may be installed in a yard/lawn using stakes 120. The robotic mower 105 may be configured to mow the yard and dock at the docking station 110 in order to charge a battery 245 of the robotic mower 105 (see FIG. 2). In some embodiments, the docking station 110 is configured to make an electrical connection with a power supply (e.g., via a cord and plug connected to a wall outlet that is connected to a power grid) in order to provide charging current to the robotic mower 105 when the robotic mower 105 is electrically coupled with the docking station 110.

Figure 5:
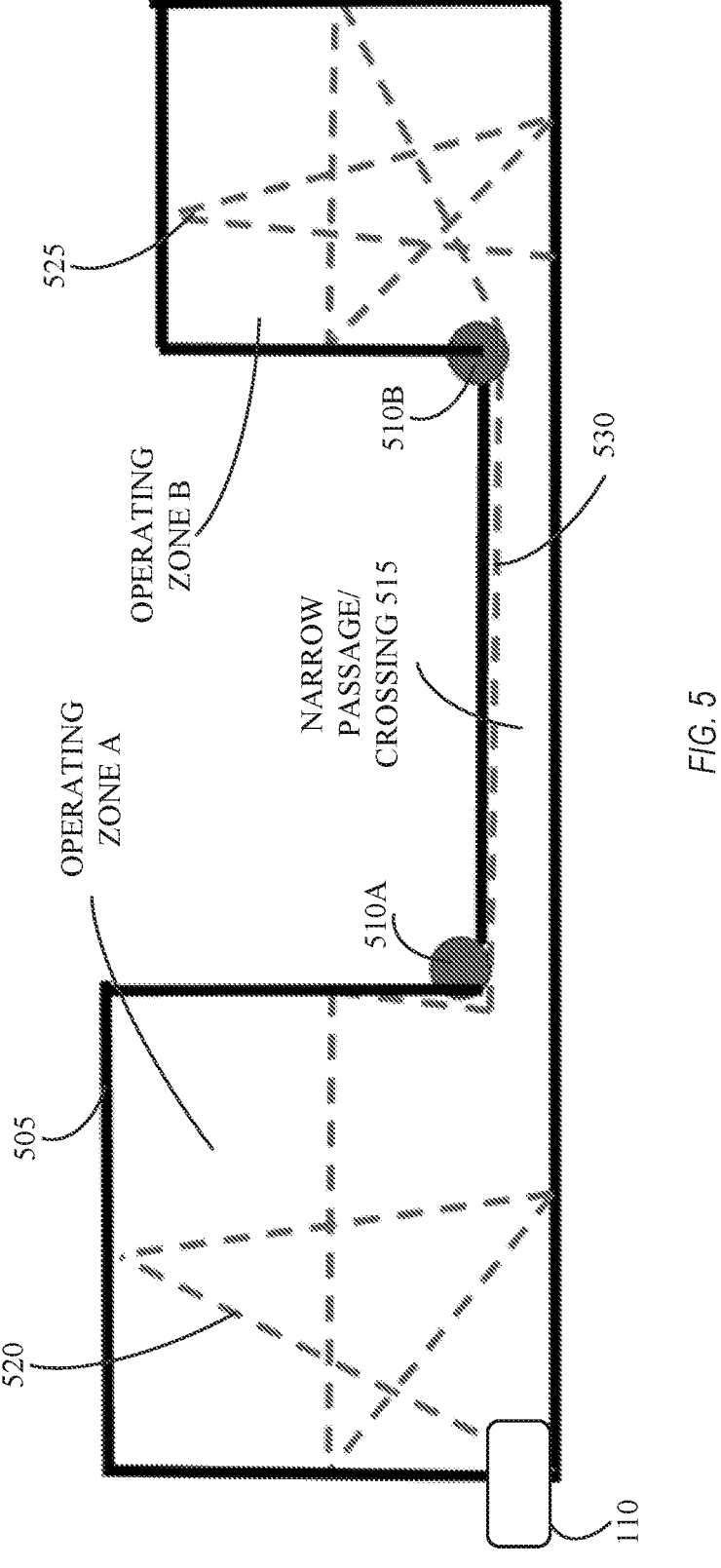
FIG. 5 illustrates an example use case of the robotic lawn mower shown in FIGS. 1A and 1B within an operating area defined by a boundary cable according to some example embodiments.

In some embodiments, the docking station 110 may also be electrically connected to a boundary cable 505 (i.e., boundary wire 505) (see FIG. 5). In some embodiments, the docking station 110 provides power to the boundary cable 505 to control the boundary cable 505 to provide/emit, for example, an electromagnetic signal that may be detected by the robotic mower 105. In some embodiments, the boundary cable 505 may be any cable, wire, etc. that is configured to transmit a signal and that is configured to be installed on an operating surface (e.g., a yard including grass) in a discrete and unobtrusive manner (e.g., secured at the base of the blades of grass against the ground/soil in which the grass is growing to prevent the robotic mower 105 and other people or objects from being physically obstructed by the boundary cable 505). For example, a plurality of pegs/stakes may be used to pin the boundary cable 505 to the ground/soil. As another example, the boundary cable 505 may be buried in the ground/soil underneath the grass (e.g., if the boundary cable 505 is installed when a plot of land is being developed). In some embodiments, in response to detecting the electromagnetic signal from the boundary cable 505, the robotic mower 105 is configured to control its movement such that the robotic mower 105 remains within a boundary defined by the boundary cable 505 as described in greater detail herein.

In some embodiments, the robotic mower 105 does not operate in conjunction with a boundary cable 505. Rather, the robotic mower 105 may include mapping capabilities, positioning tracking capabilities, and/or the like that allow the robotic mower 105 to remain within a predefined boundary without the use of the boundary cable 505.

In some embodiments, the docking station 110 includes a docking cable loop and/or another transmitting device configured to emit a docking signal that may be detected by the robotic mower 105. For example, the docking signal may indicate that the robotic mower 105 is near the docking station 110 and may allow the robotic mower 105 to take certain actions in response thereto to, for example, dock the robotic mower 105 at the docking station 110.

In some embodiments, one or more anchors 510 (see FIG. 5) are installed on the operating surface and are configured to be detected by the robotic mower 105 to cause the robotic mower 105 to operate in a predetermined manner as described in greater detail herein. In some embodiments, the anchors 510 are different than and in addition to the boundary cable 505 and the docking cable loop and/or another transmitting device configured to emit the docking signal.

As indicated in FIG. 1A, in some embodiments, the robotic mower 105 is configured to wirelessly communicate with the external device 115 when the two devices 105 and 115 are in communication range of each other (e.g., via Bluetooth™, WiFi™, or the like). The external device 115 may be, for example, a smart phone (as illustrated), a laptop computer, a tablet computer, a personal digital assistant (PDA), a wireless communication router that allows another external device 115 that is located remotely from the robotic mower 105 to communicate with the robotic mower 105, or another electronic device capable of communicating with the robotic mower 105. The external device 115 may generate a user interface and allow a user to access and interact with robotic mower information. The external device 115 may receive user inputs to determine operational parameters/instructions for the robotic mower 105, enable or disable features of the robotic mower 105, and the like. In some embodiments, the communication between the external device 115 and the robotic mower 105 may be wired (e.g., via a Universal Serial Bus (USB) cord configured to connect to respective USB ports of the external device 115 and the robotic mower 105).

Figure 1B:
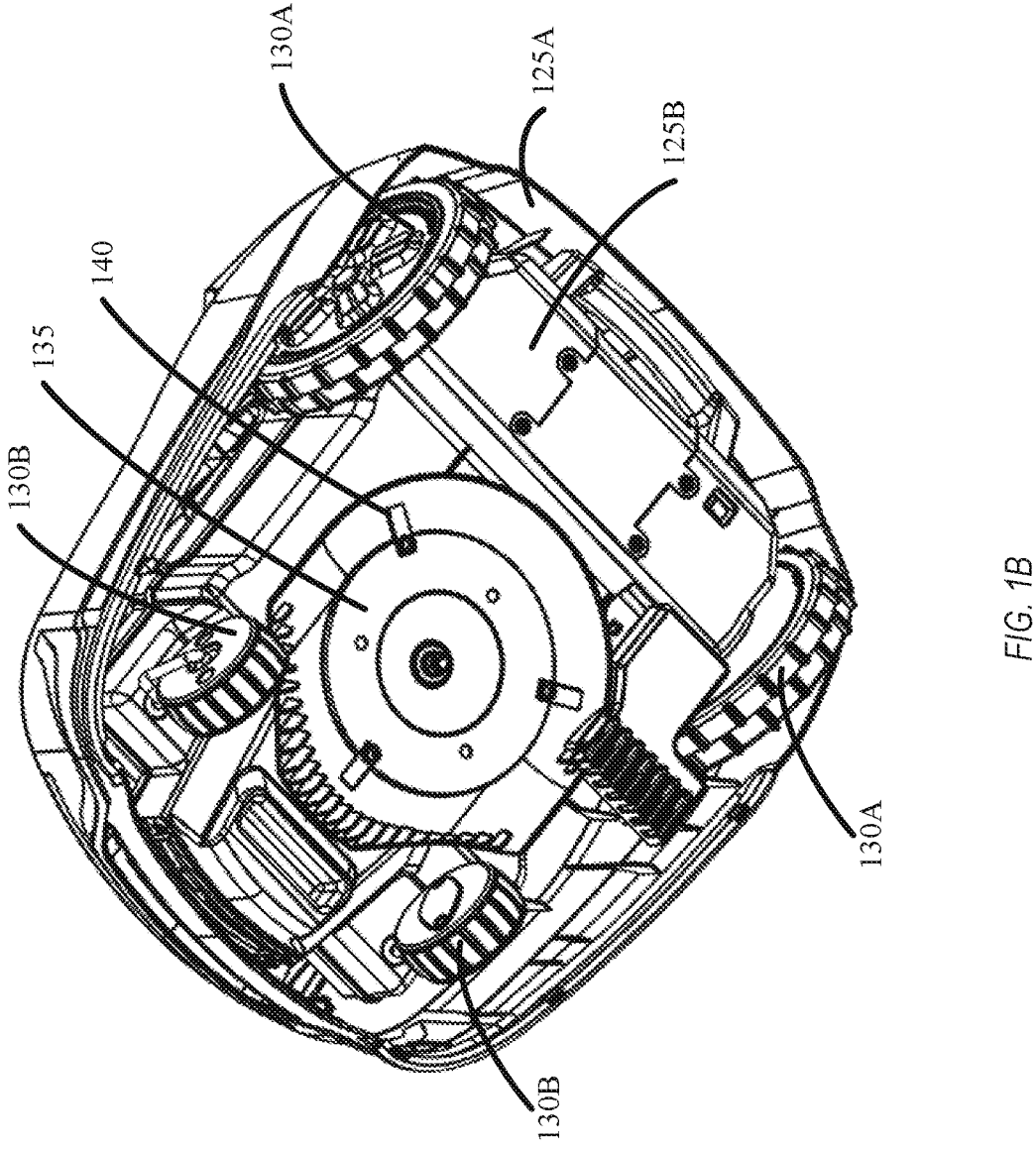
FIG. 1B illustrates a bottom perspective view of the robotic lawn mower of FIG. 1A according to some example embodiments.

FIG. 1B illustrates a bottom perspective view of the robotic mower 105 according to some example embodiments. The robotic mower 105 may include a housing 125 that includes an outer housing 125A (i.e., outer housing shell) and an inner housing 125B. The outer housing 125A may be coupled to the inner housing 125B. The robotic mower 105 also may include wheels 130 (i.e., a set of wheels 130) coupled to the inner housing 125B and configured to rotate with respect to the housing 125 to propel the robotic mower 105 on an operating surface (e.g., a yard to be mowed). The wheels 130 may include motor-driven wheels 130A and non-motor-driven wheels 130B. In the embodiment shown in FIG. 1B, two rear wheels 130A are motor-driven wheels 130A while two front wheels 130B are non-motor-driven wheels 130B. In other embodiments, the robotic mower 105 may include a different wheel arrangement (e.g., a different number of total wheels, a different number of each type of wheel, different wheels being motor-driven or non-motor-driven, and/or the like).

In some embodiments, the robotic mower 105 includes a wheel motor 235 (see FIG. 2) coupled to one or more wheels 130 and configured to drive rotation of the one or more wheels 130. In some embodiments, the robotic mower 105 includes multiple wheel motors 235 where each wheel motor 235 is configured to drive rotation of a respective motor-driven wheel 130A (see FIG. 2).

In some embodiments, the robotic mower 105 includes a cutting blade assembly 135 coupled to the inner housing 125B and configured to rotate with respect to the housing 125 to cut grass on the operating surface. The cutting blade assembly 135 may include a rotating disc to which a plurality of cutting blades 140 configured to cut the grass are attached. In some embodiments, the robotic mower 105 includes a cutting blade assembly motor 240 (see FIG. 2) coupled to the inner housing 125B and to the cutting blade assembly 135. The cutting blade assembly motor 240 may be configured to drive rotation of the cutting blade assembly 135 to cut the grass on the operating surface.

In some embodiments, the robotic mower 105 and/or the docking station 110 include additional components and functionality than is shown and described herein. For example, the robotic mower 105 and/or the docking station 110 may include components and/or functionality described in PCT Application No. PCT/CN2017/091129, filed Jun. 30, 2017, which has published as International Publication No. WO 2018/001358, the entire contents of which are hereby incorporated by reference and appended herein with related replacement black-and-white line drawings filed in related U.S. application Ser. No. 16/312,236 that claims priority to PCT Application No. PCT/CN2017/091129.

Figure 2:
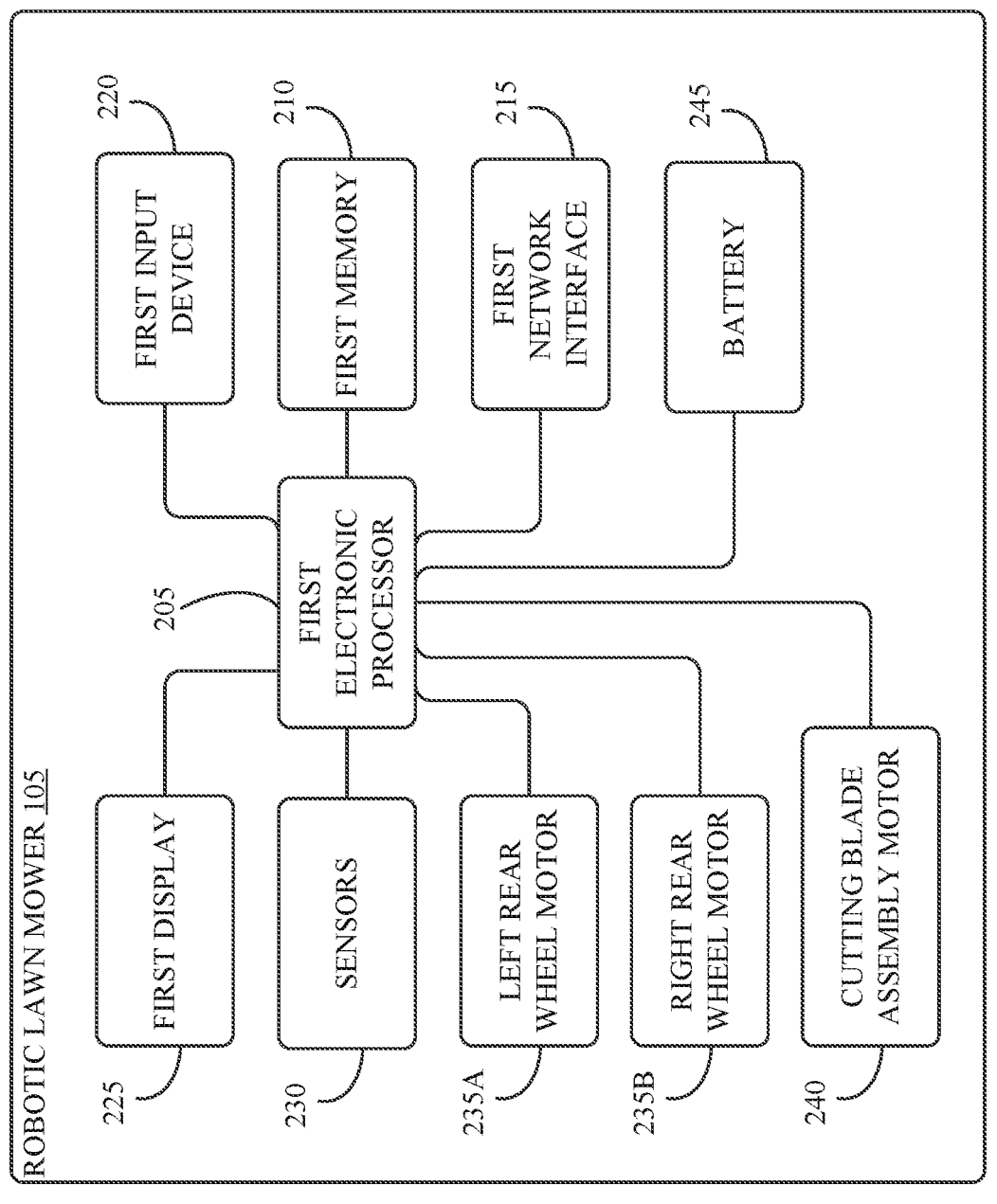
FIG. 2 is a block diagram of the robotic lawn mower of FIGS. 1A and 1B according to some example embodiments.

FIG. 2 is a block diagram of the robotic mower 105 according to some example embodiments. In the embodiment illustrated, the robotic mower 105 includes a first electronic processor 205 (for example, a microprocessor or other electronic device). The first electronic processor 205 includes input and output interfaces (not shown) and is electrically coupled to a first memory 210, a first network interface 215, an optional first input device 220, an optional display 225, one or more sensors 230, a left rear wheel motor 235A, a right rear wheel motor 235B, a cutting blade assembly motor 240, and a battery 245. In some embodiments, the robotic mower 105 includes fewer or additional components in configurations different from that illustrated in FIG. 2. For example, the robotic mower 105 may not include the first input device 220 and/or the first display 225. As another example, the robotic mower 105 may include a height adjustment motor configured to adjust a height of the cutting blade assembly 135 (e.g., as described in PCT Application No. PCT/CN2017/091129). As yet another example, the robotic mower 105 may include additional sensors or fewer sensors than the sensors 230 described herein. In some embodiments, the robotic mower 105 performs functionality other than the functionality described below.

The first memory 210 may include read only memory (ROM), random access memory (RAM), other non-transitory computer-readable media, or a combination thereof. The first electronic processor 205 is configured to receive instructions and data from the first memory 210 and execute, among other things, the instructions. In particular, the first electronic processor 205 executes instructions stored in the first memory 210 to perform the methods described herein.

The first network interface 215 is configured to send data to and receive data from the external device 115. In some embodiments, the first network interface 215 includes one or more transceivers for wirelessly communicating with the external device 115. Alternatively or in addition, the first network interface 215 may include a connector or port for receiving a wired connection to the external device 115, such as USB cable.

The first user input device 220 is configured to allow the first electronic processor 205 to receive a user input from a user to, for example, set/adjust an operational parameter of the robotic mower 105. The first display 225 is configured to display a user interface to the user. Similar to the user interface of the external device 115 described previously herein, the user interface displayed on the first display 225 may allow the user to access and interact with robotic mower information. In some embodiments, the first display 225 may also act as the first input device 220. For example, a touch sensitive input interface may be incorporated into the first display 225 to allow the user to interact with content provided on the first display 225. The first display 225 may be a liquid crystal display (LCD) screen, an organic light emitting display (OLED) display screen, or an E-ink display. In some embodiments, the first display 225 includes future-developed display technologies.

In some embodiments, the first electronic processor 205 is in communication with a plurality of sensors 230 that may include electromagnetic field sensors, radio frequency sensors (e.g., radio frequency identification (RFID) interrogators/sensors), Hall sensors, other magnetic sensors, and/or the like.

In some embodiments, the inner housing 125B includes at least two boundary cable sensors in the form of electromagnetic field sensors configured to detect an electromagnetic signal being emitted by the boundary cable 505. For example, the electromagnetic field sensors may be able to detect a strength and/or a polarity of the electromagnetic signal from the boundary cable 505. In some embodiments, the robotic mower 105 includes two electromagnetic field sensors located symmetrically with respect to each other about a center axis of the robotic mower 105 that bisects the housing 125 and extends in a front-rear direction. In some embodiments, the robotic mower 105 includes two pairs of such symmetrically arranged electromagnetic field sensors where one pair is located closer to a front of the robotic mower 105 and the other pair is located closer a rear of the robotic mower 105.

In some embodiments, the inner housing 125B includes one or more anchor sensors configured to detect an anchor 510 (see FIG. 5) installed on the operating surface. In some embodiments, the anchor sensor is an RFID interrogator/sensor configured to receive an RFID signal from an RFID tag included on/in the anchor 510. For example, the RFID interrogator of the robotic mower 105 may be configured to interrogate the RFID tag of the anchor 510 when the robotic mower 105 is within communication range of the anchor 510. The RFID interrogator may wirelessly provide power to the RFID tag to allow the RFID tag to emit an active signal in response to being interrogated by the RFID interrogator of the robotic mower 105. In turn, the RFID interrogator may detect the active signal from the RFID tag. In some embodiments, the anchor sensor is another type of sensor (e.g., an electromagnetic field sensor) configured to receive an active signal from the anchor 510. For example, the anchor 510 may receive power from the boundary cable 505 such that the anchor 510 is able to transmit an active signal that is detectable by one or more anchor sensors of the robotic mower 105. In this example where the anchor 510 receives power from the boundary cable 505, the boundary cable 505 may include a portion of the cable 505 split off from the main boundary cable 505 to power the anchor 510 without emitting the electromagnetic signal that the main boundary cable 505 is configured to emit. Additionally, the signal from the anchor 510 may be different than the electromagnetic signal from the main boundary cable 505.

In some embodiments, the anchor sensor is a magnetic sensor configured to sense the mere presence of a magnetic field being provided by a magnet (e.g., a magnetic stake acting as the anchor 510). In other words, the anchor sensor may be configured to sense a passive signal emitted by the anchor 510.

In some embodiments, different anchors 510 may be associated with unique identifiers such that the first electronic processor 205 may distinguish between different anchors 510. For example, anchors 510 configured to emit an active signal may include a unique identifier in the active signal. In some embodiments, different anchors 510 are not associated with unique identifiers, and the first electronic processor 205 may respond in a same or similar manner to all detected anchors 510. For example, anchors 510 configured to provide only a passive signal may not be uniquely identifiable. Additionally, some anchors 510 configured to emit an active signal may not be uniquely identifiable in some embodiments. In some embodiments, one or more of the anchors 510 may act as the pegs/stakes that pin the boundary cable 505 to the ground/soil.

In some embodiments, the robotic mower 105 includes one or more first sensors configured solely to sense an electromagnetic signal from the boundary cable 505, and one or more second sensors configured solely to sense one or more anchors 510. In some embodiments, the robotic mower 105 includes at least one sensor configured to sense the electromagnetic signal from the boundary cable 505 and configured to sense one or more anchors 510.

In some embodiments, the inner housing 125B includes an odometry sensor (e.g., one or more Hall sensors or other types of sensors) for each motor-driven wheel 130A. Data from the odometry sensors may be used by the first electronic processor 205 to determine how far each wheel 130A has rotated and/or how fast each wheel is rotating in order to accurately control movement (e.g., turning capabilities) of the robotic mower 105. For example, the first electronic processor 205 may control the robotic mower 105 to move in an approximately straight line by controlling both of the wheel motors 235A and 235B to rotate at approximately the same speed. As another example, the first electronic processor 205 may control the robotic mower 105 to turn in a certain direction by controlling one of the wheel motors 235A or 235B to rotate faster than or in an opposite direction than the other of the wheel motors 235A or 235B. Similarly, rotating only one of the wheel motors 235A or 235B while the other wheel motor 235A or 235 is not rotated should result in the robotic mower 105 turning.

In some embodiments, the inner housing 125B includes a cutting blade assembly motor sensor (e.g., one or more Hall sensors or other types of sensors). Data from the cutting blade assembly motor sensor may be used by the first electronic processor 205 to determine how fast the cutting blade assembly 135 is rotating.

In some embodiments, the battery 245 provides power to the first electronic processor 205 and to other components of the robotic mower 105 such as the motors 235A, 235B, 240 and the first display 225. In some embodiments, power may be supplied to other components besides the first electronic processor 205 through the first electronic processor 205 or directly to the other components. In some embodiments, when power is provided directly from the battery 245 to the other components, the first electronic processor 205 may control whether power is provided to one or more of the other components using, for example, a respective switch (e.g., a field-effect transistor) or a respective switching network including multiple switches. In some embodiments, the robotic mower 105 includes active and/or passive conditioning circuitry (e.g., voltage step-down controllers, voltage converters, rectifiers, filters, etc.) to regulate or control the power received by the components of the robotic mower (e.g., the first electronic processor 205, the motors, 235A, 235B, 240, etc.) from the battery 245. In some embodiments, the battery 245 is a removable battery pack. In some embodiments, the battery 245 is configured to receive charging current from the docking station 110 when the robotic mower 105 is docked at the docking station 110 and electrically connected thereto.

Figure 3:
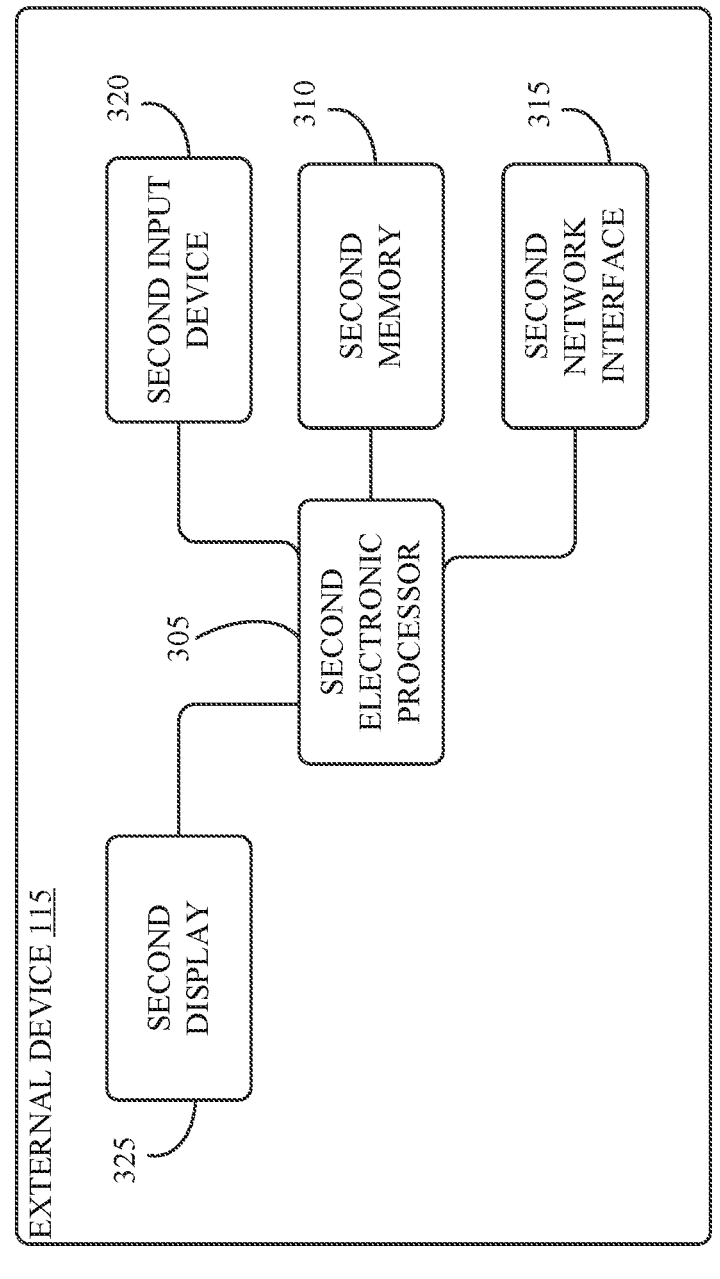
FIG. 3 is a block diagram of the external device of FIG. 1A according to some example embodiments.

FIG. 3 is a block diagram of the external device 115 according to some example embodiments. In the example shown, the external device includes a second electronic processor 305 electrically connected to a second memory 310, a second network interface 315, a second user input device 320, and a second display 325. These components are similar to the like-named components of the robotic mower 105 explained above with respect to FIG. 2 and function in a similar manner as described above. For example, the second display 325 may also function as an input device (e.g., when the second display 325 is a touchscreen). In some embodiments, the second electronic processor 305 sends data to and receives data from the robotic mower 105 via the second network interface 315. In some embodiments, the external device 115 includes fewer or additional components in configurations different from that illustrated in FIG. 3. For example, the external device 115 may include a battery, a global positioning system (GPS) device, or the like. In some embodiments, the external device 115 performs functionality other than the functionality described below.

In some embodiments, the robotic mower 105 may travel randomly within an operating area defined by the boundary cable 505. For example, the robotic mower 105 may be configured to travel in an approximate straight line until the robotic mower 105 detects the boundary cable 505. In response to detecting the boundary cable 505, the robotic mower 105 may be configured to turn in a random direction and continue traveling in an approximate straight line along a new path until the boundary cable 505 is again detected.

However, there are some disadvantages robotic mowers traveling in a random manner as described above. For example, the robotic mower may, by chance, mow certain areas of the operating area more often than it mows other areas of the operating area. This uneven mowing problem may be especially problematic for operating areas with multiple main operating zones A and B separated by a narrow passage/crossing 515 (see FIG. 5). For example, a randomly traveling robotic mower may have a low chance of entering the narrow passage/crossing since the narrow passage/crossing is only a small portion of the operating area. Additionally, if the randomly traveling robotic mower enters the narrow passage/crossing, the robotic mower may have difficulty exiting the narrow passage/crossing due to its random movement and two portions of the boundary cable 505 being located close to each other. Spending extra time in the narrow passage/crossing re-mowing areas that have already been mowed causes the robotic mower to waste time and battery power without providing much, if any, value to the user. Accordingly, there is a technological problem with navigating robotic mowers in an operating area, particularly when the operating area includes multiple operating zones and/or a narrow passage/crossing.

The methods and functionality described below address the above-noted technological problem by using one or more anchors 510 that are installed in the operating area and that are configured to be detected by the robotic mower 105 to cause the robotic mower 105 to operate in a predetermined manner. Embodiments described herein enable more precise control of the robotic mower 105 that otherwise moves randomly within the operating area defined by the boundary cable 505. The embodiments described herein efficiently address the above-noted technological problem without using complex mapping algorithms or complex position tracking that may require expensive positioning and computing capabilities and may use valuable battery power and processing power and that may significantly increase the cost of the robotic mower.

FIG. 4 illustrates a flowchart of a method 400 that may be performed by the first electronic processor 205 of the robotic mower 105 to control movement of the robotic mower 105 according to some example embodiments. While a particular order of processing steps, signal receptions, and/or signal transmissions is indicated in FIG. 4 as an example, timing and ordering of such steps, receptions, and transmissions may vary where appropriate without negating the purpose and advantages of the examples set forth in detail throughout the remainder of this disclosure.

At block 405, the first electronic processor 205 receives first sensor data from at least one sensor 230 configured to sense the electromagnetic signal from the boundary cable 505. In some embodiments, the first sensor data corresponds to the electromagnetic signal from the boundary cable 505.

In some embodiments, in response to receiving the first sensor data, at block 410, the first electronic processor 205 is configured to control, based on the first sensor data, operation of at least one wheel motor 235 to control movement of the robotic mower 105 such that the robotic mower 105 remains within a boundary defined by the boundary cable 505. For example, as described previously herein, in response to detecting the boundary cable 505, the first electronic processor 205 may control the robotic mower 105 to randomly turn and then continue traveling in an approximate straight line. In some embodiments, in response to detecting the boundary cable 505, the first electronic processor 205 may control the robotic mower 105 to stop and then randomly turn in place (i.e., pivot). In some embodiments, in response to detecting the boundary cable 505, the first electronic processor 205 may control the robotic mower 105 to stop, reverse a predetermined distance/time in an approximate straight line, and then randomly turn. FIG. 5 shows an example random movement path 520 of the robotic mower 105 in operating zone A.

An area inside the boundary defined by the boundary cable 505 may be referred to the operating area. In some embodiments, the operating area includes some area outside of the boundary cable 505 (e.g., 90 centimeters, 60 centimeters, 30 centimeters, or the like outside the boundary cable 505). In other words, the boundary defined by the boundary cable 505 may include some area outside of the boundary cable 505. For example, the first electronic processor 205 may be configured to detect the robotic mower 105 crossing the boundary cable 505 (e.g., based on a change in polarity of the electromagnetic signal from the boundary cable 505) as the detection of the boundary cable 505 that triggers the robotic mower 105 to randomly turn.

After the robotic mower 105 has randomly turned to remain in the operating area (at block 410), the robotic mower 105 is configured to again move in an approximately straight line until either (i) the first electronic processor 205 detects the boundary cable 505 again (at block 405) or (ii) the first electronic processor 205 receives second sensor data from at least one sensor 230 configured to sense an anchor 510 (e.g., a first anchor 510A) (at block 415). Accordingly, FIG. 4 shows dashed lines from block 410 to indicate that after block 410, the method 400 may proceed to block 405 or 415 depending on the random movement of the robotic mower 105. In some embodiments, the second sensor data received during block 415 indicates a sensing of the first anchor 510A.

In response to receiving the second sensor data, at block 420, the first electronic processor 205 is configured to control operation of at least one wheel motor 235 to control movement of the robotic mower 105 in a first predetermined manner. In some embodiments, the first predetermined manner includes a certain movement (e.g., stopping and randomly turning, changing the travel speed of the robotic mower, etc.) and/or a certain task (e.g., move until the boundary cable 505 is detected). For example, the first predetermined manner may include the first electronic processor 205 controlling the robotic mower 105 to stop and/or turn around (either randomly or in a predetermined manner such as making a 180 degree turn). In some embodiments, at block 420, the first electronic processor 205 additionally or alternatively is configured to control at least one element of the robotic mower 105 in a first predetermined manner. For example, control of the at least one element of the robotic mower 105 in the first predetermined manner may include adjusting a height and/or a speed of the cutting blade assembly 135, enabling or disabling a secondary cutting device such as an edge cutting device configured to cut grass closer to the edge of the outer housing 125A than the cutting blade assembly 135, enabling or disabling certain sensors 230, and/or the like.

As another example of controlling operation of the at least one wheel motor 235 to control movement of the robotic mower 105 in a first predetermined manner, the first predetermined manner may include the first electronic processor 205 controlling the robotic mower 105 to efficiently move through a narrow passage/crossing 515 from one operating zone A to another operating zone B as shown in FIG. 5. For example, the first predetermined manner may include the first electronic processor 205 controlling the robotic mower 105 to move until the first electronic processor 205 receives third sensor data from at least one sensor 230 that indicates a sensing of the electromagnetic signal from the boundary cable 505. For example, a first anchor 510A may be located near the boundary cable 505 at one end of the narrow passage/crossing 515 as shown in FIG. 5. Accordingly, upon sensing the first anchor 510A, the robotic mower 105 may also be able to sense the electromagnetic signal from the boundary cable 505. In some embodiments, when the first electronic processor 205 senses both an anchor 510 and the electromagnetic signal from the boundary cable 505, the first electronic processor 205 may prioritize the sensing of the anchor 510 and execute block 420 of the method 400. In some embodiments, as part of the first predetermined manner of controlling the robotic mower in response to detection of the anchor 510, the first electronic processor 205 controls the robotic mower 105 to move along the boundary cable 505 along a narrow passage path 530 as shown in FIG. 5. For example, the first electronic processor 205 may control movement of the robotic mower 105 to position the robotic mower 105 such that the boundary cable 505 is located approximately equidistant from each of two symmetrical boundary cable sensors of the robotic mower 105 (i.e., the robotic mower 105 straddles the boundary cable 505). The first electronic processor 205 may then control the wheel motors 235 to move the robotic mower 105 forward along the boundary cable 505 such that boundary cable 505 remains equidistant from the symmetrical boundary cable sensors until the robotic mower 105 detects a second anchor 510B that is different than the first anchor 510A. As explained previously herein, in some embodiments, the first electronic processor 205 is able to distinguish between the first anchor 510A and the second anchor 510B due to a unique identifier received in an active signal emitted by at least one of the anchors 510A and 510B. In other embodiments, the first electronic processor 205 may not be able to distinguish between the first anchor 510A and the second anchor 510B. In such embodiments, upon detecting the first anchor 510A, the first electronic processor 205 may delay a predetermined time period or allow the robotic mower 105 to travel a predetermined distance before beginning to attempt to detect another anchor 510 (e.g., to give the robotic mower 105 time to move away from the first anchor 510A so as not to re-detect the first anchor 510A immediately again). Alternatively, the first electronic processor 205 may not begin to attempt to detect another anchor 510 until the second sensor data indicates that the first anchor 510A is no longer being detected (e.g., because the robotic mower 105 has moved far enough away from the first anchor 510A). In some embodiments, the first electronic processor 205 may also set a flag in the first memory 210 to indicate that the first anchor 510A was detected.

In some embodiments, to allow the robotic mower 105 to efficiently move through the narrow passage 530, the first electronic processor 205 may roughly navigate through the narrow passage 530 by detecting a difference between the magnetic field generated by the boundary cable 505 in and/or near the narrow passage 530 and away from the narrow passage 530. For example, due to two portions of the boundary cable 505 being close to each other in and/or near the narrow passage 530, the magnetic field generated by the boundary cable 505 in and/or near the narrow passage 530 may be different than the magnetic field generated by the boundary cable 505 away from the narrow passage 530. The first electronic processor 205 may recognize this difference in magnetic field on its own and/or in response to detecting the first anchor 510A. The first electronic processor 205 may roughly navigate the robotic mower 105 toward the narrow passage 530 and/or through the narrow passage 530 based on the magnetic field difference.

In some embodiments, the first electronic processor 205 receives, from at least one of the sensors 230, fourth sensor data that indicates a sensing of the second anchor 510B installed on the operating surface. The first electronic processor 205 may determine that the second anchor 510B is a different anchor 510 than the first anchor 510A by analyzing unique identifiers included in active signals from the anchors 510 or by delaying detection of another anchor 510 after detection of the first anchor 510A as explained above. In response to receiving the fourth sensor data, the first electronic processor 205 may be configured to control the robotic mower 105 to move away from the boundary cable 505 to continue random movement 525 in operating zone B as shown in FIG. 5. For example, the first electronic processor 205 may be configured to control the robotic mower 105 to move in an approximate straight line or to randomly turn (e.g., within a predetermined range of angles) to continue random movement/mowing operation. In some embodiments, the second anchor 510B may be located near the boundary cable 505 at the other end of the narrow passage/crossing 515 as shown in FIG. 5.

In some embodiments, the first electronic processor 205 may be configured to control movement of the robotic mower 105 in a similar manner but in the reverse direction in response to the robotic mower 105 detecting the second anchor 510B during random movement 525 in operating zone B. In other words, the robotic mower 105 may be configured to efficiently travel back along the narrow passage path 530 or along a different narrow passage path through the narrow passage/crossing 515 to get back to operating zone A. Accordingly, the predetermined manner in which the first electronic processor 205 controls the movement of the robotic mower 105 in response to detection of an anchor 510 may depend on a unique identifier of the anchor 510, may depend on whether a flag in the first memory 210 is set that indicates another anchor 510 was previously detected, and/or may depend on the current operation mode of the robotic mower 105. For example, detection of the second anchor 510B during random operation (e.g., when the flag in the first memory 210 is not set) may cause the robotic mower 105 to move along the boundary cable 505 to travel along the narrow passage path 530. However, detection of the second anchor 510B during travel along the boundary cable 505/narrow passage path 530 (e.g., when the flag in the first memory 210 is set) may cause the robotic mower 105 to discontinue movement along the boundary cable 505 and restart random movement of the robotic mower 105.

Additionally, in some embodiments, the first electronic processor 205 may only control the robotic mower 105 to move in the first predetermined manner in response to detecting an anchor 510 if the anchor 510 has been detected a predetermined amount of times. For example, to ensure that the robotic mower 105 mows operating zone B for a sufficient period of time upon entering operation zone B, the first electronic processor 205 may be configured to ignore the predetermined amount (e.g., five, ten, or the like) of times that the robotic mower 105 detects the second anchor 510B. Rather, in response to detection of the second anchor 510B for the predetermined amount of times, the robotic mower 105 may continue random movement.

In some embodiments, in response to receiving the second sensor data indicating that the robotic mower 105 has detected an anchor 510, the first electronic processor 205 is configured to control operation of the cutting blade motor 240 in a second predetermined manner. For example, the second predetermined manner may include stopping rotation of the cutting blade motor 240 or adjusting the speed of the cutting blade motor 240. In some embodiments, the first electronic processor 205 may control other aspects of the robotic mower 105 to function in specific manners in response to detecting any anchor 510 or in response to detecting a specific anchor 510.

After the robotic mower 105 has been controlled in the first predetermined manner (at block 420), the robotic mower 105 is configured to again move in an approximately straight line until either (i) the first electronic processor 205 detects the boundary cable 505 again (at block 405) or (ii) the first electronic processor 205 detects an anchor 510 (at block 415). Accordingly, FIG. 4 shows dashed lines from block 420 to indicate that after block 420, the method 400 may proceed to block 405 or 415 depending on the random movement of the robotic mower 105.

As indicated by the examples provided herein, in some embodiments, at least one of the sensors 230 is configured to sense a first anchor 510 and a second anchor 510 different from the first anchor 510 (e.g., at a later time). In some embodiments, the first electronic processor 205 is configured to distinguish second sensor data indicative of detection of the first anchor 510 from third sensor data indicative of detection of the second anchor 510 to determine whether the first anchor 510 or the second anchor 510 has been sensed/detected. In response to receiving the third sensor data indicative of detection of the second anchor 510, the first electronic processor 205 is configured to control operation of at least one wheel motor 235 to control movement of the robotic mower 105 (and/or control operation of other components of the robotic mower 105) in a second predetermined manner that is different than the first predetermined manner in which the robotic mower 105 is configured to be controlled in response to detection of the first anchor 510. For example, the first anchor 510 may indicate an end of a narrow passage/crossing 515 while the second anchor 510 may indicate an obstacle. Accordingly, the robotic mower 105 may be controlled differently in response to detecting each of the first anchor 510 and the second anchor 510.

In some embodiments, the first electronic processor 205 is configured to receive a first anchor setting from the external device 115 via wireless communication through the first network interface 215. In some embodiments, the first anchor setting indicates the first predetermined manner in which the first electronic processor 205 is to control operation of at least one wheel motor 235 to control movement of the robotic mower 105 (and/or control operation of other components of the robotic mower 105) in response to receiving the second sensor data indicating the first anchor 510 has been detected. In some embodiments, the first anchor setting is selected, via a first user input on the external device 115, from among a plurality of anchor setting options. In other words, using the external device 115, a user may select operational parameters of the robotic mower 105 that are associated with one or more specific anchors 510 such that the robotic mower 105 is controlled in a desired manner in response to detecting the respective anchors 510.

In some embodiments, the external device 115 may change the operational parameters of the robotic mower 105 that are associated with specific anchors 510, which may be useful if the user moves to a new house with a new yard that requires different movements by the robotic mower 105 in response to detection of respective anchors 510. In other words, the first electronic processor 205 may be configured to receive a second anchor setting from the external device 115 to replace a first anchor setting. The second anchor setting may be selected, via a second user input on the external device 115, from among the plurality of anchor setting options. In some embodiments, the second anchor setting indicates a second predetermined manner in which the first electronic processor 205 is to control operation of at least one wheel motor 235 to control movement of the robotic mower 105 (and/or control operation of other components of the robotic mower 105) in response to receiving the second sensor data indicating the first anchor 510 has been detected. As indicated above, in some embodiments, the second predetermined manner is different than the first predetermined manner and configured to replace the first predetermined manner. In response to receiving the second sensor data indicating the first anchor 510 has been detected, the first electronic processor 205 may be configured to control operation of the at least one wheel motor 235 to control movement of the robotic mower 105 in the second predetermined manner (and/or control operation of other components of the robotic mower 105).

In some embodiments, any of the operational parameters described herein may be configurable by the user using at least one of the first input device 220, the first display 225, and the external device 115.

In some embodiments when the anchors 510 are configured to provide a respective unique identifier to the robotic mower 105, the first electronic processor 205 may store (in the first memory 210) how many times (and when) each anchor 510 is detected. In response to determining that the amount of times one or more anchors 510 have been detected are lower than others (e.g., by a predetermined threshold), the first electronic processor 205 may determine that zones near the low-count anchors 510 are not being adequately mowed. In response thereto, the first electronic processor 205 may control the robotic mower 105 to start mowing the zones near the low-count anchors 510 (e.g., by traveling along the boundary cable 505 to one or more of the low-count anchors 510). In some embodiments, the first electronic processor 205 may execute a control method that determines whether all anchors 510 or a specific subset of anchors 510 are detected at least once within a predetermined period of time. In response to determining that all anchors 510 or the specific subset of anchors 510 have been detected in the predetermined period of time, the robotic mower 105 may continue its normal operation. On the other hand, in response to determining not all anchors 510 or all anchors 510 in the specific subset of anchors 510 have been detected in the predetermined period of time, the first electronic processor 205 may control the robotic mower 105 start mowing a zone near one of the anchors 510 that was not detected (e.g., by traveling along the boundary cable 505 to one or more of the low-count anchors 510). Additionally, or alternatively, the first electronic processor 205 may provide a notification to a user to indicate that not all desired anchors 510 were detected in the predetermined period of time. For example, the first electronic processor 205 may transmit the notification to the external device 115.

While many of the above examples include anchors 510 located on or near the boundary cable 505, anchors 510 may be placed anywhere within the operating area/boundary of the robotic mower 105. For example, an anchor 510 may be placed in the middle of an operating zone (e.g., in an area where more frequent mowing is desired) and may trigger the robotic mower 105 to slow the speed of the robotic mower 105 or otherwise change the movement of the robotic mower 105 when near the anchor 510 to more thoroughly mow the area near the anchor 510.

The embodiments described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention.

We claim:

1. A robotic garden tool comprising:
a housing;
a set of wheels coupled to the housing and configured to rotate to propel the robotic garden tool on an operating surface;
at least one wheel motor coupled to one or more wheels of the set of wheels, the at least one wheel motor configured to drive rotation of the one or more wheels;
a plurality of sensors including a first sensor configured to sense an electromagnetic signal from a boundary cable installed on the operating surface and a second sensor configured to sense a first anchor installed on the operating surface; and an electronic processor in communication with the plurality of sensors and configured to receive first sensor data from the first sensor configured to sense the electromagnetic signal from the boundary cable, wherein the first sensor data corresponds to the electromagnetic signal from the boundary cable, control, based on the first sensor data, operation of the at least one wheel motor to control movement of the robotic garden tool such that the robotic garden tool remains within a boundary defined by the boundary cable, receive second sensor data from the second sensor configured to sense the first anchor, wherein the second sensor data indicates a sensing of the first anchor, and in response to receiving the second sensor data, control operation of the at least one wheel motor to control movement of the robotic garden tool in a first predetermined manner, wherein the electronic processor is configured to control operation of the at least one wheel motor to control movement of the robotic garden tool in the first predetermined manner by controlling the robotic garden tool to move until the electronic processor receives third sensor data from at least one of the plurality of sensors that indicates a sensing of the electromagnetic signal from the boundary cable, controlling the robotic garden tool to move along the boundary cable, receiving, from at least one of the plurality of sensors, fourth sensor data that indicates a sensing of a second anchor installed on the operating surface, wherein the second anchor is different than the first anchor, and in response to receiving the fourth sensor data, controlling the robotic garden tool to move away from the boundary cable.

2. The robotic garden tool of claim 1, further comprising a network interface, wherein the electronic processor is configured to communicate with an external device via the network interface, and wherein the electronic processor is further configured to:

receive a first anchor setting from the external device, wherein the first anchor setting indicates the first predetermined manner in which the electronic processor is to control operation of the at least one wheel motor to control movement of the robotic garden tool in response to receiving the second sensor data;

wherein the first anchor setting is selected, via a first user input on the external device, from among a plurality of anchor setting options.

3. The robotic garden tool of claim 2, wherein the electronic processor is further configured to:

receive a second anchor setting from the external device to replace the first anchor setting, wherein the second anchor setting is selected, via a second user input on the external device, from among the plurality of anchor setting options, and wherein the second anchor setting indicates a second predetermined manner in which the electronic processor is to control operation of the at least one wheel motor to control movement of the robotic garden tool in response to receiving the second sensor data, the second predetermined manner being different than the first predetermined manner and configured to replace the first predetermined manner; and in response to receiving the second sensor data, control operation of the at least one wheel motor to control movement of the robotic garden tool in the second predetermined manner.

4. The robotic garden tool of claim 1, wherein the at least one of the plurality of sensors is configured to sense a second anchor installed on the operating surface, and wherein the electronic processor is configured to:

receive third sensor data from the at least one of the plurality of sensors that is configured to sense the second anchor, wherein the third sensor data indicates a sensing of the second anchor;

distinguish the second sensor data from the third sensor data to determine whether the first anchor or the second anchor has been sensed; and in response to receiving the third sensor data, control operation of the at least one wheel motor to control movement of the robotic garden tool in a second predetermined manner that is different than the first predetermined manner.

5. The robotic garden tool of claim 1, wherein the second sensor configured to sense the first anchor is configured to sense the first anchor by at least one of:

sensing an active signal emitted by the first anchor; and sensing a passive signal emitted by the first anchor.

6. The robotic garden tool of claim 1, wherein the second sensor configured to sense the first anchor is also configured to sense the electromagnetic signal from the boundary cable.

7. The robotic garden tool of claim 1, further comprising:

a cutting blade assembly coupled to the housing and configured to rotate with respect to the housing; and a cutting blade assembly motor coupled to the cutting blade assembly and configured to drive rotation of the cutting blade assembly;

wherein in response to receiving the second sensor data, the electronic processor is configured to control operation of the cutting blade assembly motor in a second predetermined manner.

8. A method of controlling a robotic garden tool, the method comprising:

receiving, with an electronic processor of the robotic garden tool, first sensor data from a first sensor of the robotic garden tool, the first sensor being configured to sense an electromagnetic signal from a boundary cable installed on an operating surface, wherein the first sensor data corresponds to the electromagnetic signal from the boundary cable;

controlling, with the electronic processor and based on the first sensor data, operation of at least one wheel motor of the robotic garden tool to control movement of the robotic garden tool such that the robotic garden tool remains within a boundary defined by the boundary cable, wherein the at least one wheel motor is coupled to one or more wheels of a set of wheels of the robotic garden tool, the at least one wheel motor being configured to drive rotation of the one or more wheels, and wherein the set of wheels is coupled to a housing of the robotic garden tool, the set of wheels being configured to rotate to propel the robotic garden tool on the operating surface;

receiving, with the electronic processor, second sensor data from a second sensor of the robotic garden tool, the second sensor being configured to sense a first anchor installed on the operating surface, wherein the second sensor data indicates a sensing of the first anchor;

in response to receiving the second sensor data, controlling, with the electronic processor, operation of the at least one wheel motor to control movement of the robotic garden tool in a first predetermined manner;

communicating, using the electronic processor, with an external device via a network interface of the robotic garden tool; and receiving, with the electronic processor, a first anchor setting from the external device, wherein the first anchor setting indicates the first predetermined manner in which the electronic processor is to control operation of the at least one wheel motor to control movement of the robotic garden tool in response to receiving the second sensor data, and wherein the first anchor setting is selected, via a first user input on the external device, from among a plurality of anchor setting options.

9. The method of claim 8, wherein controlling operation of the at least one wheel motor to control movement of the robotic garden tool in the first predetermined manner includes:

controlling, with the electronic processor, the robotic garden tool to move until the electronic processor receives third sensor data from at least one of the group consisting of the first sensor, the second sensor, another sensor of the robotic garden tool, and combinations thereof that indicates a sensing of the electromagnetic signal from the boundary cable;

controlling, with the electronic processor, the robotic garden tool to move along the boundary cable;

receiving, with the electronic processor and from at least one of the group consisting of the first sensor, the second sensor, the another sensor of the robotic garden tool, and combinations thereof, fourth sensor data that indicates a sensing of a second anchor installed on the operating surface, wherein the second anchor is different than the first anchor; and in response to receiving the fourth sensor data, controlling, with the electronic processor, the robotic garden tool to move away from the boundary cable.

10. The method of claim 8, further comprising:

receiving, with the electronic processor, a second anchor setting from the external device to replace the first anchor setting, wherein the second anchor setting is selected, via a second user input on the external device, from among the plurality of anchor setting options, and wherein the second anchor setting indicates a second predetermined manner in which the electronic processor is to control operation of the at least one wheel motor to control movement of the robotic garden tool in response to receiving the second sensor data, the second predetermined manner being different than the first predetermined manner and configured to replace the first predetermined manner; and in response to receiving the second sensor data, controlling, with the electronic processor, operation of the at least one wheel motor to control movement of the robotic garden tool in the second predetermined manner.

11. The method of claim 8, further comprising:

receiving, with the electronic processor, third sensor data from at least one of the group consisting of the first sensor, the second sensor, another sensor of the robotic garden tool, and combinations thereof, wherein the third sensor data indicates a sensing of a second anchor installed on the operating surface;

distinguishing, with the electronic processor, the second sensor data from the third sensor data to determine whether the first anchor or the second anchor has been sensed; and in response to receiving the third sensor data, controlling, with the electronic processor, operation of the at least one wheel motor to control movement of the robotic garden tool in a second predetermined manner that is different than the first predetermined manner.

12. The method of claim 8, wherein receiving the second sensor data from the second sensor includes sensing, with the second sensor, the first anchor by at least one of:

sensing an active signal emitted by the first anchor; and sensing a passive signal emitted by the first anchor.

13. The method of claim 8, further comprising sensing, with the second sensor, the electromagnetic signal from the boundary cable.

14. The method of claim 8, further comprising in response to receiving the second sensor data, controlling, with the electronic processor, operation of a cutting blade assembly motor of the robotic garden tool in a second predetermined manner;

wherein the cutting blade assembly motor is configured to drive rotation of a cutting blade assembly that is coupled to the housing and configured to rotate with respect to the housing.

15. A robotic garden tool comprising:

a housing;

a set of wheels coupled to the housing and configured to rotate to propel the robotic garden tool on an operating surface;

at least one wheel motor coupled to one or more wheels of the set of wheels, the at least one wheel motor configured to drive rotation of the one or more wheels;

a sensor configured to sense a first anchor installed on the operating surface;

a network interface configured to communicate with an external device; and an electronic processor in communication with the sensor and the network interface, the electronic processor configured to receive sensor data from the sensor, wherein the sensor data indicates a sensing of the first anchor, in response to receiving the sensor data, control operation of the at least one wheel motor to control movement of the robotic garden tool in a first predetermined manner, and receive, via the network interface, a first anchor setting from the external device, wherein the first anchor setting indicates the first predetermined manner in which the electronic processor is to control operation of the at least one wheel motor to control movement of the robotic garden tool in response to receiving the sensor data, and wherein the first anchor setting is selected, via a first user input on the external device, receive, via the network interface, a second anchor setting from the external device to replace the first anchor setting, wherein the second anchor setting is selected, via a second user input on the external device, and wherein the second anchor setting indicates a second predetermined manner in which the electronic processor is to control operation of the at least one wheel motor to control movement of the robotic garden tool in response to receiving the sensor data, the second predetermined manner being different than the first predetermined manner and configured to replace the first predetermined manner, and in response to receiving the sensor data that indicates the sensing of the first anchor, control operation of the at least one wheel motor to control movement of the robotic garden tool in the second predetermined manner.

16. The robotic garden tool of claim 15, wherein at least one of the group consisting of the sensor, another sensor of the robotic garden tool, and combinations thereof is configured to sense an electromagnetic signal from a boundary cable installed on the operating surface;

wherein the electronic processor is configured to:

receive second sensor data from at least one of the group consisting of the sensor, the another sensor of the robotic garden tool, and combinations thereof, wherein the second sensor data corresponds to the electromagnetic signal from the boundary cable, and control, based on the second sensor data, operation of the at least one wheel motor to control movement of the robotic garden tool such that the robotic garden tool remains within a boundary defined by the boundary cable.

17. The robotic garden tool of claim 16, wherein the electronic processor is configured to control operation of the at least one wheel motor to control movement of the robotic garden tool in the first predetermined manner by:

controlling the robotic garden tool to move until the electronic processor receives the second sensor data from the at least one of the group consisting of the sensor, the another sensor of the robotic garden tool, and combinations thereof that indicates a sensing of the electromagnetic signal from the boundary cable;

controlling the robotic garden tool to move along the boundary cable;

receiving, from the at least one of the group consisting of the sensor, the another sensor of the robotic garden tool, and combinations thereof, third sensor data that indicates a sensing of a second anchor installed on the operating surface, wherein the second anchor is different than the first anchor; and in response to receiving the third sensor data, controlling the robotic garden tool to move away from the boundary cable.

* * * * *